US007814025B2

(12) United States Patent
Roever et al.

(10) Patent No.: US 7,814,025 B2
(45) Date of Patent: *Oct. 12, 2010

(54) METHODS AND APPARATUS FOR TITLE PROTOCOL, AUTHENTICATION, AND SHARING

(75) Inventors: Stefan Roever, Los Altos Hills, CA (US); Kevin Collins, Cupertino, CA (US); Josh C. Ding, San Jose, CA (US); Alex F. Clark, Campbell, CA (US); James Bruce, Scotts Valley, CA (US)

(73) Assignee: Navio Systems, Inc., San Jose, CA (US)

( * ) Notice: Subject to any disclaimer, the term of this patent is extended or adjusted under 35 U.S.C. 154(b) by 1323 days.

This patent is subject to a terminal disclaimer.

(21) Appl. No.: 10/439,629

(22) Filed: May 15, 2003

(65) Prior Publication Data

US 2006/0036548 A1   Feb. 16, 2006

Related U.S. Application Data

(63) Continuation-in-part of application No. 10/232,861, filed on Aug. 30, 2002.

(60) Provisional application No. 60/380,787, filed on May 15, 2002, provisional application No. 60/407,466, filed on Aug. 30, 2002, provisional application No. 60/407,382, filed on Aug. 30, 2002.

(51) Int. Cl.
*G06Q 99/00* (2006.01)
(52) U.S. Cl. ............................. 705/65; 705/51; 705/64; 705/75; 705/78; 705/79
(58) Field of Classification Search .............. 705/50–59
See application file for complete search history.

(56) References Cited

U.S. PATENT DOCUMENTS 5,455,407 A    10/1995   Rosen (Continued)

FOREIGN PATENT DOCUMENTS

JP          02-245970           1/1990

(Continued)

OTHER PUBLICATIONS

U.S. Office Action mailed Feb. 9, 2005, from related U.S. Appl. No. 10/232,861.

(Continued)

*Primary Examiner*—Jalatee Worjloh
(74) *Attorney, Agent, or Firm*—Weaver Austin Villenueve and Sampson LLP

(57) ABSTRACT

A title management apparatus resident on a first computer including a memory for storing a control program and data, and a processor for executing the control program and for managing the data. The apparatus includes a title object resident in the memory including a title structure, the title structure further comprising a content element, a set of attributes, and a set of title object security indicia. The apparatus further includes an authorization structure configured to selectively redeem the content element based at least in part on the user security indicia, and further configured to use a set of protocols. The apparatus also includes a title management structure configured to associate a user with the title object based at least in part on the user data and the title attributes.

55 Claims, 75 Drawing Sheets

U.S. PATENT DOCUMENTS

| | | | |
|---|---|---|---|
| 5,606,609 A | 2/1997 | Houser et al. | |
| 5,629,980 A * | 5/1997 | Stefik et al. | 705/54 |
| 5,752,020 A | 5/1998 | Ando | |
| 5,778,182 A | 7/1998 | Cathey et al. | |
| 5,794,217 A | 8/1998 | Allen | |
| 5,892,900 A | 4/1999 | Ginter et al. | |
| 5,903,880 A | 5/1999 | Biffar | |
| 5,905,976 A | 5/1999 | Mjolsnes et al. | |
| 5,956,736 A | 9/1999 | Hanson et al. | |
| 6,065,117 A * | 5/2000 | White | 713/159 |
| 6,098,056 A | 8/2000 | Rusnak et al. | |
| 6,119,229 A | 9/2000 | Martinez et al. | |
| 6,154,214 A | 11/2000 | Uyehara et al. | |
| 6,170,744 B1 | 1/2001 | Lee et al. | |
| 6,189,097 B1 | 2/2001 | Tycksen, Jr. et al. | |
| 6,205,436 B1 | 3/2001 | Rosen et al. | |
| 6,212,504 B1 | 4/2001 | Hayosh | |
| 6,330,544 B1 | 12/2001 | Walker et al. | |
| 6,341,353 B1 | 1/2002 | Herman et al. | |
| 6,372,974 B1 | 4/2002 | Gross et al. | |
| 6,378,075 B1 | 4/2002 | Goldstein et al. | |
| 6,389,541 B1 | 5/2002 | Patterson | |
| 6,574,609 B1 | 6/2003 | Downs et al. | |
| 6,578,078 B1 | 6/2003 | Smith et al. | |
| 6,591,260 B1 | 7/2003 | Schwarzhoff et al. | |
| 6,600,823 B1 | 7/2003 | Hayosh | |
| 6,629,081 B1 | 9/2003 | Cornelius et al. | |
| 6,662,340 B2 | 12/2003 | Rawat et al. | |
| 6,675,153 B1 | 6/2004 | Cook et al. | |
| 6,751,670 B1 | 6/2004 | Patterson | |
| 6,772,341 B1 | 8/2004 | Shrader et al. | |
| 6,868,392 B1 | 3/2005 | Ogasawara | |
| 6,871,220 B1 | 3/2005 | Rajan et al. | |
| 6,895,392 B2 | 5/2005 | Stefik et al. | |
| 6,895,395 B1 | 5/2005 | Stefik et al. | |
| 6,898,576 B2 | 5/2005 | Stefik et al. | |
| 6,910,179 B1 | 6/2005 | Pennell et al. | |
| 6,913,193 B1 | 7/2005 | Kawan | |
| 6,938,021 B2 | 8/2005 | Shear et al. | |
| 6,944,776 B1 | 9/2005 | Lockhart et al. | |
| 6,947,556 B1 | 9/2005 | Matyas et al. | |
| 6,947,571 B1 | 9/2005 | Rhoads et al. | |
| 7,010,512 B1 | 3/2006 | Gillin | |
| 7,016,877 B1 | 3/2006 | Steele et al. | |
| 7,020,626 B1 | 3/2006 | Eng et al. | |
| 7,028,009 B2 | 4/2006 | Wang et al. | |
| 7,069,234 B1 | 6/2006 | Cornelius et al. | |
| 7,103,574 B1 | 9/2006 | Peinado et al. | |
| 7,130,829 B2 | 10/2006 | Banerjee et al. | |
| 7,191,332 B1 | 3/2007 | Pankajakshan et al. | |
| 7,275,260 B2 | 9/2007 | de Jong et al. | |
| 7,318,049 B2 | 1/2008 | Iannacci | |
| 7,346,923 B2 | 3/2008 | Atkins et al. | |
| 7,392,226 B1 | 6/2008 | Sasaki et al. | |
| 7,401,221 B2 | 7/2008 | Adent | |
| 7,426,492 B1 | 9/2008 | Bishop et al. | |
| 7,444,519 B2 | 10/2008 | Laferriere et al. | |
| 2001/0008557 A1 | 7/2001 | Stefik et al. | |
| 2001/0026287 A1 | 10/2001 | Watanbe | |
| 2001/0032312 A1 | 10/2001 | Runje et al. | |
| 2002/0026445 A1 | 2/2002 | Chica et al. | |
| 2002/0029183 A1 | 3/2002 | Vlahoplus et al. | |
| 2002/0032646 A1 | 3/2002 | Sweeney et al. | |
| 2002/0038278 A1 | 3/2002 | Himmelstein | |
| 2002/0040346 A1 | 4/2002 | Kwan | |
| 2002/0062249 A1 | 5/2002 | Iannacci | |
| 2002/0082961 A1 | 6/2002 | Abrahm et al. | |
| 2002/0091643 A1 | 7/2002 | Okamoto et al. | |
| 2002/0091646 A1 | 7/2002 | Lake et al. | |
| 2002/0106081 A1 | 8/2002 | Yang | |
| 2002/0116471 A1 | 8/2002 | Shteyn | |
| 2002/0143703 A1 | 10/2002 | Razvan et al. | |
| 2002/0147929 A1 | 10/2002 | Rose | |
| 2002/0152126 A1 | 10/2002 | Lieu et al. | |
| 2002/0152173 A1 | 10/2002 | Rudd | |
| 2002/0184504 A1 | 12/2002 | Hughes | |
| 2003/0023561 A1 | 1/2003 | Stefik et al. | |
| 2003/0023564 A1 * | 1/2003 | Padhye et al. | 705/54 |
| 2003/0028489 A1 | 2/2003 | Williamson | |
| 2003/0061566 A1 | 3/2003 | Rubstein et al. | |
| 2003/0079122 A1 * | 4/2003 | Asokan et al. | 713/156 |
| 2003/0125965 A1 | 7/2003 | Falso | |
| 2003/0140034 A1 | 7/2003 | Probst et al. | |
| 2003/0159043 A1 * | 8/2003 | Epstein | 713/176 |
| 2003/0182142 A1 | 9/2003 | Valenzuela et al. | |
| 2003/0196087 A1 | 10/2003 | Stringer | |
| 2003/0208406 A1 | 11/2003 | Okamoto et al. | |
| 2003/0217006 A1 | 11/2003 | Roever et al. | |
| 2003/0229593 A1 | 12/2003 | Raley | |
| 2004/0039916 A1 | 2/2004 | Aldis | |
| 2004/0044627 A1 | 3/2004 | Russell | |
| 2004/0054630 A1 | 3/2004 | Ginter et al. | |
| 2004/0054915 A1 | 3/2004 | Jong et al. | |
| 2004/0113792 A1 | 6/2004 | Ireland et al. | |
| 2004/0128546 A1 | 7/2004 | Blakely | |
| 2004/0139207 A1 | 7/2004 | de Jong | |
| 2004/0196981 A1 | 10/2004 | Nakano et al. | |
| 2004/0199577 A1 * | 10/2004 | Burd et al. | 709/203 |
| 2004/0221045 A1 | 11/2004 | Joosten et al. | |
| 2004/0243517 A1 | 12/2004 | Hansen | |
| 2004/0267671 A1 * | 12/2004 | Nonaka et al. | 705/51 |
| 2004/0267673 A1 | 12/2004 | Ballard et al. | |
| 2005/0004875 A1 | 1/2005 | Kontio et al. | |
| 2005/0027804 A1 | 2/2005 | Cahill et al. | |
| 2005/0038707 A1 | 2/2005 | Roever et al. | |
| 2005/0038724 A1 | 2/2005 | Roever et al. | |
| 2005/0234860 A1 | 10/2005 | Roever et al. | |
| 2005/0246193 A1 | 11/2005 | Roever et al. | |
| 2005/0247777 A1 | 11/2005 | Pitroda | |
| 2005/0251452 A1 | 12/2005 | Roever et al. | |
| 2005/0273805 A1 | 12/2005 | Roever et al. | |
| 2006/0036447 A1 | 2/2006 | Roever et al. | |
| 2006/0167815 A1 | 7/2006 | Peinado et al. | |
| 2006/0170759 A1 | 8/2006 | Roever et al. | |
| 2006/0174350 A1 | 8/2006 | Roever et al. | |
| 2006/0259422 A1 | 11/2006 | Sutton et al. | |
| 2007/0016533 A1 | 1/2007 | Fujimura | |
| 2007/0286393 A1 | 12/2007 | Roever et al. | |
| 2008/0067230 A1 | 3/2008 | Silverbrook et al. | |

FOREIGN PATENT DOCUMENTS

| | | |
|---|---|---|
| JP | 2001-338242 A | 5/2000 |
| WO | WO03/098398 | 11/2003 |

OTHER PUBLICATIONS

U.S. Office Action mailed Jul. 27 2005, from related U.S. Appl. No. 10/232,861.

U.S. Office Action mailed Dec. 2, 2005, from related U.S. Appl. No. 10/232,861.

U.S. Office Action mailed Nov. 30, 2006, from related U.S. Appl. No. 10/232,861.

U.S. Office Action mailed Jun. 21, 2006, from related U.S. Appl. No. 10/232,861.

Final Office Action mailed Jun. 14, 2007, from related U.S. Appl. No. 10/232,861.

U.S. Office Action mailed May 22, 2006, from related U.S. Appl. No. 10/414,817.

U.S. Office Action mailed Nov. 28, 2006, from related U.S. Appl. No. 10/414,817.

U.S. Office Action mailed Apr. 30, 2007, from related U.S. Appl. No. 10/414,817.

U.S. Office Action mailed Dec. 22, 2005, from related U.S. Appl. No. 10/414,830.

U.S. Office Action mailed Feb. 7, 2007, from related U.S. Appl. No. 10/414,830.
U.S. Office Action mailed Dec. 20, 2005, from related U.S. Appl. No. 10/440,286.
U.S. Office Action mailed Jul. 13, 2006, from related U.S. Appl. No. 10/440,286.
U.S. Office Action mailed Jan. 30, 2007, from related U.S. Appl. No. 10/440,286.
Final Office Action mailed June 28, 2007, from related U.S. Appl. No. 10/440,286.
Office Action dated Oct. 3, 2008 from U.S. Appl. No. 11/094,784.
Office Action dated Dec. 3, 2008 from U.S. Appl. No. 10/873,840.
Office Action dated Dec. 27, 2007 from U.S. Appl. No. 10/440,286.
Office Action dated Nov. 18, 2008 from U.S. Appl. No. 10/440,286.
Office Action dated May 14, 2008 from U.S. Appl. No. 11/118,608.
Office Action dated Nov. 10, 2008 from U.S. Appl. No. 11/118,608.
International Search Report and Written Opinion dated Feb. 16, 2006 from PCT/US2005/021057.
International Search Report and Written Opinion dated Nov. 25, 2003 from PCT/US03/15614.
European Office Action dated Oct. 27, 2008 from EP Application No. 03726905.7.
International Search Report and Written Opinion dated Sep. 16, 2008 from PCT Application No. PCT/US07/10560.
N. Szabo, "Contracts with Bearer" http://szabo.best.vwh.net/bearer_contracts.html, 12 pages (1997).
Kuno et al., "A Digital Ticket Circulation Architecture, 58th Conference Collected Papers (4)", Information Processing Society of Japan, Japan, Mar. 11, 1999, pp. 4-295-4-296.
Office Action dated Sep. 15, 2009 from U.S. Appl. No. 10/873,841.
Office Action dated Mar. 27, 2009 from U.S. Appl. No. 11/096,284.
Office Action dated May 28, 2009 from U.S. Appl. No. 10/873,840.
JP Office Action dated Mar. 24, 2009 from JP Application No. 2004-505848.
Final Office Action dated Dec. 5, 2008 from U.S. Appl. No. 10/232,861.
Office Action dated Jun. 24, 2009 from U.S. Appl. No. 10/232,861.
Office Action dated Dec. 14, 2009 from U.S. Appl. No. 10/232,861.
Office Action dated Aug. 24, 2009 from U.S. Appl. No. 11/155,010.
Office Action dated Dec. 24, 2008 from U.S. Appl. No. 10/414,817.
Final Office Action dated Jun. 12, 2009.
Notice of Allowance dated Jan. 27, 2010.
Office Action dated Feb. 11, 2009 from U.S. Appl. No. 10/440,286.
Notice of Allowance and Issue Fee Due dated Dec. 24, 2009 from U.S. Appl. No. 10/440,286.
Office Action dated Jan. 28, 2009 from U.S. Appl. No. 10/439,629.
Final Office Action dated Apr. 16, 2009 from U.S. Appl. No. 11/118,608.
Office Action dated Mar. 16, 2009 from U.S. Appl. No. 11/146,399.
Notification Concerning Transmittal of International Preliminary Report on Patentability dated Jan. 11, 2007 from PCT Application No. PCT/US2005/021057.
Chinese Office Action dated Dec. 26, 2008 from CN Application No. 03816746.8.
Notification Concerning Transmittal of International Preliminary Report on Patentability dated Nov. 13, 2008 from PCT Application No. PCT/US2007/010708.
Notification Concerning Transmittal of International Preliminary Report on Patentability dated Jul. 10, 2008 from PCT Application No. PCT/US2006/048776.
G. Ahn and J. Lam, "Managing privacy preferences for federated identity management," in Proc. DIM '05: Proceedings of the 2005 workshop on Digital identity management, Fairfax, VA, USA, 2005, pp. 28-36.
Alladin/Preview Systems, "HASP SL," Alladin/Preview Systems. 2004.
K. Bohrer and B. Holland, "Customer Profile Exchange (CPExchange) Specification," International Digital Enterprise Alliance, Inc., Version 1.0, Oct. 20, 2000.
D. Burdett. RFC 2801: Internet Open Trading Protocol. [Online]. Apr. 2000. Available: http://www.faqs.org/rfcs/rfc2801.html.

Business.com. Preview Systems, Inc. Profile. [Online]. 2006. Available: http://www.business.com/directory/telecommunications/preview_systems_inc/profile/.
Cover Pages. Internet Open Trading Protocol. [Online]. Dec. 2002. Available: http://xml.coverpages.org/otp.html.
Cover Pages. IEFT Internet Open Trading Protocol Working Group Publishes RFC for Voucher Trading System . [Online]. May 2003. Available: http://xml.coverpages.org/ni2003-05-15-a.html.
Cover Pages. XML Voucher: Generic Voucher Language. [Online]. May 2003. Available: http://xml.coverpages.org/xmlVoucher.html.
B. Cox, J. Tygar, and M. Sirbu, "Netbill Security and Transaction Protocol," First USENIX Workshop on Electronic Commerce, Jul. 1995.
FlexTicket. [Online]. Available: http://info.isl.ntt.co.jp/flexticket/index.html.
K. Fujimura and D. Eastlake, RFC 3506: Requirements and Design for Voucher Trading System (VTS), United States: Network Working Group, Mar. 2003.
K. Fujimura, Y. Nakajima, and J. Sekine, XML Ticket: Generalized Digital Ticket Definition Language. 1999.
K. Fujimura, Y. Nakajima, General Purpose Digital Ticket Framework. Boston, Mass.: 3rd USENIX Workshop on Electronic Commerce, 1998.
K. Fujimura, H. Kuno, M. Terada, K. Matsuyama, Y. Mizuno, and J. Sekine, Digital ticket controlled digital ticket circulation. USENIX, 1999.
K. Fujimura, M. Terada, and J. Sekine, "A World Wide Supermarket Scheme Using Rights Trading System," in Proc. ICPADS '00: Proceedings of the Seventh International Conference on Parallel and Distributed Systems: Workshops, Washington, DC, USA, 2000, p. 289.
M. Iguchi et al. Voucher Integrated C2B and C2C Trading Model. May, 2002. [Online]. Available: http://wwwconf.ecs.soton.ac.uk/archive/00000272/01/index.html.
T. Hardjono and J. Seberry, Strongboxes for Electronic Commerce. Oakland, Calif.: 2nd USENIX Workshop on Electronic Commerce, 1996.
A. Josang, J. Fabre, B. Hay, J. Dalziel and S. Pope. "Trust Requirements in Identity Management." Australasian Information Security Workshop 2005.
M. Kumar, A. Rangachari, A. Jhingran, and R. Mohan, Sales Promotions on the Internet. Boston, Mass.: 3rd USENIX Workshop on Electronic Commerce, 1998.
K. Matsuyama and K. Fujimura, "Distributed digital-ticket management for rights trading system," in Proc. EC '99: Proceedings of the 1st ACM conference on Electronic commerce, Denver, Colorado, United States, 1999, pp. 110-118.
G. Medvinsky and B. C. Neuman, NetCash: A design for practical electronic currency on the Internet. Proceedings of the First ACM Conference on Computer and Communications Security, Nov. 1993.
M. Mont, S. Pearson, P. Bramhall "Towards Accountable Management of Identity and Privacy: Sticky Policies and Enforceable Tracing Services," Hewlett Packard, 2003.
OECD. (Jan. 27, 2006) OECD Guidelines on the Protection of Privacy and Transborder Flows of Personal Data [br] . [Online]. Available: http://www.oecd.org/document/18/0,2340,en_2649_201185_1815186_1_1_1_1,00.
G. Skinner, S. Han, and E. Chang, "A framework of privacy shield in organizational information systems," Proceedings of Int'l Conference on Mobile Business, 2005.
D. Stewart. The Future of Digital Cash on the Internet. [Online]. Available: http://www.arraydev.com/commerce/JIBC/9703-02.html.
M. Terada, H. Kuno, M. Hanadate, and K. Fujimara, Copy Prevention Scheme for Rights Trading Infrastructure, 2000.
M. Terada and K. Fujimara, RFC 4153: "XML Voucher: Generic Voucher Language," Network Working Group, Sep. 2005.
M. Terada. RFC 4154: Voucher Trading System Application Programming Interface. Sep. 2005. [Online]. Available: http://www.rfc-archive.org/getrfc.php?rfc=4154.
D. Weitzel "Liberty ID-WSF Implementation Guide" Draft Version 1.0-1.2, Liberty Alliance Project. 2004-2005.

US Navy: Military exchanges now offer best-price guarantees. M2 Presswire. Coventry: Jun. 4, 1998. p. 1 [recovered from Proquest May 17, 2006].

R.A. Hettinga, UNDRs and Bearer "other stuff" besides cash ( was Re: ESIGN Act), May 29, 2001.

Menezes et al., "Handbook of Applied Cryptography", 1997 CRC Press LLC, Section 1.7.

U.S. Office Action mailed Oct. 3, 2007, from related U.S. Appl. No. 10/414,817.

U.S. Office Action mailed Dec. 27, 2007, from related U.S. Appl. No. 10/440,286.

U.S. Office Action mailed Sep. 26, 2007, from related U.S. Appl. No. 11/118,608.

http://legalminds.lp.findlaw.com/list/cyberia-l/msg31650.html), Robert A. Hettinga, May 29, 2001.

http://www.nettime.org/Lists-Archives/nettime-1-0009/msg00214.html, Dr. Richard W. Rahn, Sep. 19, 2000.

Office Action in U.S. Appl. No. 10/873,840, dated Feb. 25, 2008.

Office Action in U.S. Appl. No. 10/232,861, dated May 15, 2008.

Office Action in U.S. Appl. No. 11/118,608, dated May 14, 2008.

Office Action in U.S. Appl. No. 11/118,608, dated Sep. 26, 2007.

Office Action in U.S. Appl. No. 10/414,817, dated Jun. 11, 2008.

Office Action in U.S. Appl. No. 10/440,286, dated Dec. 27, 2007.

International Search Report & Written Opinion PCT/US07/10708 dated Dec. 7, 2007.

International Search Report & Written Opinion for PCT/US06/48776 dated Feb. 20, 2008.

* cited by examiner

| Title Data Table | 526b |
| --- |
| Title A<br>　　Descriptor<br>　　Issuer<br>　　ValidPeriod<br>　　Owner<br>　　Content<br>　　Rules<br>　　Signature<br>　　Stub | 526b-A |
| •<br>•<br>• | |
| Title N<br>　　Descriptor<br>　　Issuer<br>　　ValidPeriod<br>　　Owner<br>　　Content<br>　　Rules<br>　　Signature<br>　　Stub | 526b-N |

FIG. 5

ABC's Profile

[Tabs: Personal | Business (1032) | Financial | Emergency | Preferences]

1030

☐ Company Name: [Company] — 1034
☐ Web Site: [http://www.Company.com] — 1036
☐ Work Phone #: [123-123-4567] — 1038
☐ Work Email: [abc@company.com] — 1040
☐ Job Title: [VP Engineering] — 1042
☐ Work Address (Street): [1234 Boulevard Drive] — 1044
☐ (City, State, Zip): [City] [ST] [12345] — 1046

[Submit Changes] — 1022

| TITLE DATA TABLE | |
|---|---|
| Title 1 - Currency | 1342 |
| Title 2 - Account | 1344 |
| Title 3 - Currency | |
| Title 4 - Sales Order | 1346 |
| Title 5 - Account | |
| ⋮ | |
| Title N - Payment Slip | 1348 |

| CONTACT TITLE TABLE |
|---|
| Contact Title 1<br>- Tag |
| Contact Title 2<br>- Tag |
| Contact Title 3<br>- Ticket |
| •<br>•<br>• |
| Contact Title N<br>- Tag |

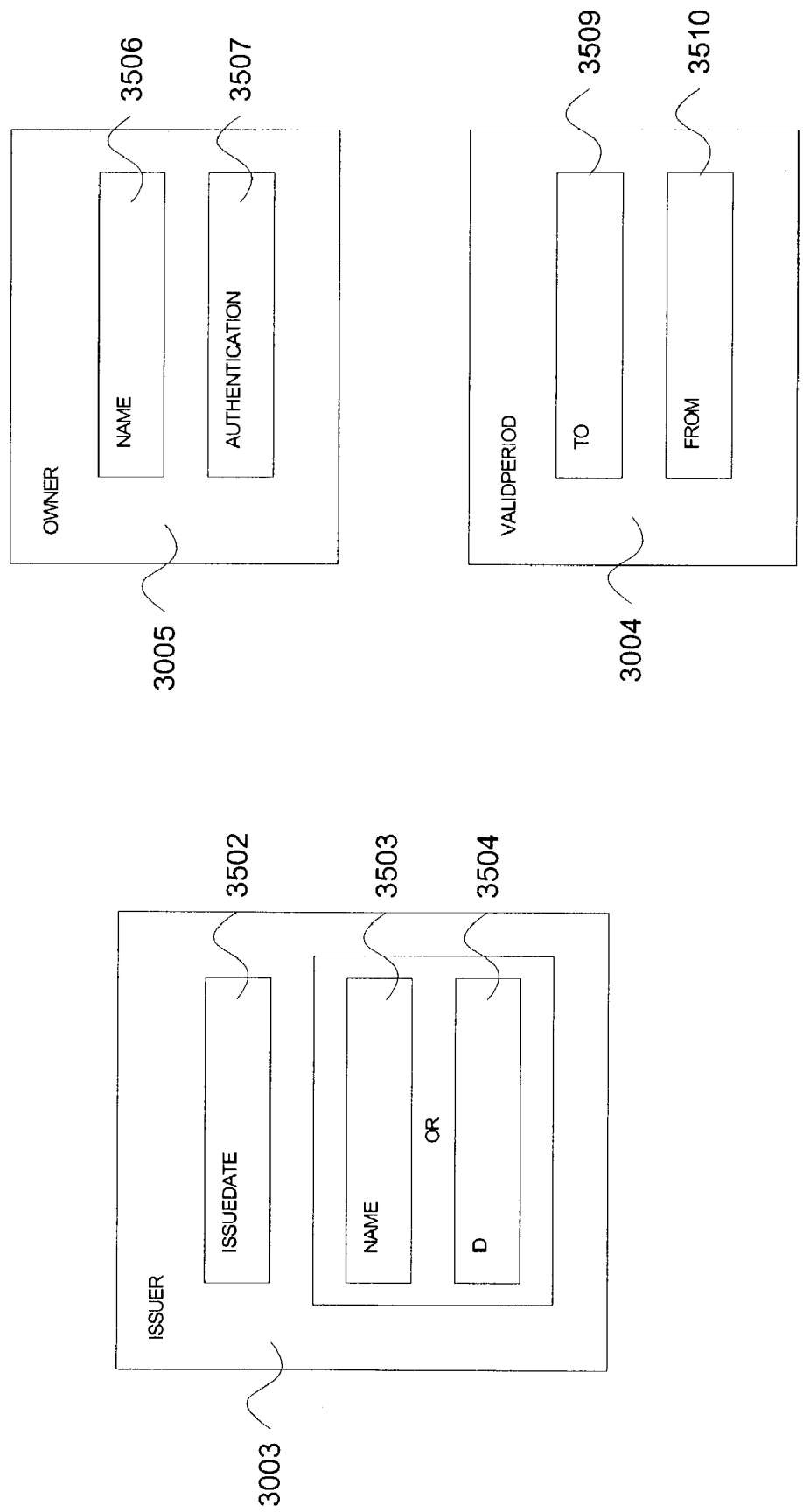

METHODS AND APPARATUS FOR TITLE PROTOCOL, AUTHENTICATION, AND SHARING

REFERENCE TO RELATED APPLICATIONS

This application is a continuation-in-part of U.S. Ser. No. 10/232,861 filed on Aug. 30, 2002.

This application claims priority to U.S. Prov. No. 60/380,787 filed May 15, 2002, U.S. Prov. No. 60/407,466 filed Aug. 30, 2002, and U.S. Prov. No. 60/407,382 filed Aug. 30, 2002.

TECHNICAL FIELD

The invention relates to an advanced title and transaction network. In particular, the invention provides an architecture and operation for the facilitation of the creation, ownership, exchange, management, reselling, marketing, bartering, and auctioning of titles over an electronic network such as the Internet.

BACKGROUND OF THE INVENTION

The Internet has become an efficient mechanism for globally distributing digital content, such as documents, pictures, music, and other types of digital content. Information can now be transmitted directly and instantly across the Internet from the content owner to the content buyer, without having to first convert it into physical form, such as paper documents, compact disks, photographs, etc.

However, the advantage of easy digital communication has also allowed digital content to be easily pirated by just about anyone with a computer and Internet access. The combination of high-speed broadband Internet access, digital content compression software (which reduces the size of digital content files), peer-to-peer file trading networks (which allows users to post content files), and lack of a viable digital rights standard, has caused the content owners to lose control of their content. Consequently, content owners are experiencing a loss of potential revenue.

The lack of a standardized and transparent digital rights management system, however, is preventing a commercially viable solution from emerging. In order for such a system to be commercially viable, the system should be secure both from the user's and the content owner's standpoint, universal so that electronic device manufactures are encouraged to engineer it into their products, and transparent so that users are not required to change their behavior.

Existing systems that attempt to provide confidence between buyers include escrow agreements, third party confirmations, third party appraisals and other similar techniques. These systems are slow and complex, and they do not provide the content user with sufficient confidence that the buyers and sellers are not illegally replicating the content or otherwise attempting to sell pirated copies of works.

In addition to the pirating aspects associated with sharing digital content, users are burdened with less than ideal methods for legally sharing digital content. These cumbersome methods include transferring entire files to other users via electronic mail, instant messenger, peer-to-peer and other applications, or sharing hyperlinks via electronic mail, instant messenger, and other applications. These methods can be viewed as counter productive, anti-social and even bothersome to the users that receive or attempt to share the content. Sharing of entire digital content such as music via electronic mail is a drain on resources and inefficient to the electronic mail servers, the network, and the receiving users. Sharing of hyperlinks can lead to broken links, complex URL (Universal Resource Locator) strings, and restrictions on the type of content that can be shared (i.e. linked to). Compatibility problems are widespread and create frustration when sharing digital content of a specific media type.

What is needed are advanced techniques for controlling the trading of digital rights so that the buyers are assured of an authentic copy, "fair use" is preserved for the copy, and content owners are fairly compensated. In addition, advanced techniques are employed to provide an easy, friendly, efficient, and adaptable method for users to share digital content.

SUMMARY OF THE INVENTION

The invention relates, in one embodiment, to a title management apparatus resident on a first computer including a memory for storing a control program and data, and a processor for executing the control program and for managing the data. The apparatus includes a title object resident in the memory including a title structure, the title structure further comprising a content element, a set of attributes, and a set of title object security indicia. The apparatus further includes an authorization structure configured to selectively redeem the content element based at least in part on the user security indicia, and further configured to use a set of protocols. The apparatus also includes a title management structure configured to associate a user with the title object based at least in part on the user data and the title attributes.

The invention relates, in another embodiment, to a title method of managing title objects in a first computer having a memory. The method includes configuring user data resident in the memory including a set of user security indicia. The method further includes configuring a title object resident in the memory including a title structure, the title structure further comprising a content element, a set of attributes, and a set of title object security indicia. The method also includes configuring an authorization structure configured to selectively redeem the content element based at least in part on the user security indicia, and further configured to use a set of protocols; and, configuring a title management structure configured to associate a user with the first title object based at least in part on the user data and the title attributes.

Advantages of the invention include the ability to easily and efficiently manage and share titles over a network such as the Internet.

BRIEF DESCRIPTION OF THE DRAWINGS

The invention is described with reference to the figures, in which:

FIG. 5 depicts exemplary title data according to an embodiment of the invention;

FIGS. 10A-B depict exemplary administrative user control displays according to an embodiment of the invention;

FIGS. 13A-E depict exemplary title data according to an embodiment of the invention;

FIGS. 24A-D depicts exemplary title data according to an embodiment of the invention;

FIG. 35A depicts an issuer component of a title element, according to an embodiment of the invention;

FIG. 35B depicts an owner component of a title element, according to an embodiment of the invention;

FIGS. 36-37A depict simplified diagrams of title object lifecycle management steps, according to an embodiment of the invention;

DETAILED DESCRIPTION OF THE PREFERRED EMBODIMENT(S)

Figure 1A:
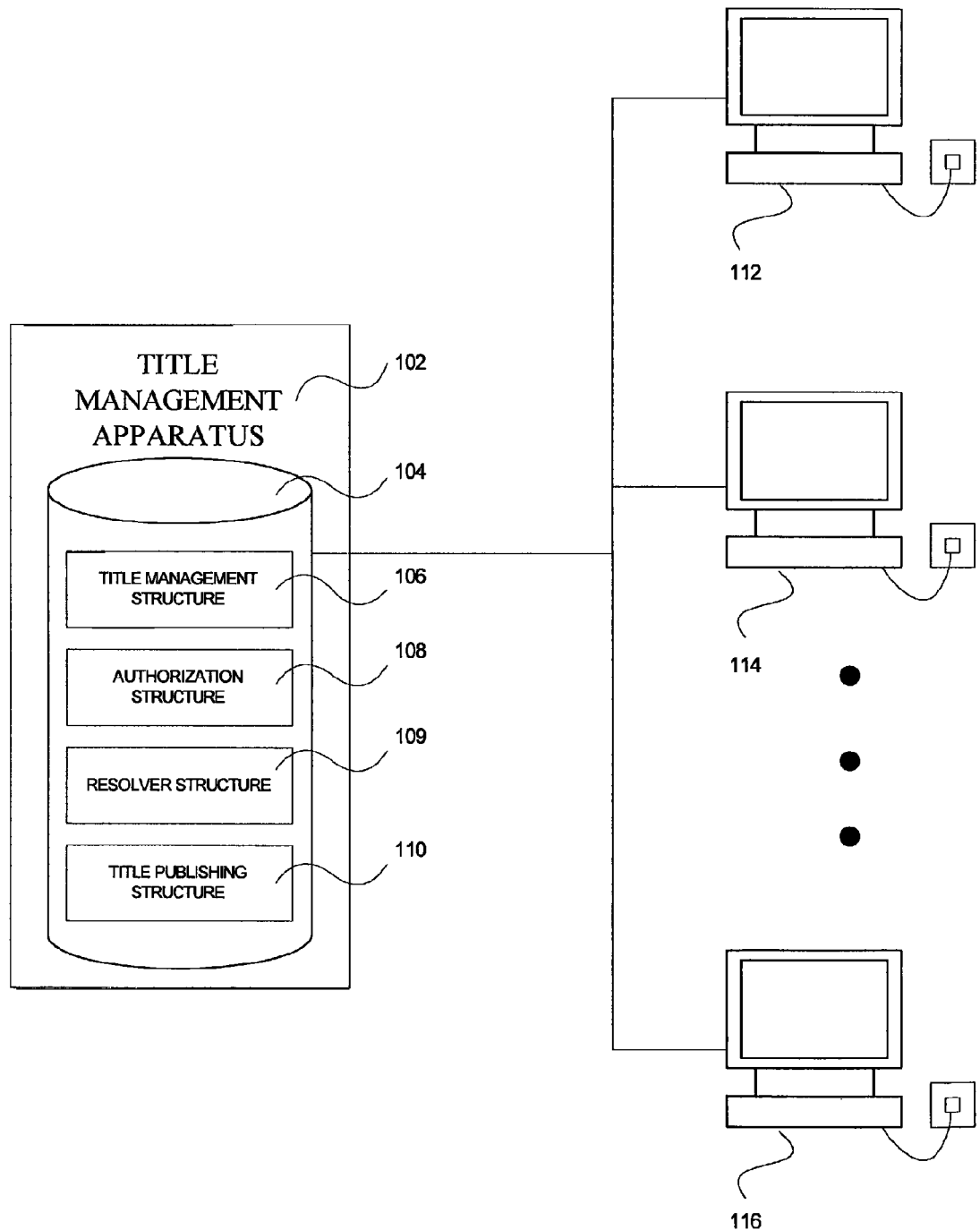
FIGS. 1A-3 depict a computer network and a title management apparatus according to an embodiment of the invention.

The invention is directed to the creation, ownership, exchange, management, reselling, marketing, bartering, and auctioning of titles.

In this context, a title is an object that may have a number of elements and attributes including embedded digital content, ownership attributes, copy permissions, and others as described herein. A title can also represent the rights to a single piece of digital content or a single resource, or it can represent the rights to a multitude of digital content and resources and in a variety of formats. The digital content rights, such as the ability to exchange or copy, are determined by the content publisher. Furthermore, a title can also represent the rights to another title or multitude of titles, which in turn express rights to digital content or resources.

Users can initiate a variety of exchanges with each other depending on the type of title and the rules associated with that title. These exchanges can take the form of trades or transfers. In the case of trades, offers can be reviewed, and then subsequently accepted, canceled, or a counter-offer can be presented. The counter-offer process can continue until satisfaction, or until trade is canceled.

In order to help protect the integrity of the trade, a chained hash cryptographic technique is used to guarantee that only a single instance of the title is in circulation at any one point in time. The title management and publisher structure may perform verification on the chained hash to ensure its integrity. The chained hash technique may be implemented in such a way as to provide benefits typically associated with one-time password and digital cash systems. However this implementation may be modified to provide a high degree of integrity around the use of titles within the ecosystem.

The chained hash technique can be combined with additional controls that work in conjunction with the security classification element to provide varying degrees of security for the title and the digital content referred to by the title. These additional controls may include cryptographic key-splitting techniques as well as multi-user and multi-factor authentication. Security class is an element that resides in the title to convey the level of security appropriate for this title. Security class is set by the publisher based on the publisher's requirements and rules. Security class can be used within the ecosystem to determine appropriate handling of the title. For example, a title with a high-security rating of 5 can force strong authentication of the user as well as strong encryption of the digital content associated with the title. As an example, a multi-user authentication requirement can be used for parental controls, whereby a guardian must also provide authentication (and acceptance) on the purchase and use of a title where a minor is involved.

The content rating system can be used by publishers to determine appropriate ratings for their content, and these ratings can be enforced by title management and resolver apparatus to ensure guardian approval. Content rating is an element within the content element to convey a rating regarding the suitability of the content. The rating system is dependent on the type of content and the regulatory factors involved (e.g. music, video, movie, etc.).

The exchange structure, specification, and rules provide the ability for the title publisher and/or the title owner to determine the exchange capabilities of subsequent owners of the title. For example, a title publisher could limit a title owner to only one trade, or even to deny trades but allow transfers. A title owner may transfer the title to another person for a limited period of time and deny that person any ability to trade or transfer. This ability to set limitations may operate in conjunction with the rules structure.

A trust structure is also implemented to provide users with a simple ability to validate the digital content they receive. The trust structure may convey that the digital content was (if applicable) rightfully issued by the content publisher. Content publishers are not bound to use the trust structure for the titles they issue but in doing so can provide assurances to the buyer.

The invention is described with reference to specific apparatus and embodiments. Those skilled in the art may recognize that the description is for illustration and to provide the best mode of practicing the invention. For example, references are made to computer servers and clients, but in a peer-to-peer network, any computer is capable of acting in either role. Likewise, reference is made to Internet protocol while any substantially comparable data transmission protocol can be used.

A. Architecture

FIGS. 1-4 depict a computer network and a title management apparatus according to an embodiment of the invention. In one embodiment, FIG. 1A depicts a title management apparatus 102 resident on a computer 104, comprising a title management structure 106, an authorization structure 108, a resolver structure 109, a title publishing structure 110 and a number of client computers 112-116 all coupled over a network (e.g. Internet), where each of the computers 112-116 may be owned by users of the system.

The users log on to title management apparatus 102 over the network and are authorized to perform certain functions and access certain data based on their ownerships and permissions, in order to manage, resell, market, barter or auction their respective titles. A digital content file stored within a content publishing structure 110 is redeemed through a pointer stored within is respective title. This pointer indicates the location of the digital content file. However, since this location could have changed since the title was created, a resolver structure 109 substitutes the updated digital content file address, if needed.

Redemption can occur in various ways. For example, the digital content file could be downloaded in its entirety, or it could be streamed to one of the client computers 112-116 and then viewed or listened locally. If the digital content file is already stored locally, redemption could allow access or playability. In the case of an online game or chat application, redemption of the digital content file could authorize participation.

Figure 1B:
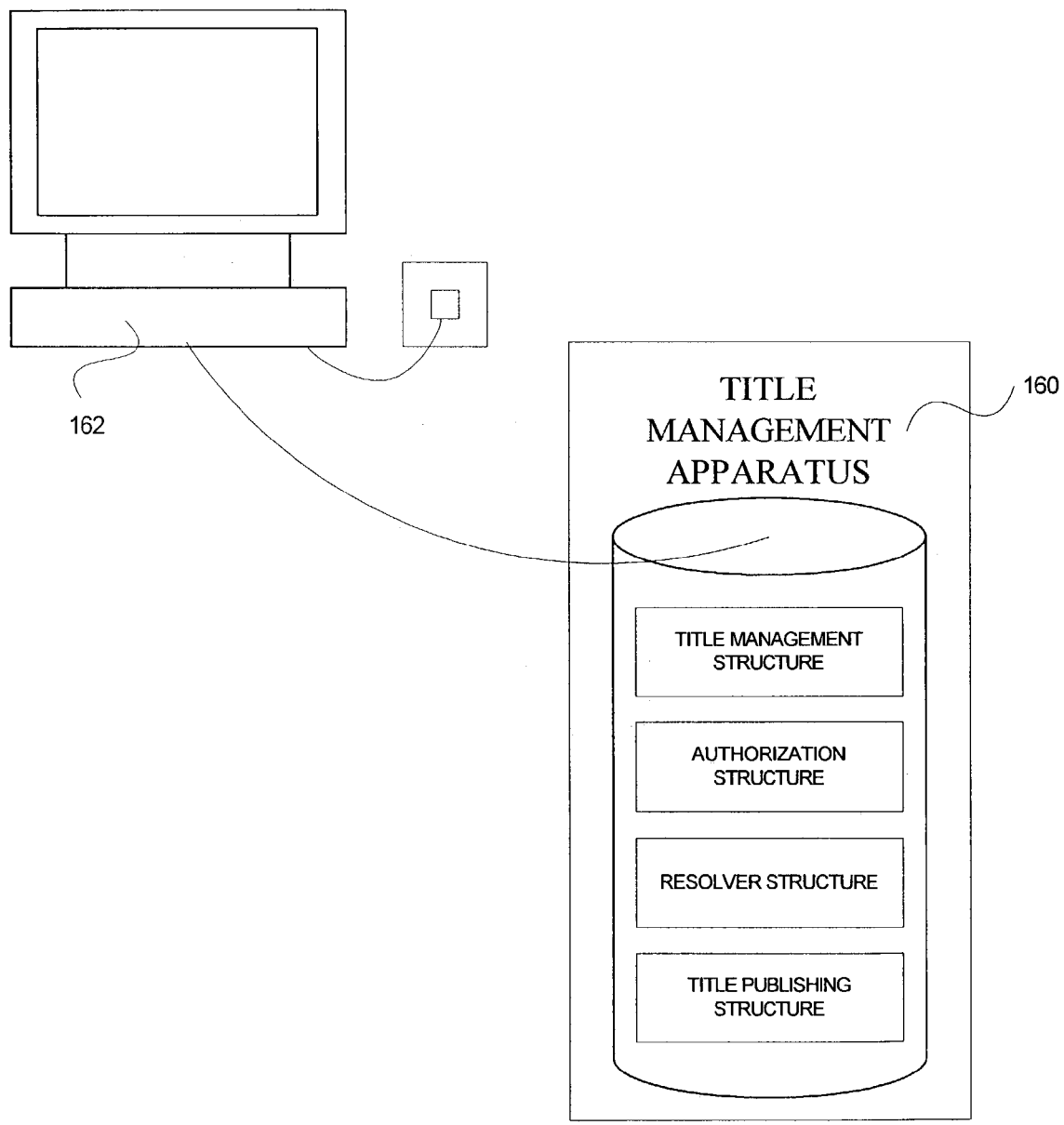

FIG. 1B depicts another embodiment in which the title management apparatus 160 is resident on a client computer 162. A user can log on to title management apparatus 160 directly without network access. As in FIG. 1A, the user is authorized to perform certain functions and access certain data based on their ownerships and permissions, in order to manage their respective titles. In this embodiment, redemption of a digital content file only occurs within the memory of client computer 162.

Figure 2A:
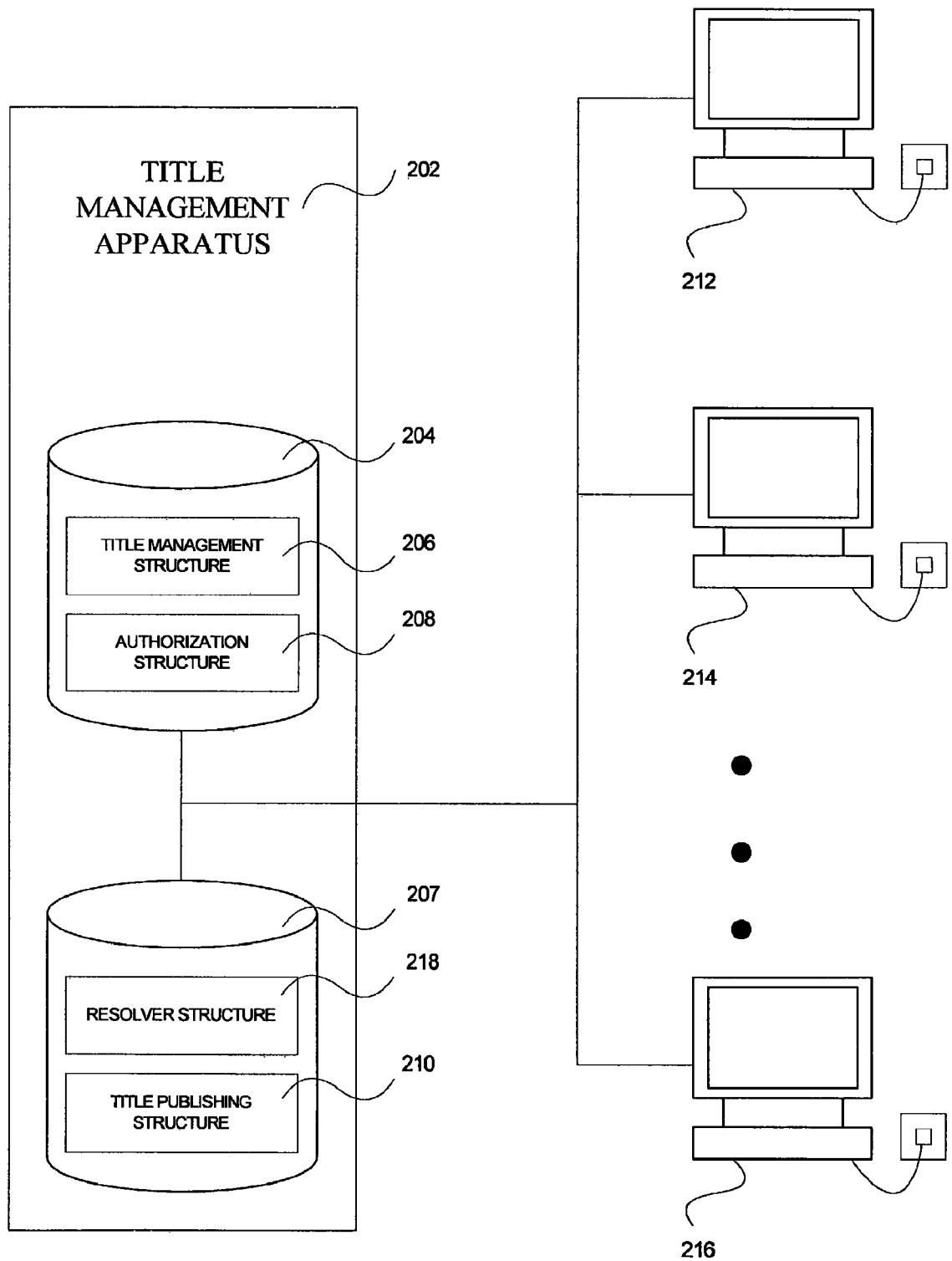

In another embodiment, FIG. 2A depicts a title management apparatus 202, wherein a title management structure 206 and an authorization structure 208 are resident on computer 204, while the content publishing structure 210 and a resolver structure 218 are resident on computer 207. Both computer 204 and computer 207 are coupled over a network to computers 212-216, which may be owned by users of the system. As in FIG. 1A, the users log on to title management apparatus 202 over the network and are authorized to perform certain functions and access certain data based on their ownerships and permissions, in order to manage, resell, market, barter or auction their respective titles.

Figure 2B:
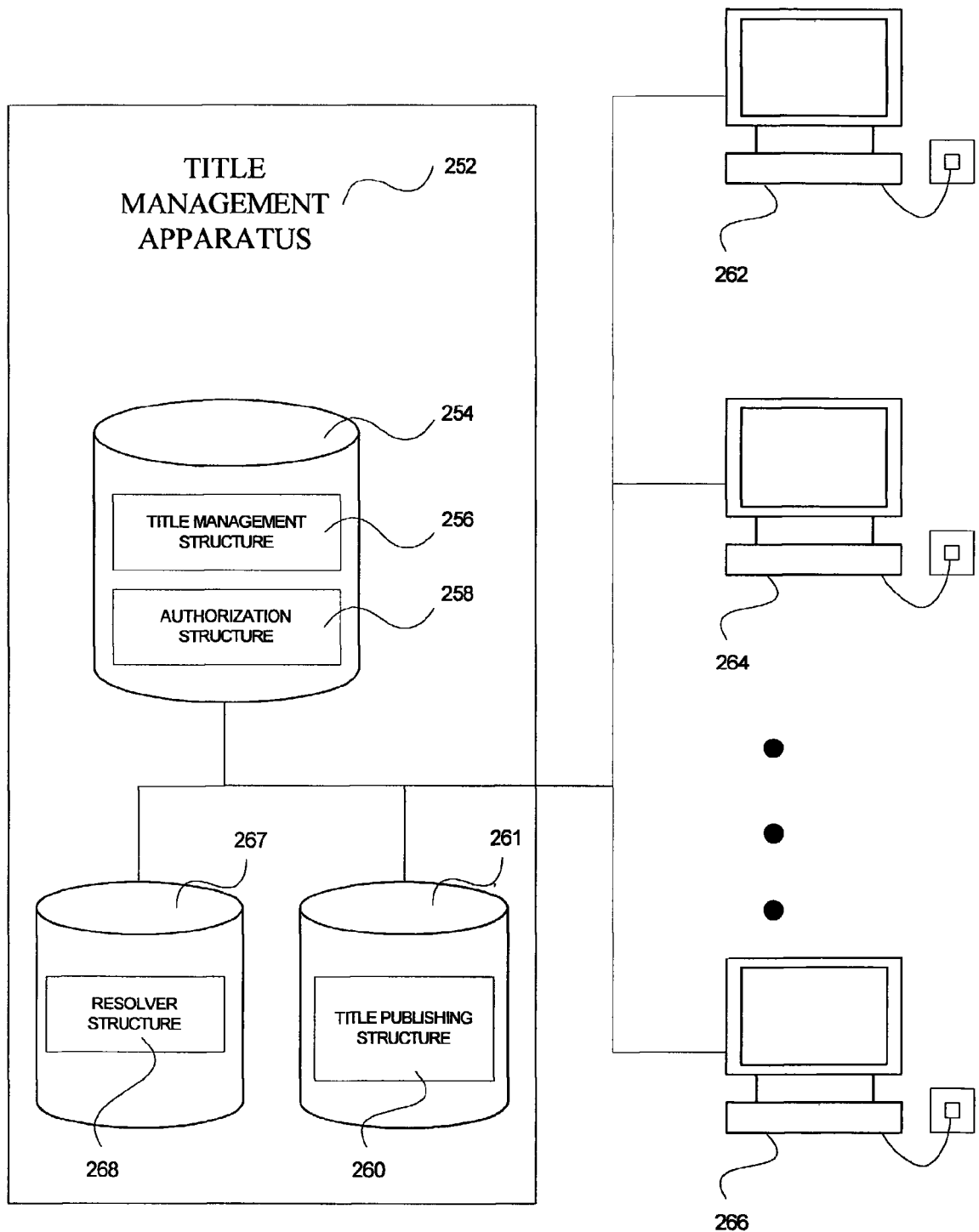

In another embodiment, FIG. 2B depicts a title management apparatus 252, wherein a title management structure 256 and an authorization structure 258 are resident on computer 254, while the resolver structure 268 is resident on computer 267, and the title publishing structure 260 is resident on computer 261. Computers 254, 267, 261 are coupled over a network to computers 212-216, which may be owned by users of the system. As in FIG. 1A, the users log on to title management apparatus 252 over the network and are authorized to perform certain functions and access certain data based on their ownerships and permissions, in order to manage, resell, market, barter or auction their respective titles.

Figure 3:
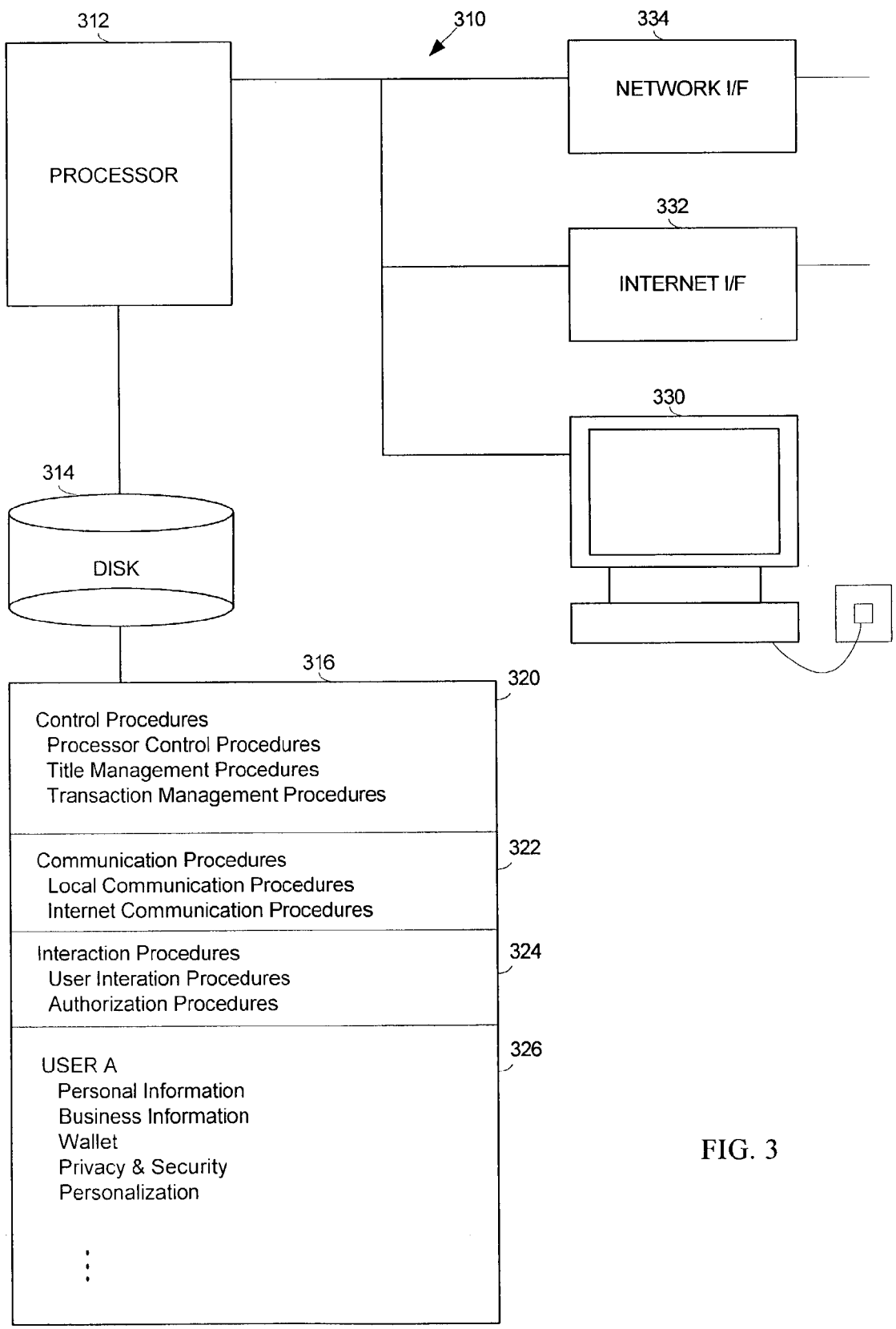

FIG. 3 depicts the computer 310 for performing the invention according to an embodiment of the invention. The computer includes a processor 312 coupled to a memory 314. The memory contains a data structure 316 further comprising a plurality of software structures including control procedures 320, communication procedures 322, interaction procedures 324 and data 326. The processor is further coupled to a user interface 330, an Internet communication interface 332 and a network interface 334.

Figure 4:
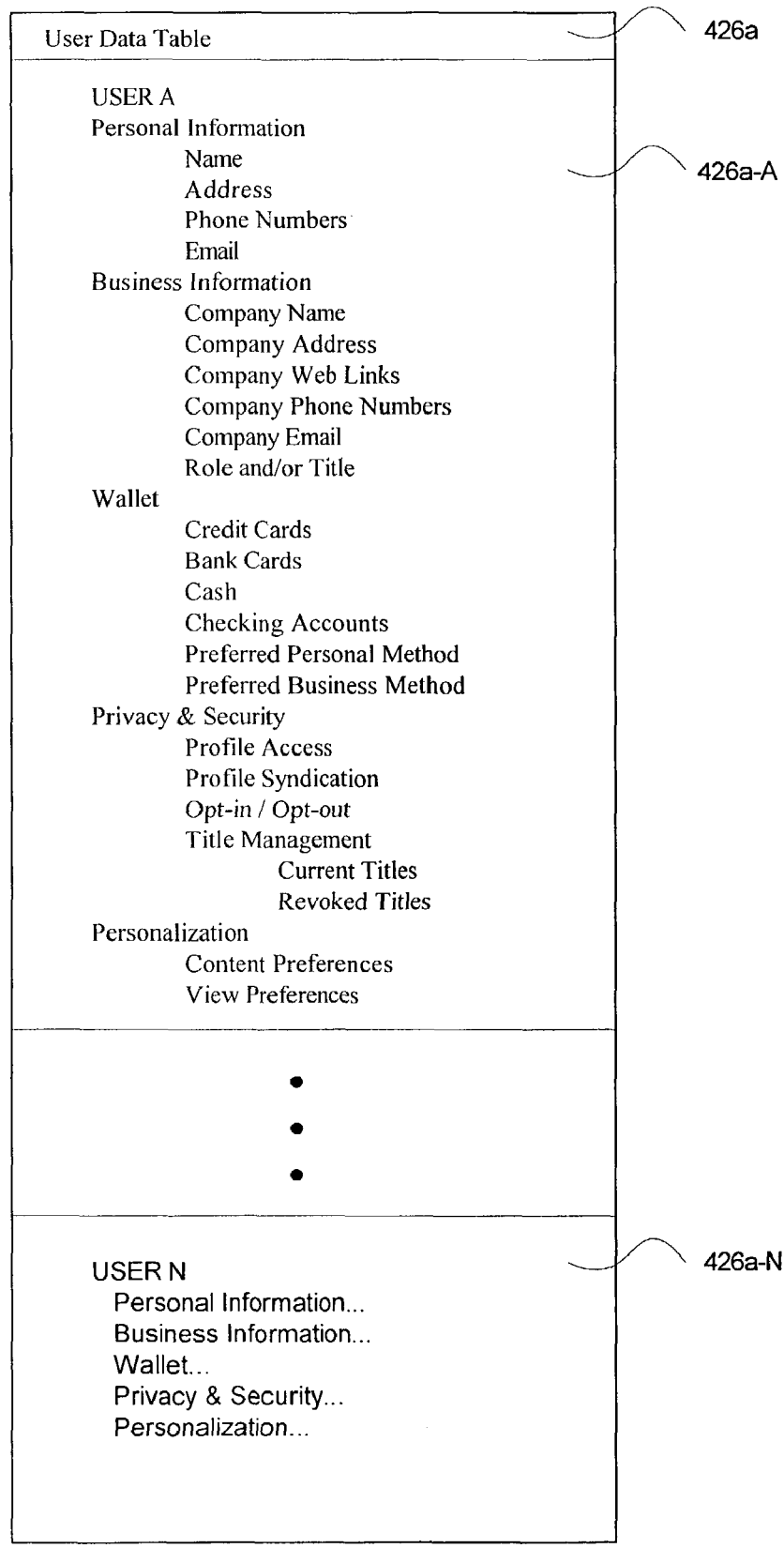
FIG. 4 depicts exemplary user data according to an embodiment of the invention.

FIG. 4 depicts exemplary user data 426a according to an embodiment of the invention. The user data has a number of elements for each user 426a-A to 426a-N, including personal information fields, business information fields, wallet fields, privacy and security fields, and personalization fields. The personalization fields can be set by the user for controlling the user environment, for example, the default color scheme for the graphical user interface, the type of interface skin, and the background image. Profile information maintained on the user can include, for example, the financial information, emergency contact, medical information, and work related information. The user data and profiler are extensible to support the needs of the title transaction system (and the ecosystem).

The title transaction system may provide the ability for users to manage their profile information and to generate titles for accessing profile information. For example, this functionality can be used by someone to easily create a business card title and distribute that title to their associates. The title in this case would be a tag that refers (that is, points) to their "business card" profile elements containing (as an example) their name, title, business address, and business contact information. In an other example, some else could create an emergency profile card and distribute it to specific people so that in an emergency they would have access to certain personal information such as name, medical insurance number, allergies, health risks, and emergency contacts. In this particular case, the title could be a ticket. The title transaction system provides for close integration of profile information to provide significant value add for the user as they participate in a community where communication, purchasing, trading, auctioning, and bartering are common place.

FIG. 5 depicts exemplary title data 526b for a title object. The title data has a number of fields for each title including header fields, titleowner fields, content parts fields, titlerules fields, and tagged fields, for example, XMLDSIG fields. The title object can be a type such as a tag, token or ticket.

As depicted in FIG. 5, the title object has at least one stub object associated with it in order to verify the integrity and valid instance of the title. In addition to identifiers, the stub object may contain security indicia, such as the indicia required by the chained hash technique, in order to validate the single instance and valid ownership of the title. This stub object may change state on every redemption, exchange, and revocation of the title.

The title object may have more than one stub object associated with it in order to convey additional information, controls, content, or other value-add not explicitly given in the original title. The stub object provides extensibility to the title without requiring a complete replacement to the title object. As an example, a value-add reseller such as a retail merchant may attach additional content or value to the original title in order to promote their product or even to make the original title more attractive for sale or trade. In another example, an additional control stub maybe attached to the original title in order to ensure appropriate handling of the title for use by minors, such as ensuring that only an edited version of the content is viewed. The use of the stub object is flexible to ensure extensibility of the title object.

As depicted in FIG. 5, the stub object can contain a digital signature element in order to verify the integrity of the stub. Although the stub is viewed as an extension to the title, the stub can be digitally signed by any participant in the ecosystem. This permits a flexible architecture where multiple participants can collaborate on adding value to a title object.

The system employs a set of specification and rules for structuring, creating, managing, handling and using titles. The specification and rules, as well as the format of the title, are extensible to support the needs of both the user and content publisher, as well as the needs of intermediary systems within the ecosystem that handle (or interact) with titles.

In the exemplary embodiment, a tag is a title object that can be copied among users, a token is a title object that cannot be copied like a tag, but can be transferred or exchanged between users, and a ticket is a title object that is issued to a specific user, and hence cannot be copied or transferred among users.

B. Logical Structure and Operation

Figure 6:
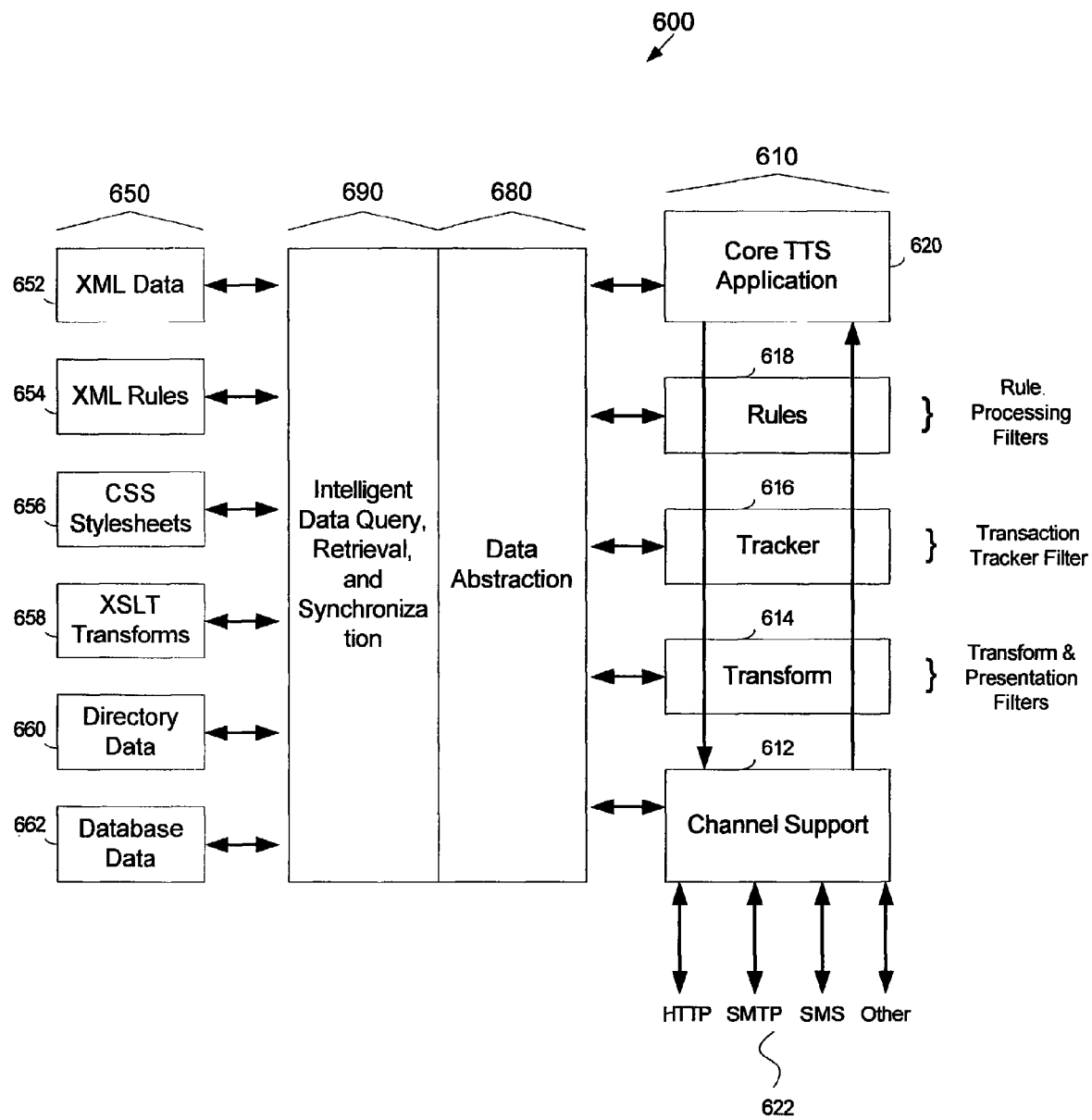
FIG. 6 depicts a logical structure of the invention according to an embodiment of the invention.

FIG. 6 depicts a logical structure 600 of the invention according to an embodiment of the invention. The primary parts of the logical structure are the processing portion 610, the data portion 650 and the data abstraction portion 680. As shown, the processing portion 610 communicates with the data portion 650 through the data abstraction portion 680. FIG. 6 represents the primary model for implementation and deployment of the title transaction system, however the design is intended to be modular in that components can be eliminated or modified as required by the environment and requirements. The implementation of the title transaction system can take many shapes and forms. For example, this model maybe modified to permit operation of certain TTS components within a limited resource computing device such as a mobile phone. In another example, a fixed implementation may eliminate certain abstractions when knowingly operating in a static environment with a limited set of titles. In another embodiment, the TTS comprises sub-systems within other applications to support titles and transactions (i.e., media players such as Microsoft Media Player and Winamp, Microsoft Outlook, etc.)

A channel support structure 612 is responsible for communicating with users and is associated with the communication procedures 622. The channel support 612 communicates over the network using a number of possible protocols including HTTP (hyper-text transfer protocol), SMTP (simple mail transfer protocol), SMS (short messaging service) and others.

The title protocol may define a standard set of protocol bindings to describe how title transactions are communicated across those protocols. However the title protocol specification may define extensions so that the title protocol can be bound to other underlying protocols as required within the ecosystem. When an inbound message is received by the channel support 612, the message is passed along to a number of other structures that decode, transform and interact with the message. For example a transform structure 614 performs a transform on the inbound data request to conform it to a normalized application interface for a core title transaction application. The use of the transform layer at this point provides standardized parsing of the transaction as it proceeds through the pipeline to the core title transaction application. A tracker 616 acts as a transaction filter to maintain a log of all the inbound messages and requests. A rule structure 618 then applies a number of possible rules to the message. The rule structure obtains its rule sets from several sources including the title itself (as defined in the title format), data storage through the data abstraction portion, and extensions that can support the retrieval of rules through other sources such as via the network. The rules include characteristics for each title, for example, whether it can be refunded, exchanged, played viewed, etc. Often, the functions that can be performed on a given title are related to the title type. For example, in the exemplary embodiment, titles of type tag can be freely distributed to all users, titles of type ticket are tied to a specific user and cannot be exchanged, and titles of type token can be exchanged with other users. When a title of type token is exchanged with another user, the user can no longer redeem that title, and the system may disable any offline content associated with the title.

For instance, the content element within a title can contain an encrypted password that is not known to the user. A program for viewing or playing the offline content, such as Windows Media Player, would read the title through an application program interface, check the rule sets, and then execute content, such as an MP3 file, using the encrypted password. Once a user exchanges the title with another user, the rule sets would be modified to reflect that that the user no longer has rights to the content, and the content itself could not be played or viewed.

The rules associated to the title are developed and applied by the content publisher and by the user (or someone acting on behalf of the user). The title management and title publisher modules may provide an application and interface to easily develop and apply rules to the titles. For example, a content publisher may apply usage rules applicable to the title and the digital content and/or resource it provides evidence of rights to. In turn, a user may apply default rules within the title management module to assist in controlling and protecting their actions related to certain titles (for example, to prevent from accidentally trading a valuable title). In another example, a parent may establish restrictions on the type of content their child may access and use in their title management module.

Specialized rules, called triggers, may also be used. Triggers are rules that invoke actions that are external to the title management apparatus. For instance, a parent can be notified by email that a child wishes to redeem a digital content file for which there is some age restriction.

Specialized rules, called timers, may also be used. Timers are rules that invoke actions based on a specific time or based on a spent amount of time. For example a title may only be good for twenty four hours, or an exchange may only be valid for one week. Timers maybe combined with triggers in rule processing.

The core title transaction application 620 (core TTS) is the application that verifies the ownership of the titles by the users and that authenticates the titles and selectively permits the titles to be transferred if such rights are allowed. Among the modules that may be contained within the core TTS application are the following:

(a) A title manager module performs management functions on titles such as organizing, deleting, adding, transferring, trading, copying, backing up, viewing, and redeeming. In addition to basic title functionality, the title manager module can provide sophisticated and value-add features to allow the user a better online experience such as chat where real-time redemption and trading are available during the chat session. Furthermore, features such as sorting categorizing, searching and notify can be made available to the user. As an example, a sophisticated search capability can be implemented whereby the user can search the network for other users, titles available for bid, transaction makers, or even a secure and trusted third party lockbox with which to conduct a trade. This sophisticated discovery process may be an integral part of the TTS ecosystem. The title manager module is the primary application component that the user may interact with on a regular basis. The title manager module maybe designed to be a single-user or multi-user application depending on the specific use of the module. A single-user version can be used in a peer-to-peer network, whereas a multi-user version can be deployed with consumer aggregators. The title manager implements a lockbox feature that is responsible for securely executing trades between two parties. The lockbox provides storage for titles being traded and provides a secure environment where users can verify trades, view samples, and accept a trade. Upon acceptance of the trade by all parties involved, the lockbox may execute the trade and provide each party with an updated title and stub object-pair that evidences their new rights. The lockbox feature of the title manager can be implemented as a standalone service so that a trusted third party can provide secure execution of trades.

(b) A transaction tracker module performs the basic task of tracking all inbound and outbound transactions whether successful or not. The tracker module is configurable by the user to determine the level of tracking to be performed based on the user's requirements. The tracker may be used to provide a record of all transactions performed by the user such as trades and transfers. The tracker may be used by all core TTS components for creating a record of all transactions (for example, those performed by the resolver and content publisher). The tracker may record transactions in a data repository using the data abstraction portion.

(c) A rules builder module performs the task of building rules to be associated with the titles and processing of the titles. The rules builder module may provide an easy to use interface for the user to create and build rules that can be embedded within a title or used during the processing of a title. Rules that are not embedded within a title may be stored in a data repository using the data abstraction portion. The rules builder may provide an extension capability to apply rules developed external to the rules builder ensuring the adaptability of title processing.

(d) A title resolver module that the important task of resolving all titles presented. This process involves all applicable tasks to the title presented including verifying integrity of the title, validating the title, ensuring ownership of the title, decoding and decrypting the necessary title elements and retrieving the content or resource requested. The title resolver may be responsible for executing and acting upon rules and triggers that are applicable to the title presented. An additional function of the resolver would be to refresh old titles. For example, if information contained within a title became outdated, this information could be automatically refreshed either by replacing the title completely or by adding a new stub object that updates the information. In addition, the title resolver may invoke additional processes as required such as the CODEC module.

(e) A state server module that maintains and verifies state associated with the use of titles throughout the ecosystem. The state server may work in conjunction with the title resolver in order to verify the validity of the title and generate new stub objects associated with the title on every redemption and exchange. The state server may be a high-capacity, high-availability, and high-performance system that can be widely distributed and chained in order to perform fast validation for titles in use. The state server may perform functions and algorithms associated with the chained hash, one-time password, and key-splitting techniques.

(f) A title publisher module performs the tasks associated with publishing (that is, creating new titles). The title publisher provides an easy to use interface for a user to identify, organize, and group new content (or resources), and then generate a new title or title template that points to that digital content or those resources. Titles can be generated on the fly and immediately by the title publisher which would then invoke the title manager to store the newly generated titles. Alternatively, the title publisher can generate new title templates that would describe the contents of the title but would not immediately generate a title. Title templates could be used in a variety of ways by the content publisher, for example by the content publisher's online shopping site to automatically generate titles when a buyer purchases new content. The content publisher stores work in progress (such as grouped publishing efforts) in a data repository using the data abstraction portion. Title publishers may provide sophisticated functionality to enhance the online experience for content publishers such as organizing content and title publishing into projects, sharing projects, and allowing community projects. Workgroup and workflow capabilities can be built into the title publisher as well as creating single-user and multi-user versions. As an example, a multi-user version can be implemented by a consumer aggregator or service provider in order to perform title publishing activities on behalf of a user community. Enhanced features may provide additional value to people using the title publisher such as verifying pointers to content files and resources, automatically obtaining icons, and even pushing titles and content out to servers.

(g) A rating system module performs rating tasks on transaction records to support billing requirements. The rating system may be flexible to support the variety of billing options required within the ecosystem. The rating system may act on transaction data but may maintain separation between the data sets to ensure integrity of the transaction log.

(h) A CODEC module performs coding and decoding functions on the content retrieved by the title resolver. The primary purpose of this module is to encapsulate content in a secure package as determined by the security required of the title and established by the rules. For example, this module can perform digital watermarking of music and image content, and it can also be used to encrypt the content in a traditional digital rights management package. Additionally, the CODEC can be used by the resolver to decode contents within the title before processing by the resolver. The CODEC may provide mechanisms to support these functions as required within the ecosystem.

(i) A billing interface module provides an interface to the billing system operated by the user or entity running any of the core TTS components or modules.

(j) A transaction viewer module provides an interface for the user to view transactions recorded by the transaction tracker.

(k) A content interface module performs the tasks associated with retrieving the content. This module may generally be invoked by the resolver. The content interface module may be extensible to support a variety of content and resource systems in use by content publishers.

(l) A synch & replication module performs synchronization and replication across components and modules within the TTS system. This is required for a number of functions including (but not limited to) synchronization and replication of transaction log entries, synchronization of titles across title management modules in a highly distributed environment, and replication of title databases to support redundancy and high-availability.

(m) A crypto interface module performs symmetric and asymmetric cryptographic functions as required within the TTS ecosystem.

(n) An authentication and authorization module performs the type authentication and authorization required by (and specified by) the title or other ecosystem configurations. Authentication may not be required in certain instances, or can be as simple as providing an identifier for "free" use. Strong authentication may be required for other instances and may be enforced by the ecosystem components. Strong authentication can take the form of two-factor such as Smartcard and PIN, or via mobile phone using a SIM card and a PIN, or via any other supported method such as a SecurID token card. In basic form, authentication may be a username and password. Authorization may provide fine-grained access control to core TTS applications as well as to use titles within the ecosystem. Authorization may be based on rules established within titles and configured as part of the implementation of core TTS applications.

(o) A payment interface module provides an interface to a payment system operated by a user or entity of the core TTS components and modules. This permits real-time and batch processing of payment requests as configured by the user or entity.

(p) A cache management module performs basic caching functions of the content or resources retrieved by the title system. This function may provide performance benefits using cached content versus retrieving new content on every request for the same content.

(q) A user registration module performs registration of new users into the core TTS components and modules. This may be used to establish new users in a single user environment such as peer-to-peer, as well as establish new users in a multi-user environment such as that hosted by a consumer aggregator. A consumer aggregator is an entity that provides services to a consumer base (i.e., ISP, mobile operator, etc.).

(r) A transaction maker module performs transaction maker functions such as operating an exchange for the sale of titles, perform licensing of content represented by the titles, maintaining a book of trades, closing and clearing trade transactions, and performing additional value add as determined by the market.

(s) An intelligent data retrieval and query module integrated with the data abstraction portion in order to perform intelligent searches and queries on a variety of data in a variety of disparate locations. The IDRQ module can combine, map, and match data before presenting it to requesting applications through the data abstraction portion. Persistence and caching can be developed into the IDRQ module to enhance performance on multiple and frequent queries/searches.

(t) A web crawler module performs searches on the web to catalog content and provide a mechanism to automatically generate titles that represent the content that has been discovered. The web crawler module can be used statically or dynamically executed based on configuration of the implementation and/or on inbound requests. The web crawler module could interface with the intelligent data retrieval and query system attached to the data abstraction layer for intelligent searches and retrieval of web content.

(u) A discovery mechanism that can be used by all appropriate modules for discovering TTS resources that may be available on the network. The discovery mechanism may allow TTS modules to participate in a peer-to-peer environment as well as collaborate on activities. The discovery process can ensure that trust third parties are available for conducting secure transactions and well as simplifying the user and content publisher experience for clearing titles through the ecosystem.

In the outbound stream from the core TTS, the rules structure 618 then performs certain functions on the outbound information according to rules stored in the data 650 and/or embedded in the title. The tracker 616 checks to ensure that the outbound information matches the inbound requests so that no inbound messages are dropped or ignored and that outbound message are responding to legitimate inbound messages. The tracker may log transactions in accordance with the configuration. The transform 614 converts the outbound information from a normalized format into a format that conforms to a user profile or preference, as well as based on incoming requests for particular transforms. For example, the data can be transformed into WML for display on a WAP enabled phone, or into HTML for display on a web browser. Certain transforms can be executed based on rules established within the system. The profile or preference data as well as the transform templates are retrieved from the data portion 650 in order to perform the transform. Finally, the channel support 612 communicates with the user of the network in a native protocol format.

Figure 7:
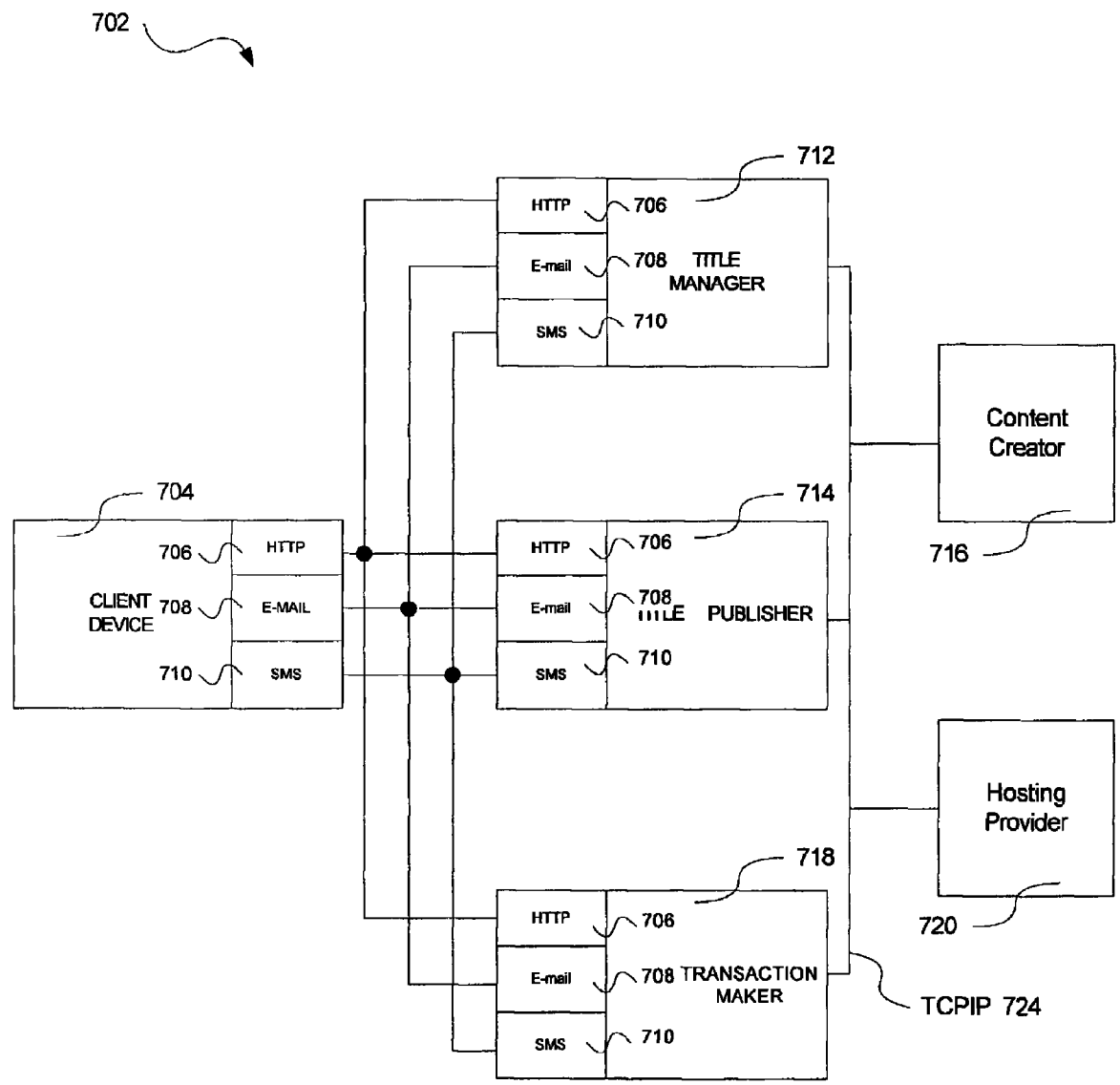
FIG. 7 depicts a logical structure of the invention as deployed in an ecosystem according to an embodiment of the invention.

In another embodiment, FIG. 7 depicts a logical structure of the invention as deployed in an ecosystem according to an embodiment of the invention. The ecosystem 702 is comprised of a number of entities, each providing a service of benefit to the overall system, and each connected to the other using some type of network protocol.

The title manager 712, content publisher 714, transaction maker 718, content creator 716, and hosting provider 720 are coupled to each other using a network protocol 724 such as TCPIP over the Internet. The client device 704 can be coupled to title manager 712, content publisher 714 and transaction maker 718 using any one of a number of network protocols. Among these are HTTP 706, E-Mail (SMTP) 708, and SMS 710.

Figure 8A:
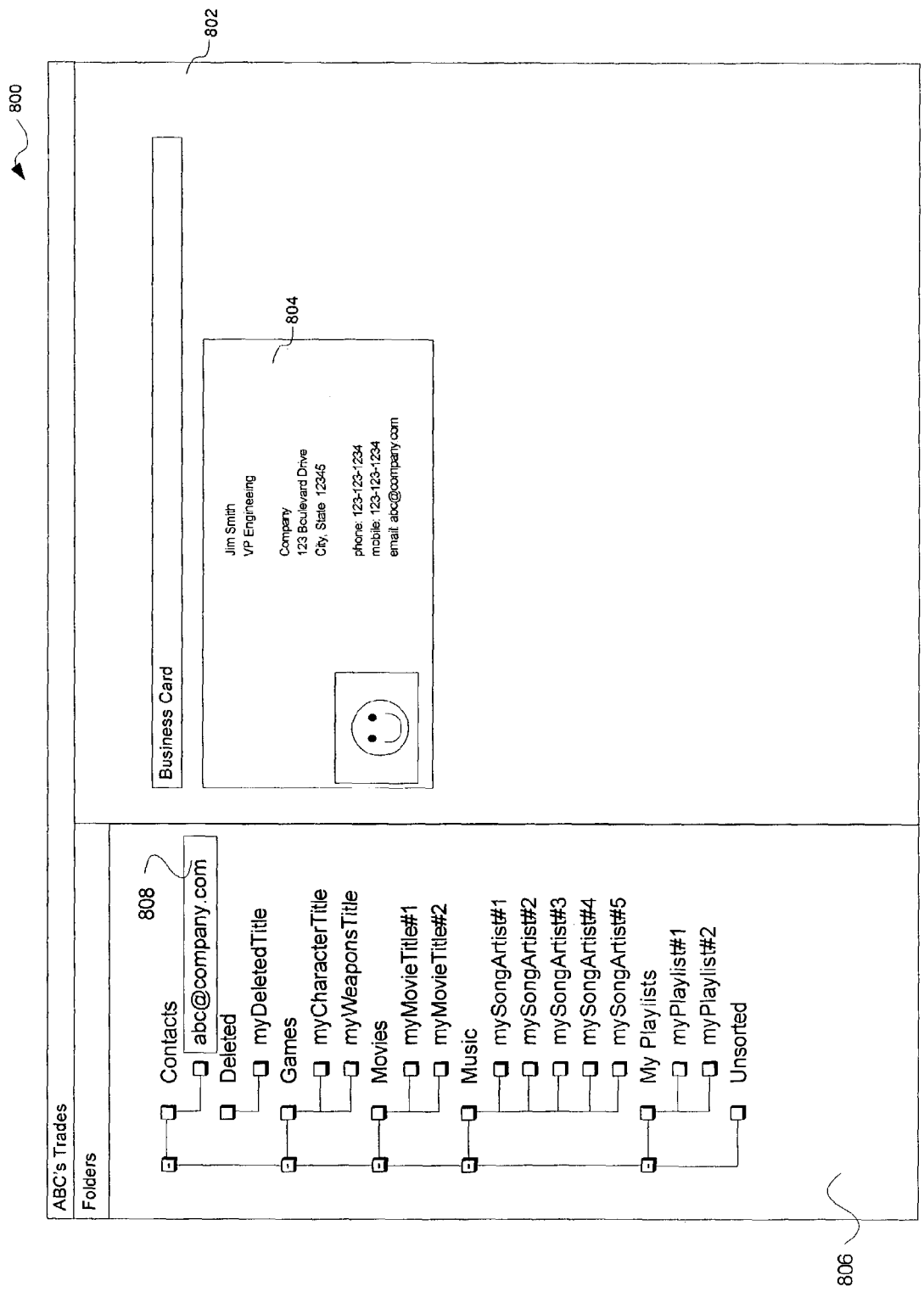
FIGS. 8A-E depict exemplary title management displays according to an embodiment of the invention.

Initially, the content creator 716 creates a digital content file, such as an MP3 song, as well as a title associated with the digital content file. The creating user interacts with a display as shown in FIG. 8A and described in detail below. The digital content file is transmitted across the network protocol 724 to hosting provider 720, where it is stored until a content publisher 714 desires to make it available to users with a client device 704. The content creator also transmits the title to the title manager 712 using network protocol 724.

Users desiring the digital content file may access the transaction maker 718 using the client device 704. Transaction maker 718 functions as a marketplace where digital content buyers and sellers can transact with each other in a secure environment. When a user agrees to buy the digital content file from a seller, in this case the content publisher 714, the transaction maker 718 communicates this to the title manager 712, which in turn, modifies the title of the digital content file with the new rights just purchased by the user. The user can now redeem the digital content file from the content publisher 714 and download it to the client device 704.

If the user desires to transfer the title to a new user, and the title's security indicia allows it, the user can become a digital content seller and post an offer to transfer the title on transaction maker 718. As before, when a new user agrees to buy the digital content file from the user, the transaction maker 718 communicates this to the title manager 712, which in turn, modifies the title of the digital content file with the new rights just purchased by the new user. The buyer can now redeem the digital content file from the content publisher 714 and download it to the client device 704. The seller can no longer access the digital content file on the content publisher 714.

FIG. 8A depicts an exemplary title management screen display 800 according to an embodiment of the invention. This display is used by a user to perform certain functions and access certain data based on their ownerships and permissions, in order to manage, resell, market, barter or auction their respective titles. The display is divided into two sections, a title folder pane 806 and a title content pane 802. The title folder pane 806 can further organize the titles into folders based on different attributes, such as the type of digital content, such as contacts, games, movies, music, playlists, and unsorted. Furthermore, deleted titles are placed a deleted folder. The title content pane 802 displays more detailed information about the digital content. In this example, the user selected title abc@company.com 808 in the title folder pane 806, and is displayed the corresponding business card 804 for a contact "Jim Smith."

Figure 8B:
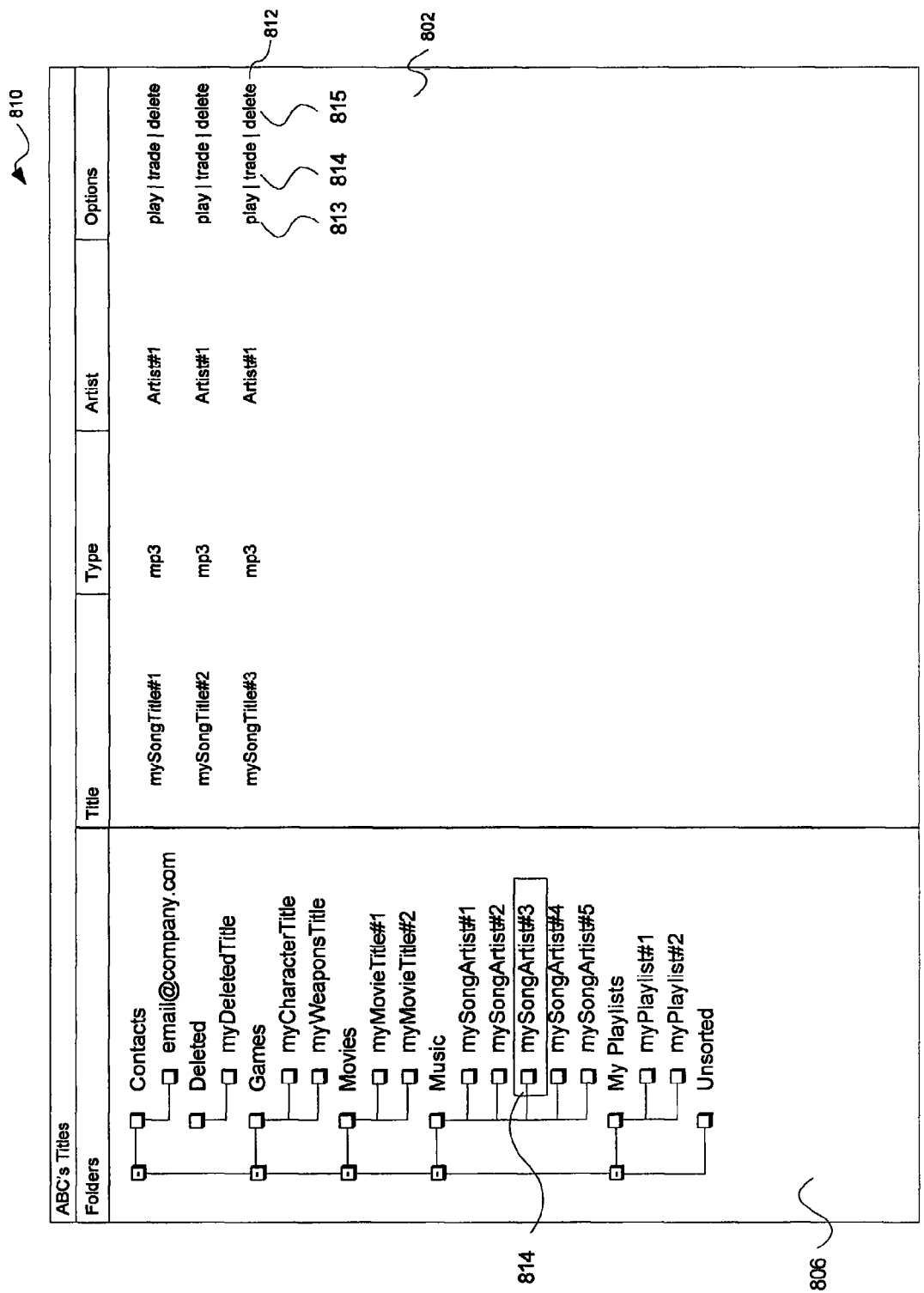

FIG. 8B depicts an exemplary title management screen display 810 according to another embodiment of the invention. As in FIG. 8A, the display is divided into two sections, a title folder pane 806 and a title content pane 802. Each title entry 812 in the title content pane 802 may have a play user selectable button 813, a trade user selectable button 814, and a delete user selectable button 815.

In this example, the user selected mySongArtist#3 814 in the title folder pane 806, and is displayed the owned titles to mySongArtist#3 songs 812. From this display, the user has the option to play 813 the song on the user's client computer, trade 814 the title to the song to another user, or delete 815 the title altogether.

Figure 8C:
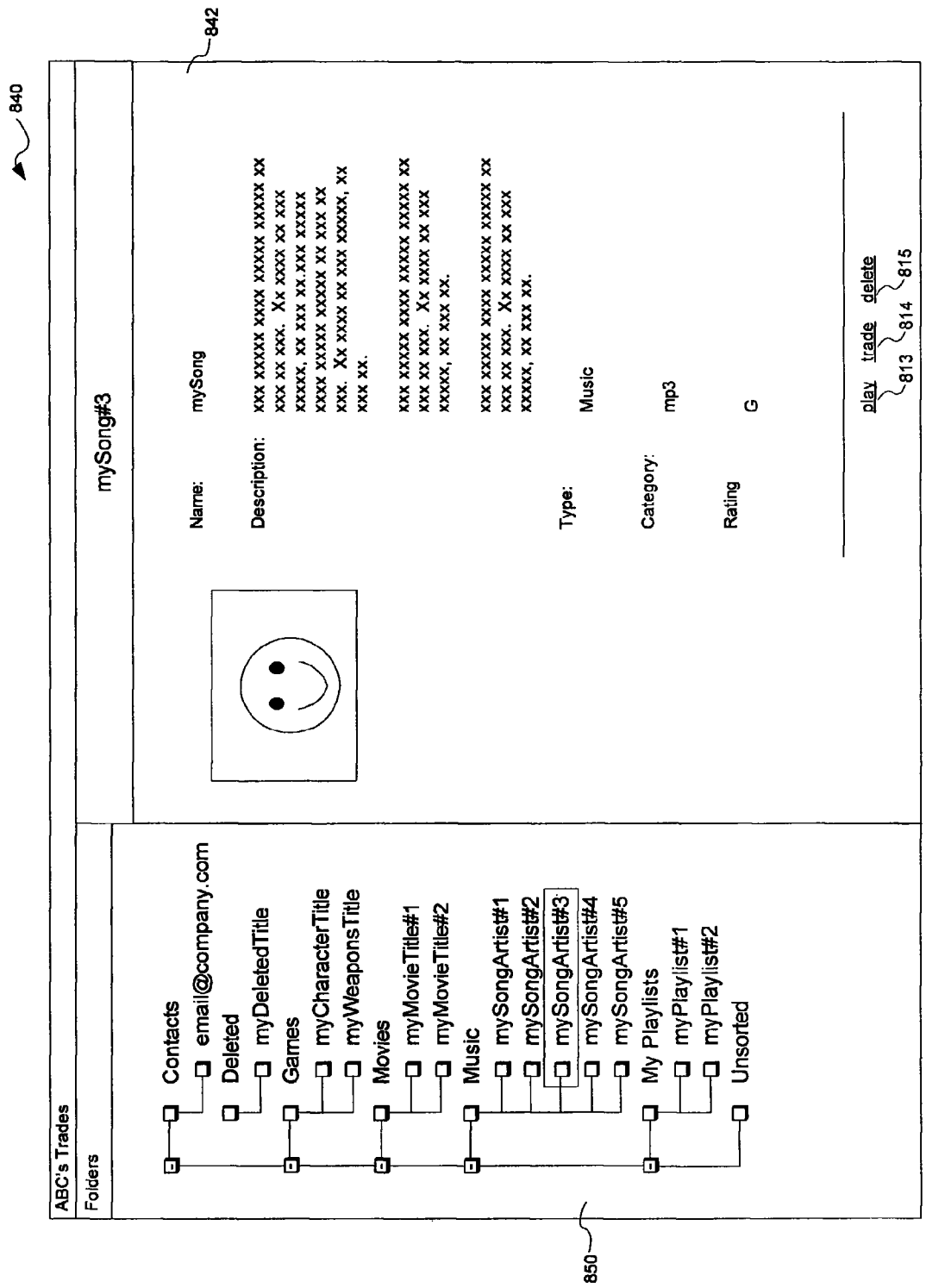

If the user selects one of mySongArtist#3 songs 812, a more detailed title content pane 842 appears, as shown in FIG. 8C. In this pane, a description of the song is displayed, along with the music type, category, and rating. A picture, such as an album cover, can be also displayed. As is FIG. 8B, the user has the option to play 813 the song on the user's client computer, trade 814 the title to the song to another user, or delete 815 the title altogether.

Figure 8D:
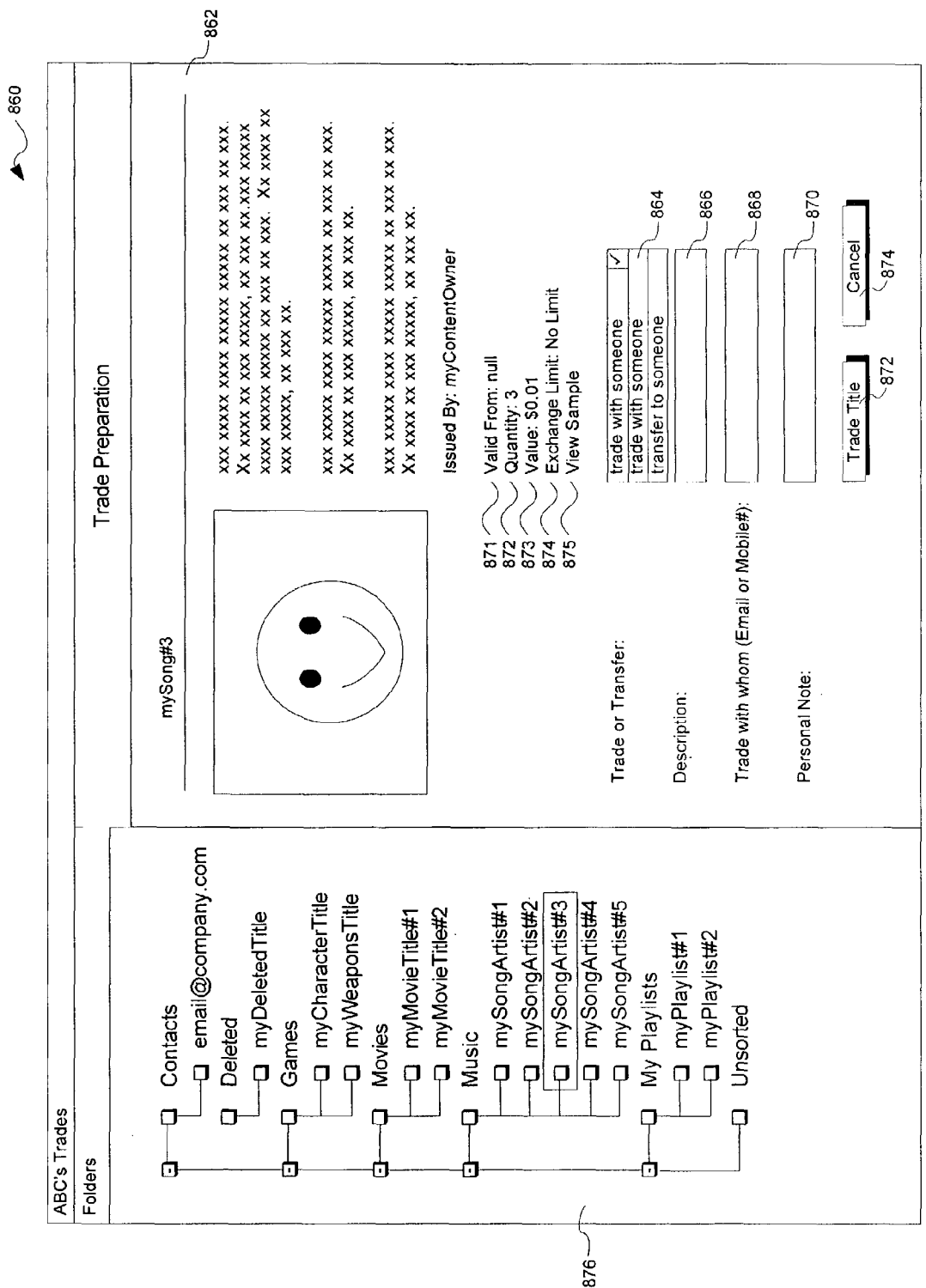

For example, if the user chooses to trade 814 mySong#3, a trade Preparation pane 862 appears, as shown in FIG. 8D. Aside from the information that was previously displayed in the title content pane 842 of FIG. 8C, additional information is displayed, such as a valid from date field 871, a quantity field 872, a value field 873, and an exchange limit field 874. The user can also view a sample 875 of mySong#3.

The user must select whether to trade or transfer 864 the title of mySong#3 with another user. Additionally, the user may be asked if they would like to list it on a barter site ("list on barter site") or post it to a transaction maker site ("post to transaction maker"). The user can enter description of the mySong#3 in the description field 866, as well as a note in the Personal Note field 870 to the user with whom the trade is being transacted. In the trade with whom field 868, the user enters the e-mail or mobile phone number of the user with whom they wish to trade. Once this information is substantially complete, the user selects the user selectable button trade title 872 to proceed, or the user selectable button cancel 874 to cancel the transaction.

The e-mail and mobile phone numbers are used to provide examples of identifying trading parties. The title transaction system has been designed with a flexible and extensible title format to accept and support a variety of naming schemes, including but not limited to domain name, phone numbers, X.500 naming, and LDAP.

Figure 8E:
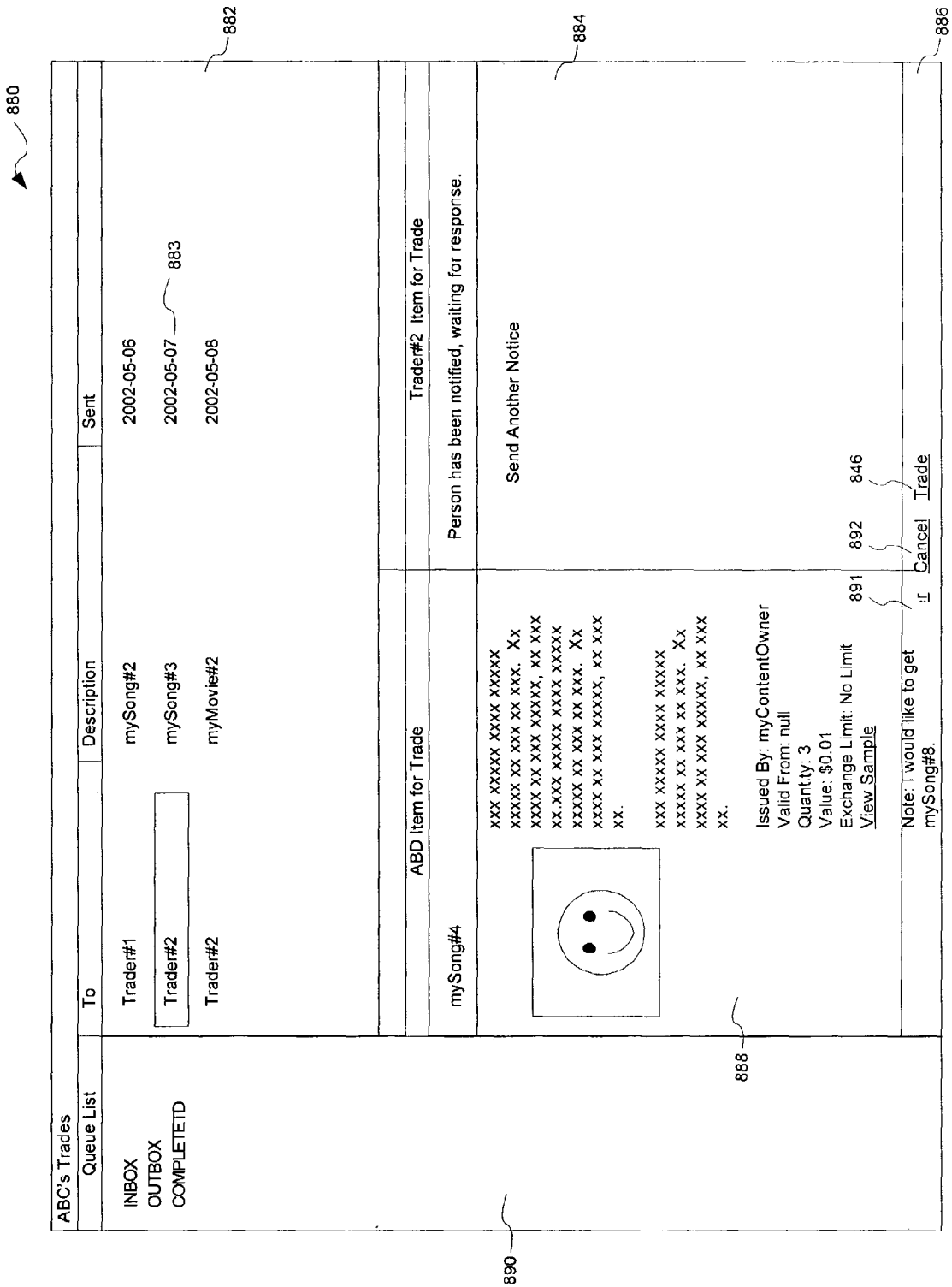

FIG. 8E depicts an exemplary title trades screen display 880 according to another embodiment of the invention. This display shows the current status of a user's title transactions. The display is divided into five sections, a title folder pane 890 a title status summary pane 882, a title bid pane 888, and a title offered pane 884, and an action pane with a series of user selectable buttons: counteroffer 891, cancel 892, and trade 846. In this example, the user selected mySong#3 883 was offered to trader#2, who has been notified. Once trader#2 makes an offer for trade, the user can counteroffer 891, cancel 892, or trade 846 and complete the transaction.

Figure 9A:
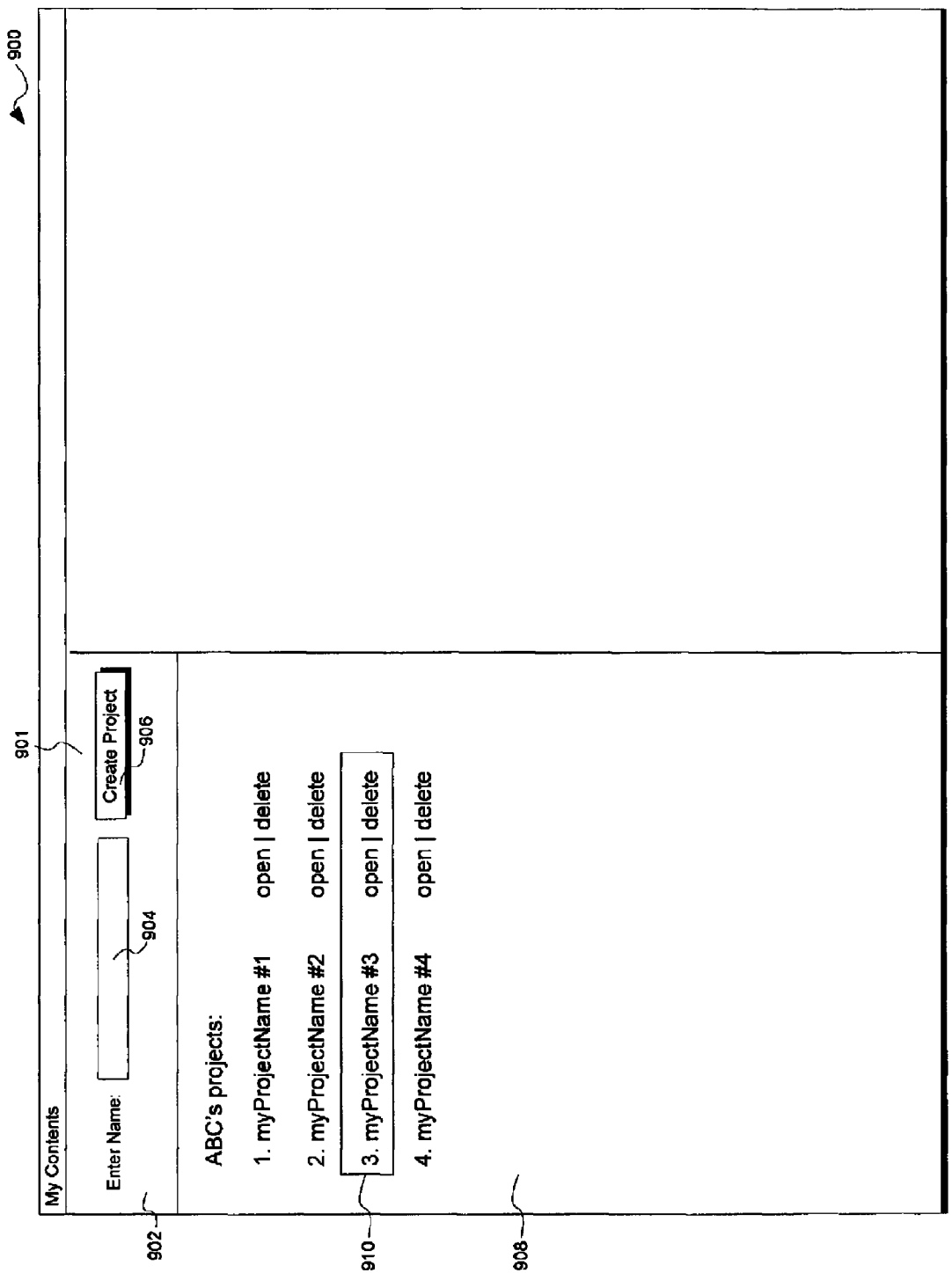
FIGS. 9A-B depict exemplary title creation displays according to an embodiment of the invention.

FIG. 9A depicts exemplary title creation screen display 900 according to an embodiment of the invention. The number of digital content files that a title can contain is substantial. Furthermore, the addressing or referencing scheme used by the content element is flexible to support numerous simple and complex structures such as URL's, object identifiers, domain names, alternate pointers, complex multi-part pointers, and even embedded content. With embedded content, the title actually contains the content and can optionally support a variety of encoding and encryption schemes The display is divided into two sections, a new project pane 902, and a project list pane 908. A project is a set of digital content files that share the same title object. If the user opens myprojectName#3, 910 for example, a project detail display 920 appears, as in FIG. 9B.

Figure 9B:
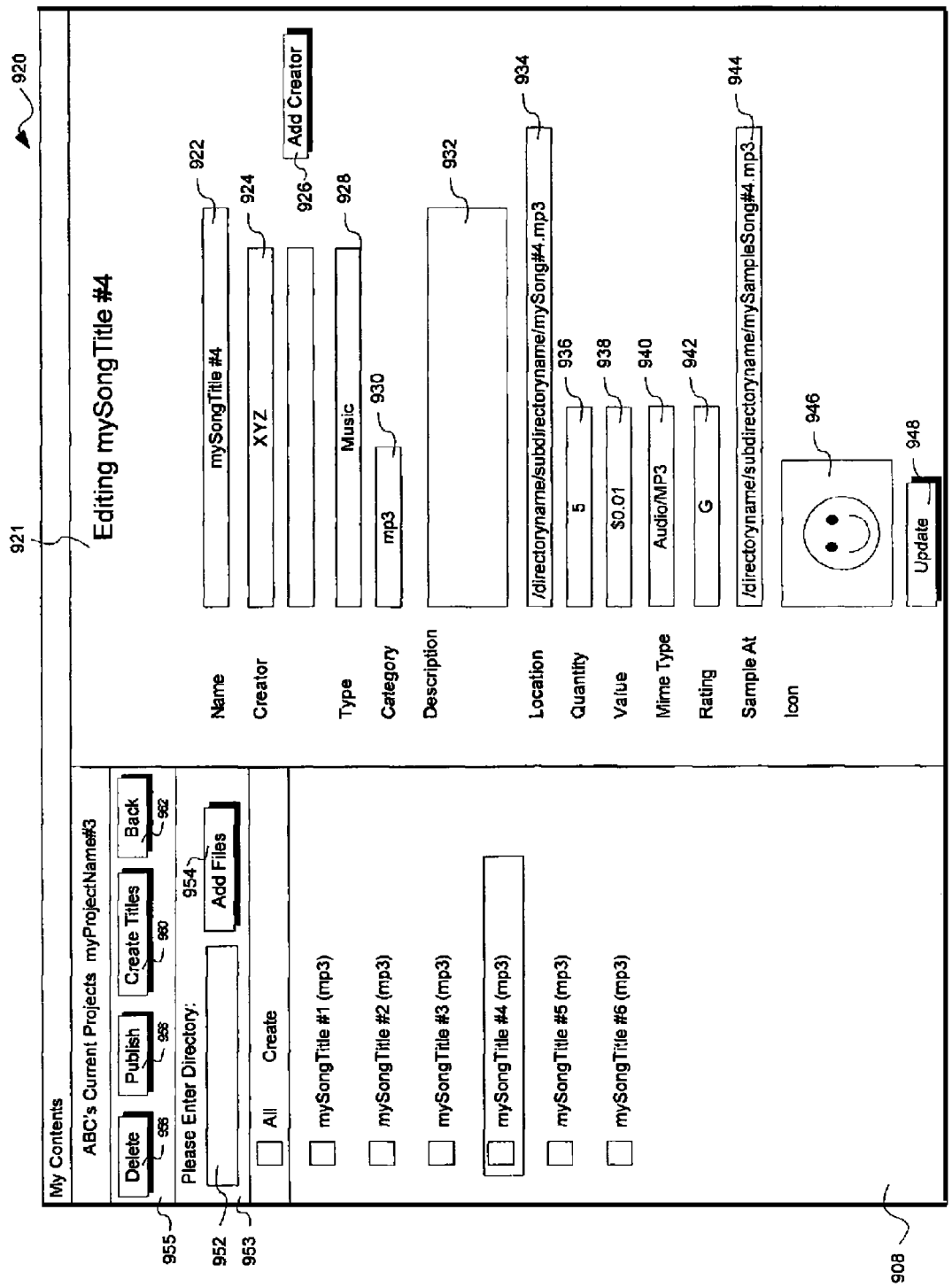

FIG. 9B depicts an exemplary project detail display 920 according to another embodiment of the invention. The display is divided into four sections. The first is an action pane 955 with a series of user selectable buttons: delete 956, publish 958, create titles 960, and Back 962. The second is an add file pane 953 with a user selectable button add files 954, and a field to enter the directory in which the files are stored 952. The third is a project list pane 908. And the fourth is a project detail pane 921.

Digital content files can be quickly added to a project by entering the name of the directory in which they are located into user input field 952, and selecting the add files user selectable button 954. Furthermore, information contained in the title is shown and can be modified through fields the project detail pane 921 such as: name field 922, creator field 924, type field 928, category field 930, description field 932, location field 934, quantity field 936, value field 938, mime type field 940, rating field 942, sample at field 944, and icon field 946. When the users wish to save the information in the title, the user selectable button update 948 is selected.

Figure 10A:
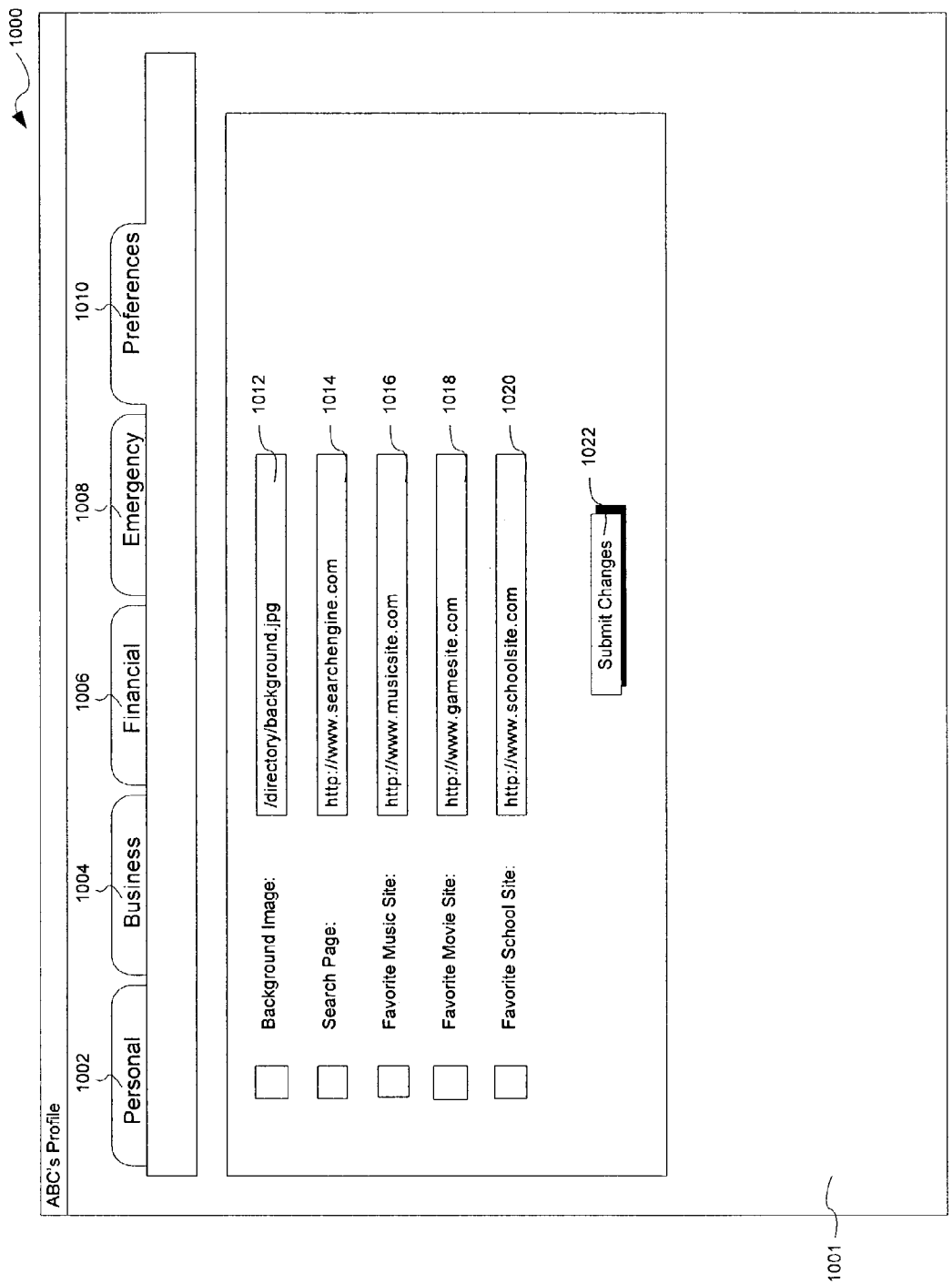

FIG. 10A depicts an exemplary administrative screen display 1000 according to another embodiment of the invention. This display is used to store administrative information about each user, preferences to customize the user interface, and custom rules that the user wants applied. The display is divided into 5 tabs: personal 1002, business 1004, financial 1006, emergency 1008, and preferences 1010. The preferences 1010 tab further contains the following fields: background image 1012, search page 1014, favorite music site 1016, favorite movie site 1018, and favorite school site 1020. When the users wish to save the information in the profile, the submit changes 1022 button is selected.

The business tab 1032, as shown FIG. 10B, contains the following fields: company came 1034, web site 1036, work phone # 1038, work email 1040, job title 1042, and work address 1044-1046. As in FIG. 10A, when the users wish to save the information in the profile, the submit changes 1022 button is selected.

Figure 11:
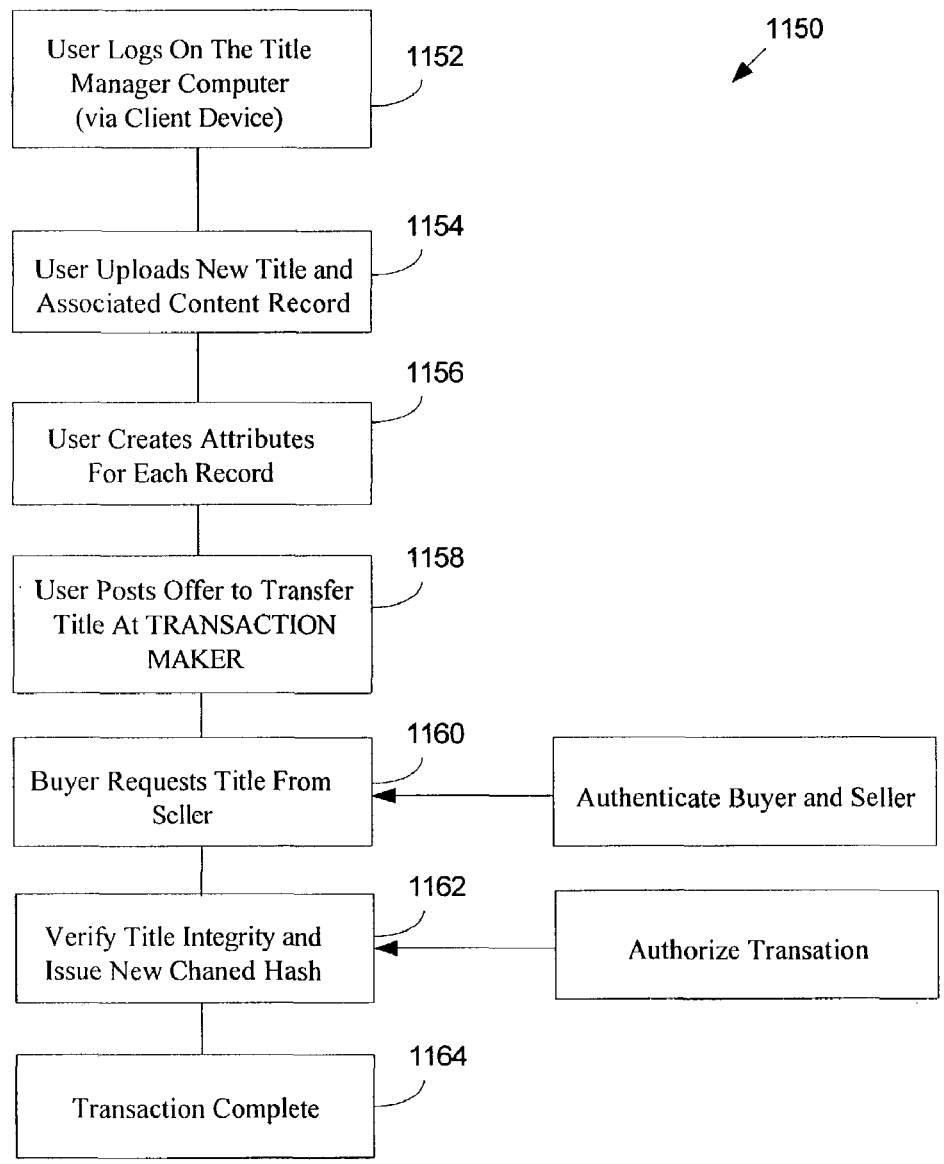
FIG. 11 is a flow chart showing steps for performing a title transfer according to an embodiment of the invention.

FIG. 11 is a flow chart showing steps for performing a title transfer according to an embodiment of the invention. Initially, the user logs on the title manager computer 1152 and uploads a new title and associated content record 1154. The user then creates attributes for each record 1156. The user then posts an offer to transfer the title on transaction maker 1158. A buyer who desires the digital content file requests the title from the seller 1160, whereby both the buyer and seller are authenticated. The title integrity is verified and a new chained hash is issued 1162, authorizing the transaction. When this is accomplished, the transaction is complete 1164.

C. Methods of Facilitating Merchant Transactions

Figure 12A:
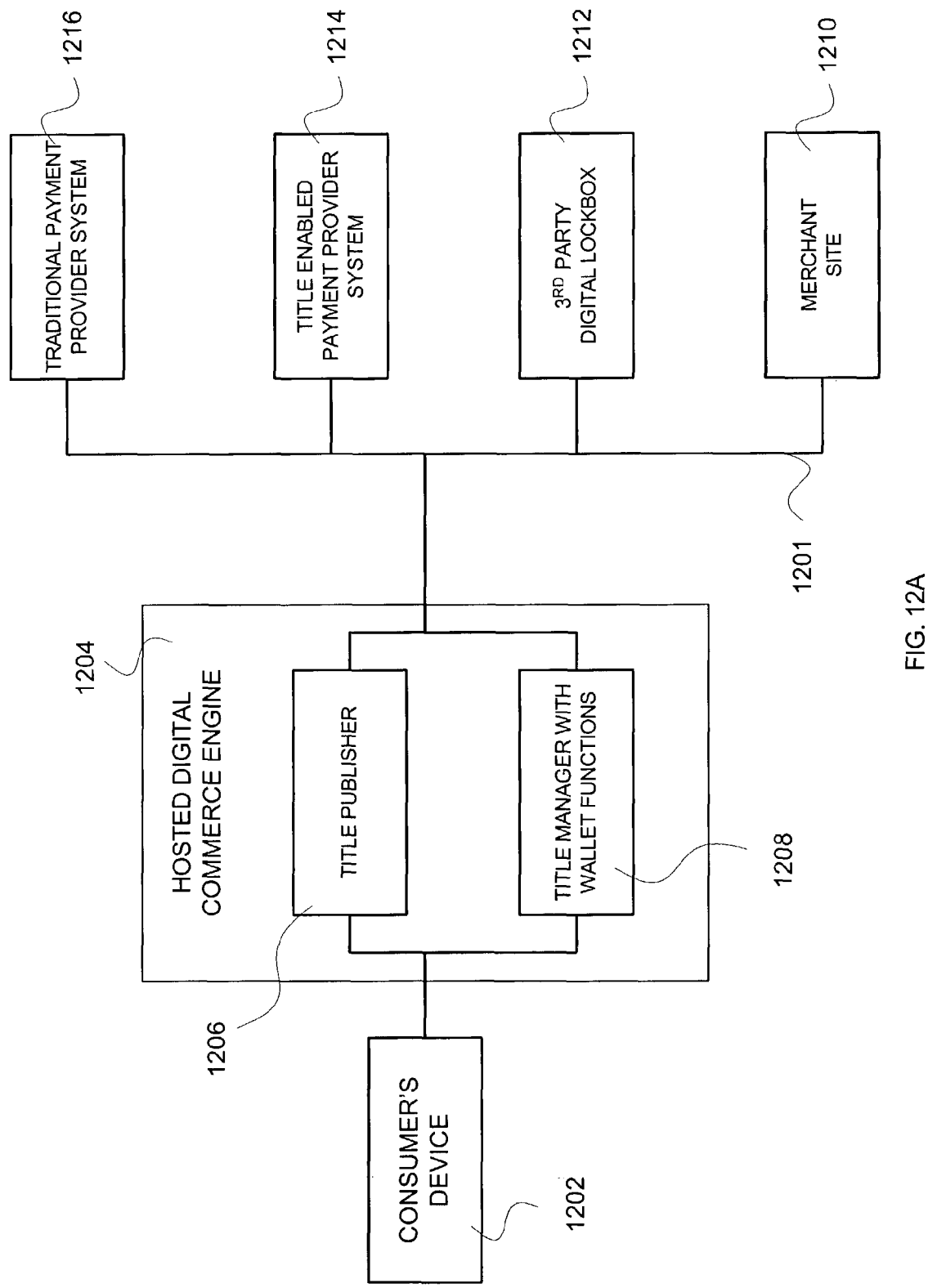
FIG. 12A depicts a title payment system according to an embodiment of the invention.

FIG. 12A depicts an exemplary diagram according to one embodiment of the invention, in which an online payment system is enabled through the exchange of titles. This embodiment addresses the importance of online payment systems for Internet merchants, since direct human interaction with customers is both costly and often inconvenient.

Current online payment systems commonly require bank cards, such as Visa or Master Card. In order to complete a purchase, customers must enter the bank card account information, along with personal contact information, into an online form at the merchant Internet site. Often, the information is stored by the merchant to simplify future customer purchases. For instance, instead of having to re-enter the information, the customer can just authenticate with a login and password, and complete the purchase.

Customer fears about data security and confidentiality, however, have inhibited ecommerce growth. And although security systems have greatly improved, criminal sophistication has also increased. Customers are not only inconvenienced with having to enter and re-enter account information at every merchants site, they are also concerned with propagation of their account information, protection of their privacy at each of the merchants site, and tracking of their habits and activities online.

Because of the distributed and anonymous nature of the Internet, online merchants are prone to both fraudulent bank card transactions and malicious hacking attacks. These same merchants, however, cannot remain in business if their attempts to increase security result in unintended customer frustration. Modern payment systems must both enhance the customer buying experience and be secure. A modern payment system must also support anonymous payment methods similar to the physical cash schemes that are currently in use throughout the world.

FIG. 12A is an exemplary diagram of a title payment system. The system in FIG. 12A comprises a consumer's device 1202 connected to an online, hosted digital commerce engine (DCE) 1204. The DCE is a hosted service that operates a title publisher 1206 and a title manager 1208. The DCE is typically hosted by a network provider such as an internet service provider, application service provider, and/or mobile operator. The title manager 1208 provides wallet functionality in order to handle the various payment processes and payment titles. The system in FIG. 12A also comprises a merchant site 1210, third party digital lockbox 1212, title enabled payment provider 1214, and a traditional payment provider 1216. In this example, all communications occur over a TCP/IP network 1201 but can be implemented using any number of protocols and communication implementations.

Consumer's device 1202 presents the user interface of the online title manager and wallet through which titles and digital content files are managed, transacted, and delivered. The device can be almost any type of computing device that can communicate with the DCE, including desktop computers, laptops, PDA's, and mobile phones. The title manager 1208 located in the DCE provides title management services to the consumer such as adding, viewing, and trading titles. Additionally, the title manager 1208 provides wallet-functionality for viewing accounts, currencies, and receipts as well as handling payment processing on behalf of the consumer. Optionally, the functionality offered by both the consumer's device and the DCE can be packaged in a number of ways including a completely integrated application to be run on a consumer's device such as a desktop computer.

Figure 12B:
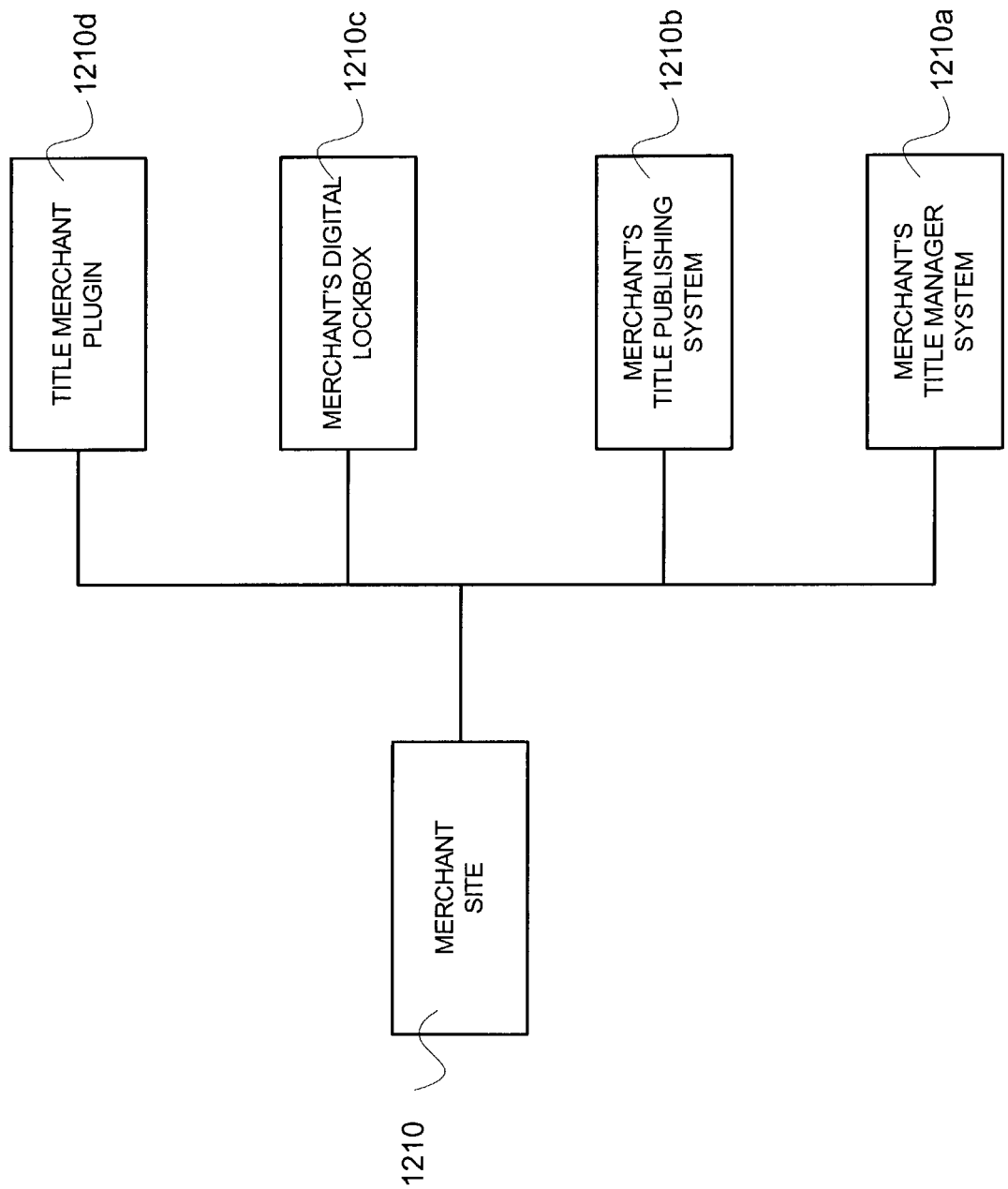
FIG. 12B depicts a title payment system with a digital lockbox according to an embodiment of the invention.

The merchant site 1210 is an online merchant system that provides both web-based and e-commerce functionality such as catalog, product information, product configurators, shopping pages, shopping cart, and payment services. While only one merchant site is shown in the diagram, the invention can support any number of merchant sites. The merchant site 1210 is further comprised of title-enabled components as shown in FIG. 12B. As shown in FIG. 12B, the merchant site can include a title manager 1210a, title publisher 1210b, digital lockbox 1210c, and title merchant plugin 1210d. All components are optionally operated by the merchant but are generally available to merchants that are title enabled. The title manager 1210a provides the merchant with management functions for titles that they own or potentially for customers. The title publisher 1210b allows the merchant to publish titles such as the titles that may be given to customers that reference customer's rights to digital content file s. The digital lockbox 1210c is an example where the merchant hosts the lockbox for trading purposes instead of a third party service. The title merchant plugin 1210d provides payment support services for the merchant including communication with digital lockboxes, title verification, and an interface with payment providers. While only one component of each type is shown, the invention can support any number of components to be hosted by the merchant.

The third party digital lockbox 1212 in FIG. 12A is an application that provides a temporary and secure safe harbor for all transaction titles until title rights are established. While only one digital lockbox is shown, the invention can support any number of digital lockboxes. It is generally hosted somewhere in the network by the merchant, or a trusted third party escrow service. For instance, a title may be released to the consumer from lockbox 1212 once the purchase is completed. As shown in FIG. 12B the merchant site can also host a digital lockbox 1210c to provide a mechanism for supporting the payment process, that is supporting exchange transactions, in lieu of a third party service.

Figure 12C:
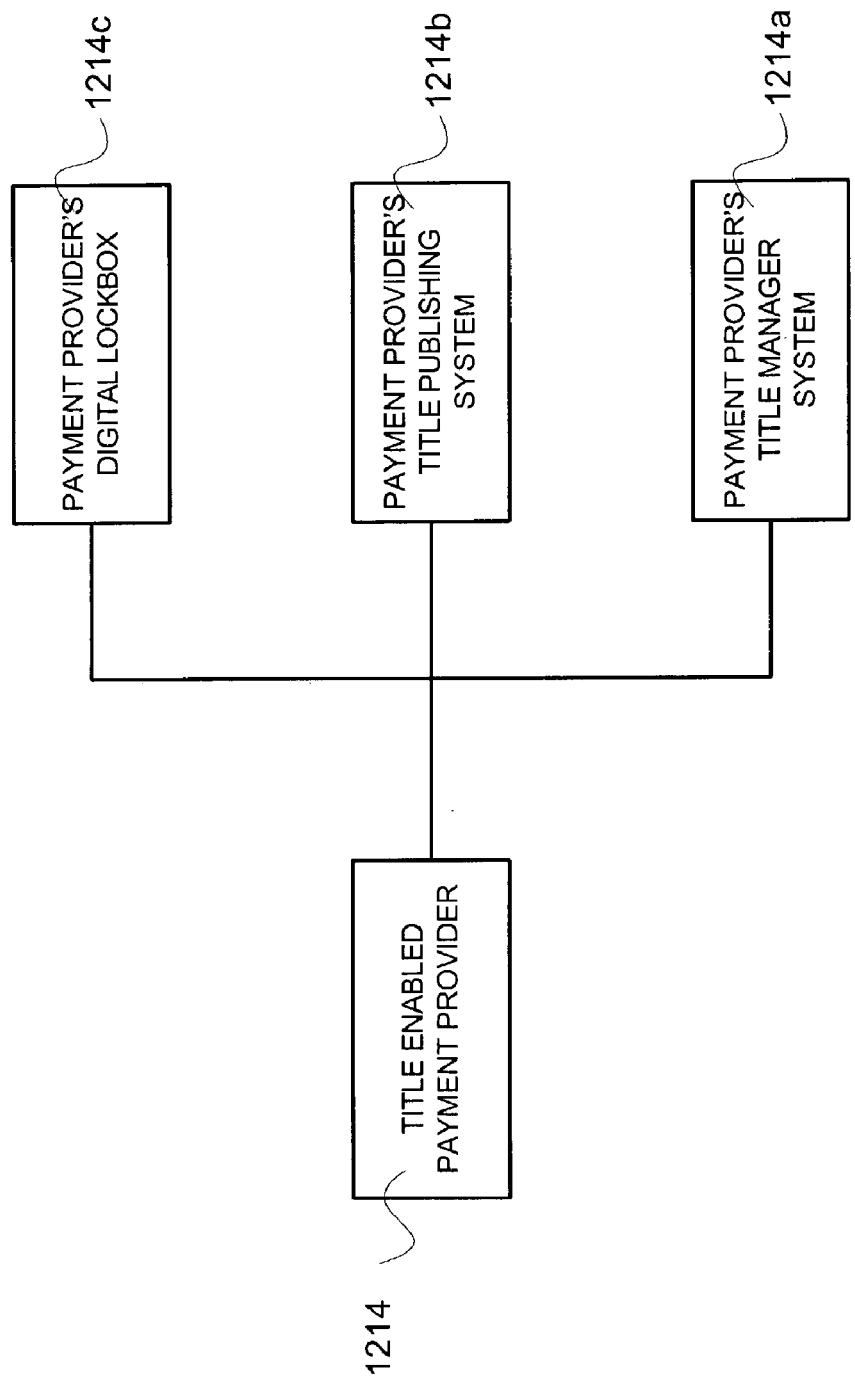
FIG. 12C depicts a title payment system with a digital lockbox, a title manager, and a title publisher according to an embodiment of the invention.

The title enabled payment provider 1214 is an online payment provider service that is title enabled, in that they can support title based transactions. While only one title enabled payment provider is shown, the invention can support any number of title enabled payment providers. In addition to supporting titles, a title enabled payment provider 1214 would provide services typical of a payment provider such as payment processing, gateways to payment networks, and merchant accounts. As shown in FIG. 12C a title enabled payment provider 1214 can operate title-enabled components such as title manager 1214a, title publisher 1214b and digital lockbox 1214c. These components would provide the same services to the payment provider as similar components provided to the merchant site 1210.

Each of the system elements shown in FIG. 12A, FIG. 12B, and FIG. 12C are coupled to the other using a network protocol 1201, such as TCP/IP over the Internet. Furthermore, consumers can access online title manager 1210a functions directly within merchant sites 1210 if they are permitted. For instance, payment options shown at the merchant site reflect those available in the online title manager 1208, but other options can be added.

As previously described, a title is an object that may have a number of elements and attributes including embedded digital content, ownership attributes, and copy permissions. In this example, a consumer wishes to buy a product or service from a merchant using a title transaction. A purchasing transaction generally comprises two or more separate titles: a product title or titles being offered by the merchant; and a payment slip title or payment titles being offered by the consumer. The product title or titles give the title owner specific rights to the product, for instance, the ability to play a song. The payment slip title is a financial instrument that authorizes a payment provider to pay the merchant for any product titles purchased. Once the transaction is complete, the consumer would be in possession of the product title or titles and the merchant would be in possession of the payment slip title or payment titles.

For instance, a customer would use a web browser on customer's device 1202 to access a merchant site 1210 through online title manager 1204. When the merchant site determines that the transaction is title-enabled, it presents the product title choices and displays the consumer's title payment options. Once items are selected for purchase, the merchant site places the product titles in a digital lockbox 1212, generates a pre-filled sales order title comprising transaction details including a transaction number, product title information, purchase detail, and information on the digital lockbox 1212. The sales order title functions as an electronic invoice or promise of payment for the merchant 1210.

The sales order is transmitted back to title manager 1204 and stored for the consumer to view, select payment type, and approve using the consumer device 1202. Once approved by the consumer, the title publisher 1206 may generate a payment slip title using the sales order title as a guide. The payment slip title is transmitted to the digital lockbox 1212 and the merchant 1210 is notified. The merchant 1210 verifies the payment slip title in the digital lockbox 1212 and completes the transaction by releasing the product titles to the customer. A receipt title can also be generated and included in the transaction if requested or required. The merchant 1212 then captures payment from the customer by forwarding the completed payment slip title to the title payment provider 1214 for payment. Alternatively, the merchant 1210 can use a standard collection process such as that used for credit card processing, and deal directly with a traditional payment provider 1216.

Figure 13A:
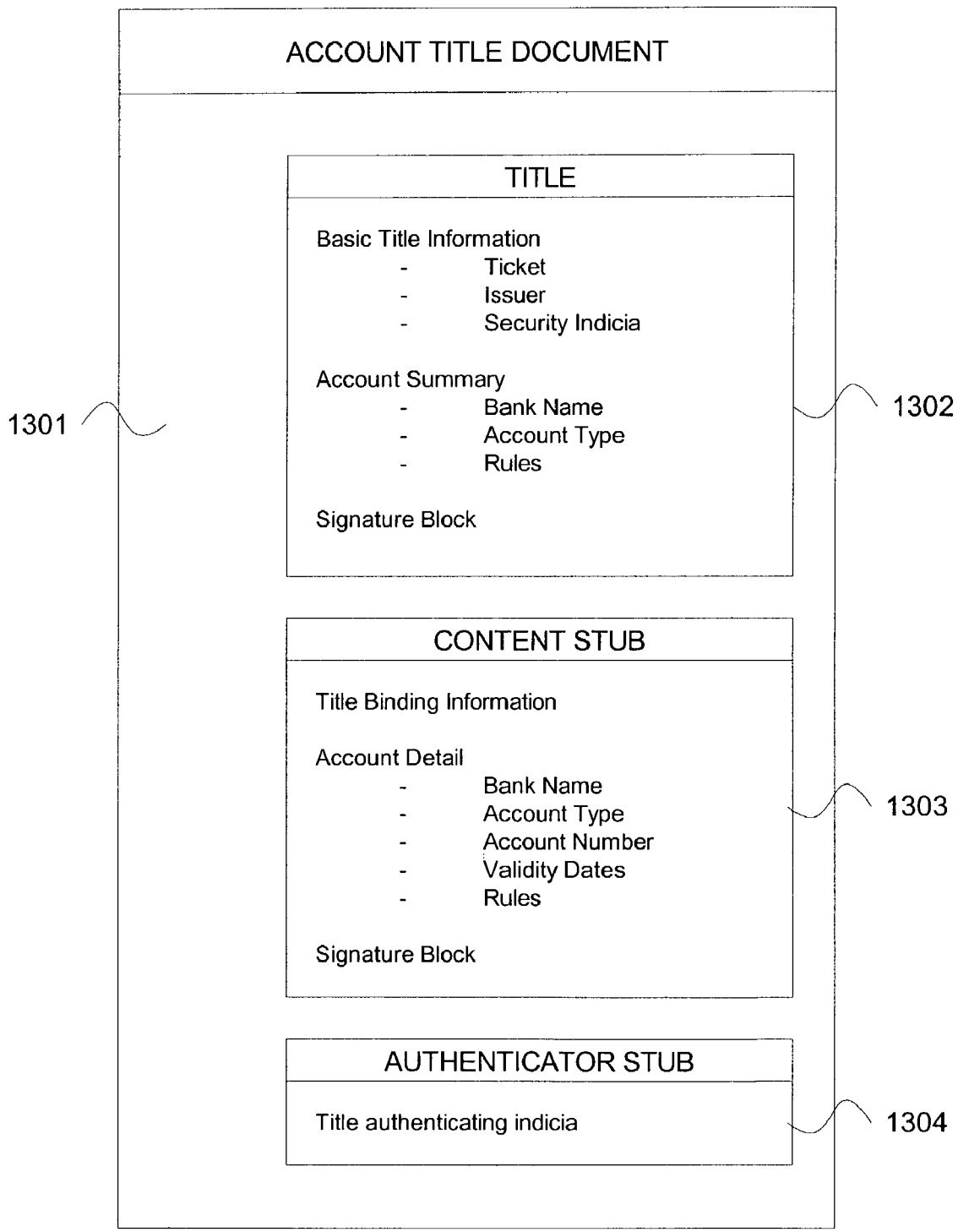
Figure 13B:
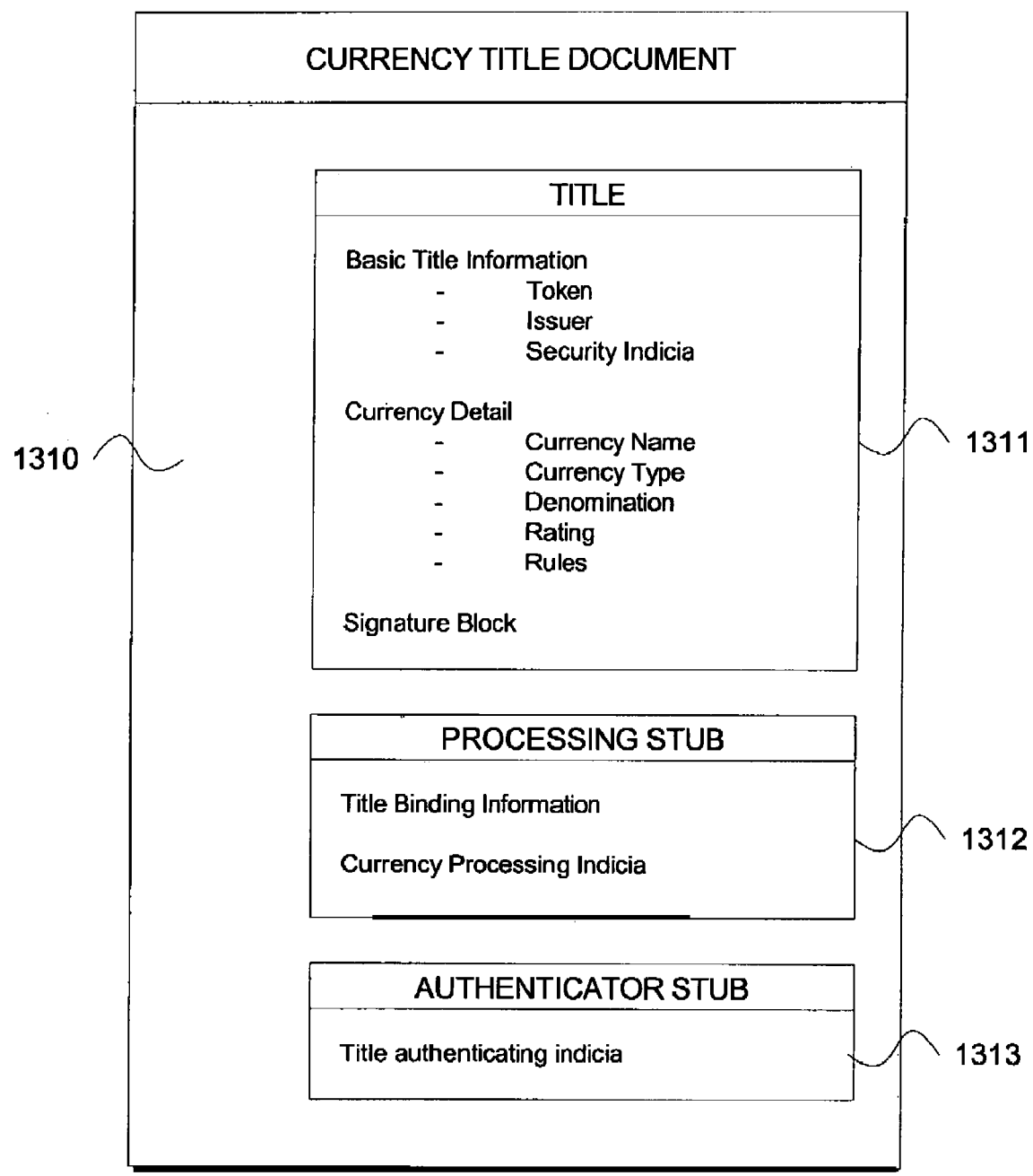
Figure 13C:
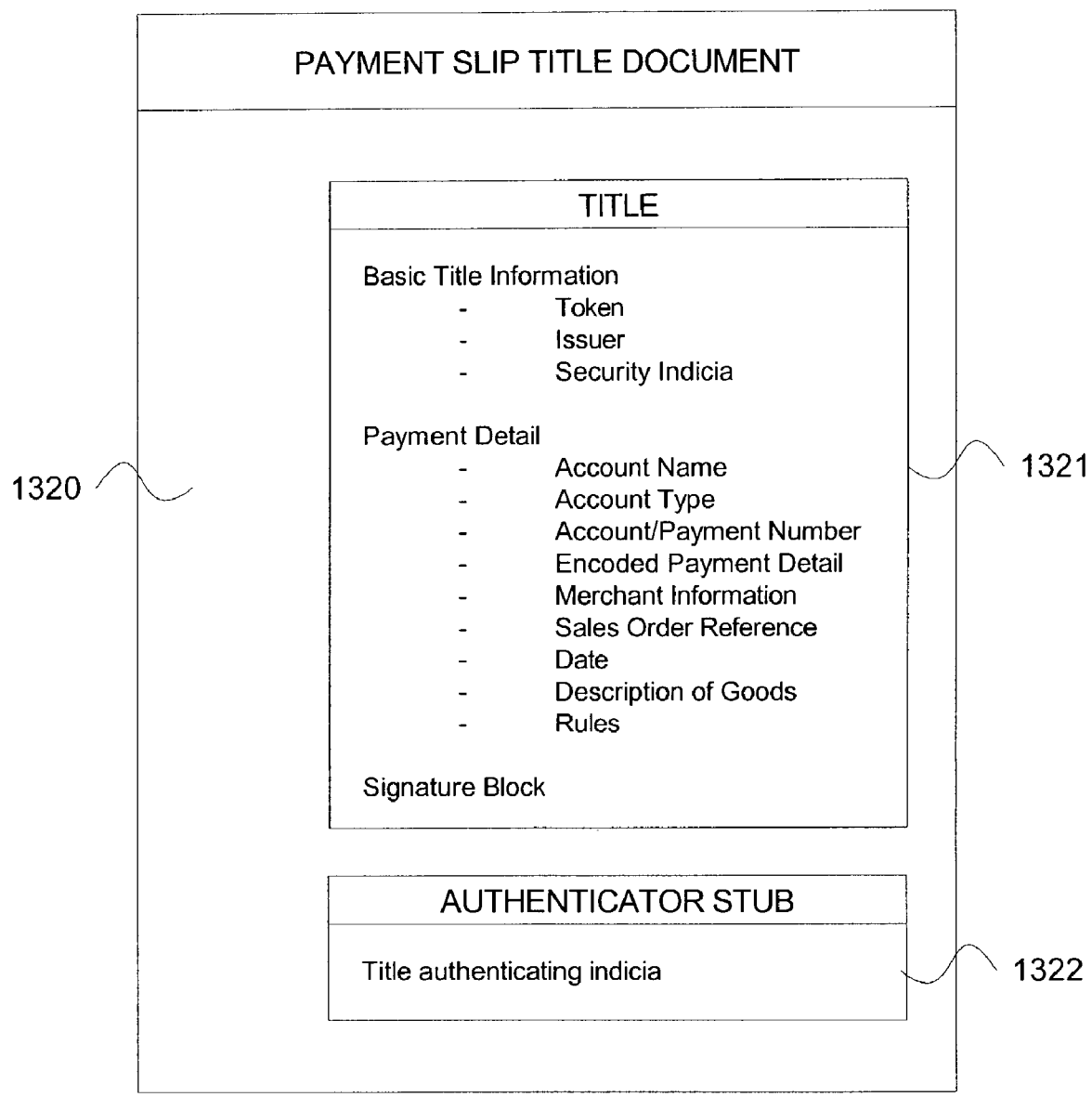

FIGS. 13A, 13B, and 13C depict exemplary payment transaction data structures according to an embodiment of the invention. Each data structure is maintained within the online title manager 1204, 1210a, and 1214a, previously displayed in FIGS. 12A, 12B, and 12C.

FIG. 13A displays an account title 1301. In this example, an account title represents a bank card or a debit card. Each account title 1301 can further contain sub-elements such as access information and other account details. The structure of an account title 1301 is that basic account information is contained in a standard title block 1302 and detailed account information is contained in a content stub 1303. Containing the detail in a content stub 1303 provides additional control and flexibility of what information is displayed, transmitted, and shared through a transaction. An account title is generally a ticket since it is issued to a particular person and cannot be traded. This is indicated in 1302 and as is standard with tickets an authenticator stub 1304 is included.

FIG. 13B displays a currency title 1310. Unlike a bank card, a currency functions as a pre-paid card or traveler's check that can be redeemed at the issuing title currency merchant. Currency is purchased in the issued denominations of that legal tender. For instance, in the case of U.S. Dollars, the denominations would be $0.01, $0.05, $0.25, $1.00, etc. Each currency title 1310 represents a specific currency and a specific denomination such as $1.00US. The currency title 1310 contains additional information regarding the currency such as issuer, type, and rules associated with the currency this is indicated in 1311. Unlike account titles, currency titles are generally tokens since ownership is dependent on possession and currency can be traded or transferred. As with all tokens an authenticator stub 1313 is included. In another example of a currency title 1310, the denomination may only be valid at time of issuance, and the title can be divisible, that is the currency title can be used for transactions requiring smaller denominations such as micro transactions. In this case, the currency title can contain a processing stub 1312 to hold processing indicia used during micro transactions.

FIG. 13C depicts an exemplary payment slip title according to an embodiment of the invention. A payment slip title 1320 is shown and is formatted similar to previous titles. The difference with a payment slip title is the content that it refers to and contains. The payment slip title 1320 has a payment detail section 1321 that contains specific information relating to the payment type used by the consumer. As previously described, the payment slip title is generated by the title publisher 1206 as shown in FIG. 12A, using the sales order title as a guide. The payment detail 1321 section of the title is actual title content and contains specific information relating to payment for the product. The information contained in payment detail 1321 may vary depending on the payment mechanism selected by the consumer such as account, blinded account, secure account, etc. Generally, the information may contain payment detail (such as amount), account name, type number, as well a basic order information including transaction number, merchant, date, description of product and any rules associated with payment. Some or all of this information maybe encoded such that only a title enabled payment provider 1214 or traditional payment provider 1216 can decode.

Figure 13D:
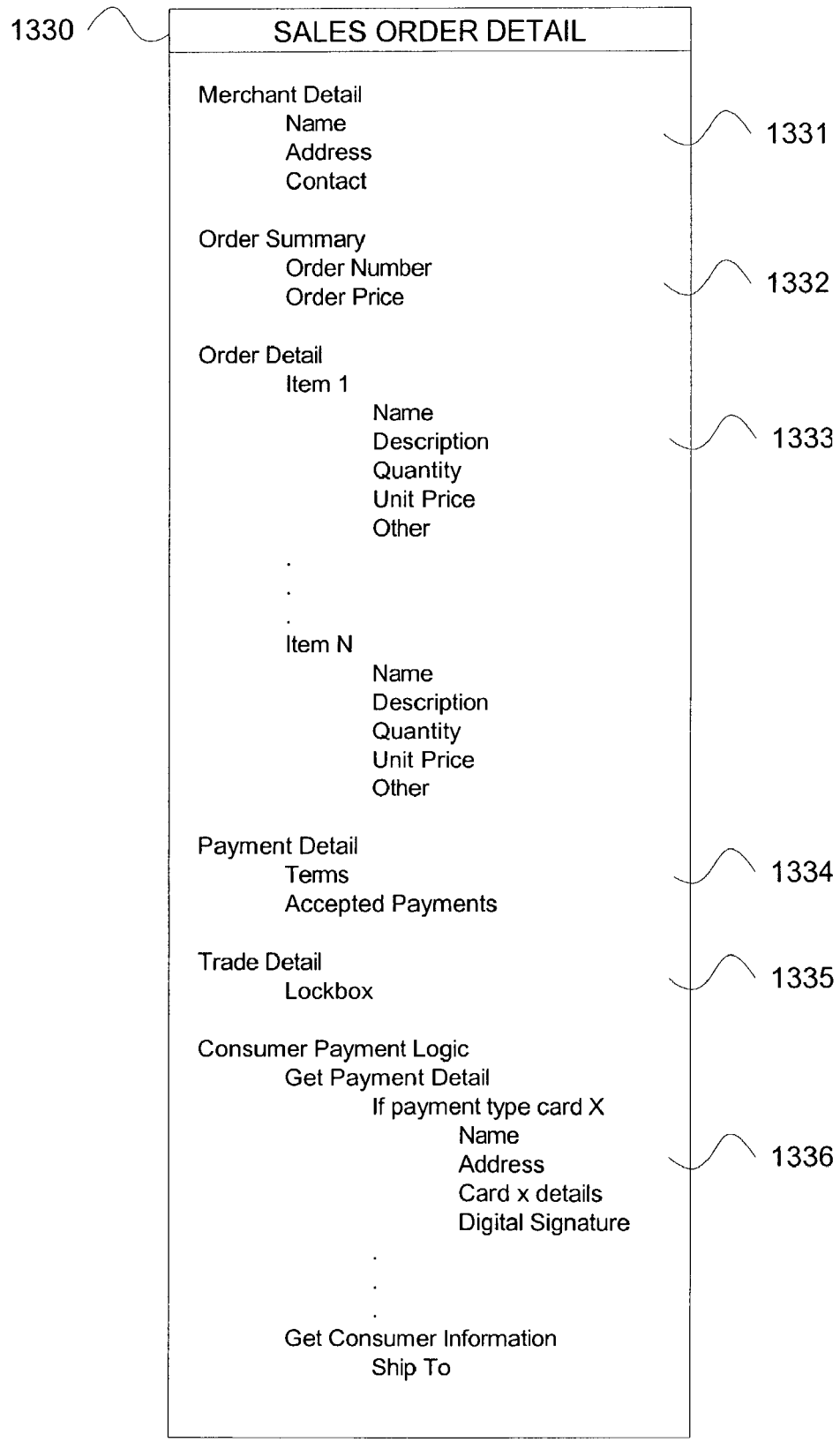

As described previously, a sales order title is created by the title publisher 1210b operated by the merchant site 1210 as shown in FIG. 12B. The sales order title is used as an invoice and sent to the consumer's title manager 1208 shown in FIG. 12A. The consumer's title publisher 1206 may create a payment slip title 1320 using sales order title as a guide. The sales order title is similar to previous titles but may instead contain sales order information within the content element. FIG. 13D depicts an exemplary sales order detail 1330 section that would be included within a title similar to the currency detail 1311 being included in 1310 and payment detail 1321 being included in 1320. The sales order detail 1330 contains merchant detail 1331, order summary information 1332, order detail 1333, payment detail 1334, trade detail 1335, and consumer payment logic 1336. Order summary 1332 provides summary information on the order including order number, total price, and taxes. Order detail 1333 provides line item detail for each product offered for sale, including unit and extended pricing. Payment detail 1334 provides detail definitions for the terms and conditions as well as the accepted payment types such as Visa, Mastercard, bank card, and cash. Trade detail 1335 provides information regarding the trade (product titles for payment titles) such as the location of the digital lockbox 1212. Consumer payment logic 1336 defines logic statements that can control how a payment slip is generated. These are basically instructions to the title publisher 1206 for handling specific payment mechanisms.

FIG. 13E depicts an exemplary title data table according to an embodiment of the invention. The title data table 1340 may be used by a title manager 1208, 1210a, 1214a to store all titles used in payment transactions. As shown in FIG. 13E, the table can contain any number of titles including currency titles 1342, account titles 1344, sales order titles 1346, and payment slip titles 1348.

Figure 14:
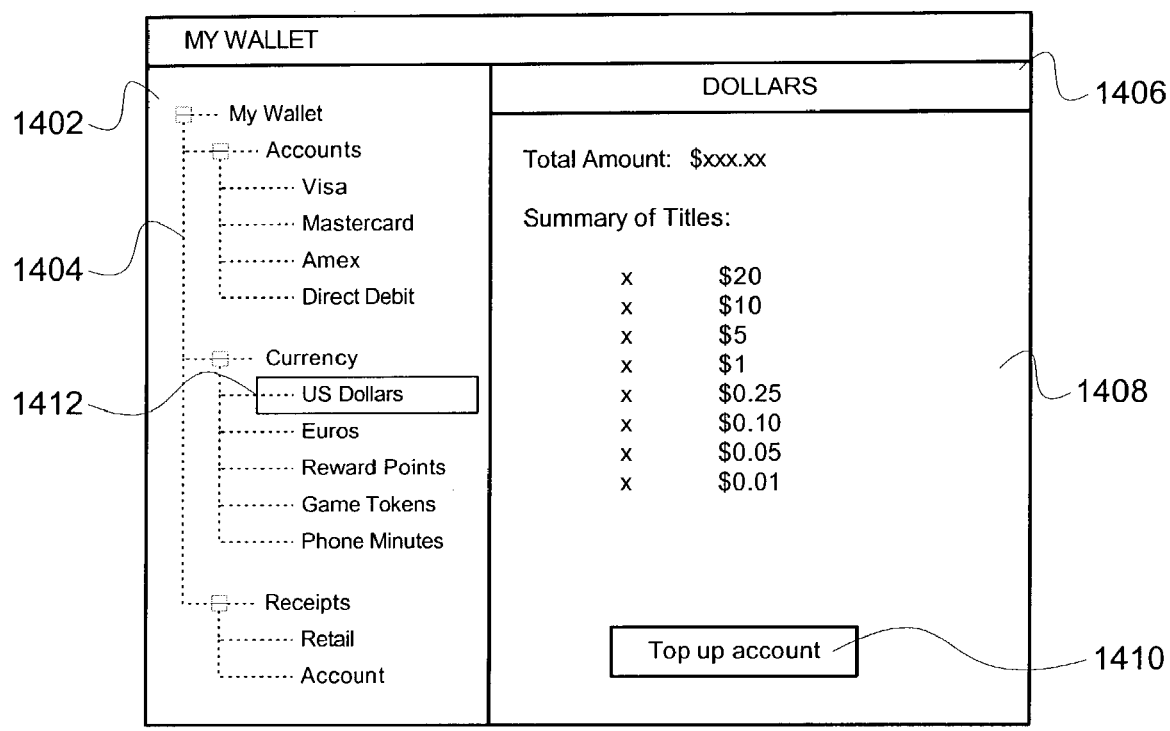
FIGS. 14-15 depict exemplary title management displays according to an embodiment of the invention.

FIG. 14 depicts an exemplary online title manager that is displayed in a browser on consumer's device 1202, as described in FIG. 12. The display is divided into two sections, a title folder pane 1402 and a title content pane 1406. The tile folder pane 1402 further organizes the titles into folders based on type 1404, although only my wallet titles are displayed. Examples include accounts, currency, and receipts. The accounts folder contains titles of bank cards, debit cards, and direct debit transactions. The currency folder contains titles of pre-paid currencies, as well as other pre-paid accounts that can be used for payment, such as gaming tokens and cell phone minutes. The receipts folder contains receipts for the customer's purchases, organized by type, such as retail and account.

The title content pane 1406 presents summarized information 1408 for account, currency, or receipt titles. Title content pane 1406 also allows the consumer to modify authorized entries within the titles. For example, the user has selected the dollars currency title 1412. This displays a summary of the currency amounts contained with the title, as well as allows the user to top up the account 1410 with additional currency.

Figure 15:
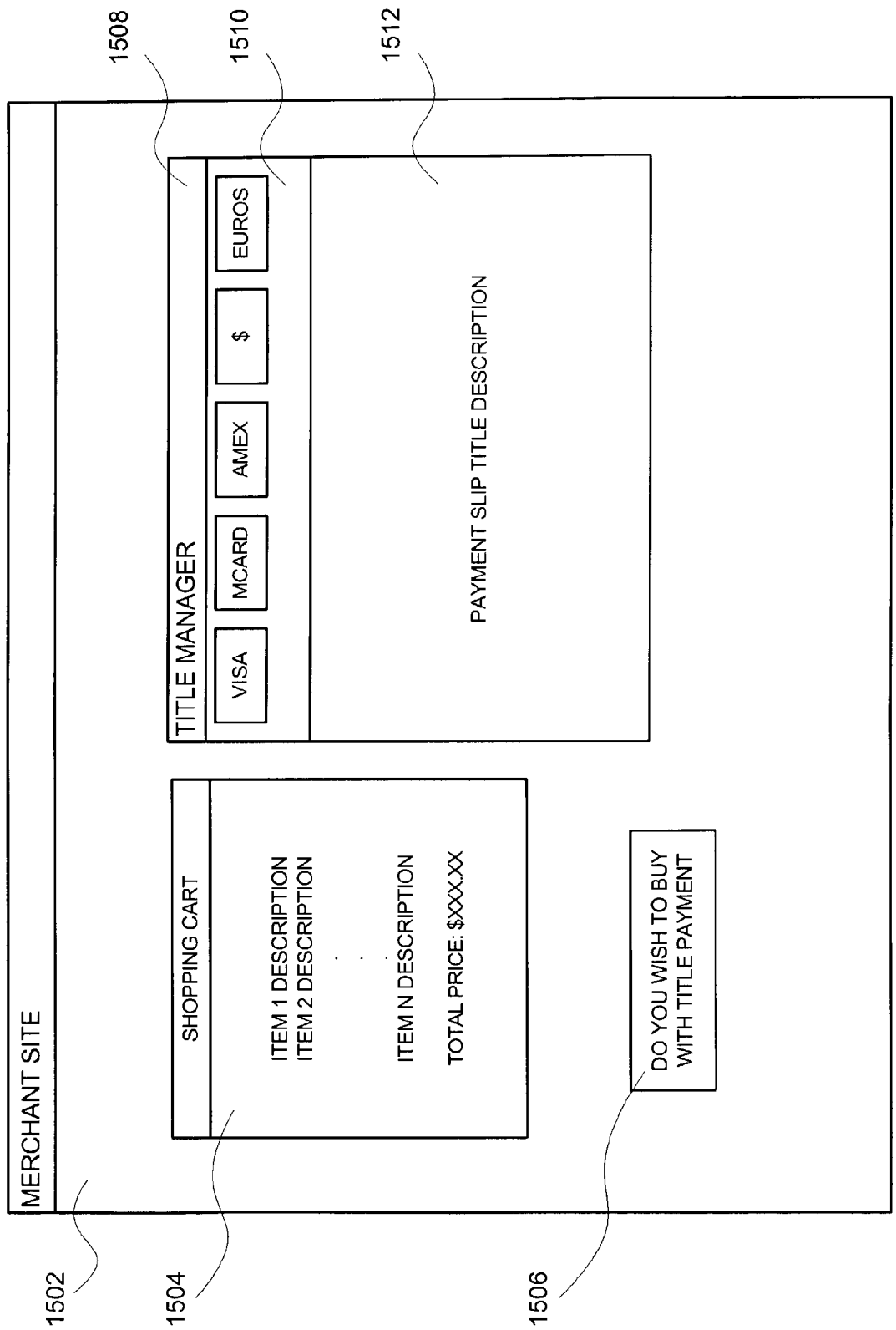

FIG. 15 depicts an exemplary merchant site 1502 that would be displayed in a browser on the consumer's device 1202, as described in FIG. 12. In addition to common merchant site elements, such as the shopping cart item description 1504, the consumer's title manager 1508 is displayed in a sub-window within or on top of the browser like a wallet application. In the title manager 1508, the device presents the consumer with available payment structures 1510, as well as a payment slip description 1512 when it is received from the merchant site 1210. Using the title manager window (i.e. the wallet application), the consumer can select a payment structure and make payment for the products presented in 1512.

Figure 16:
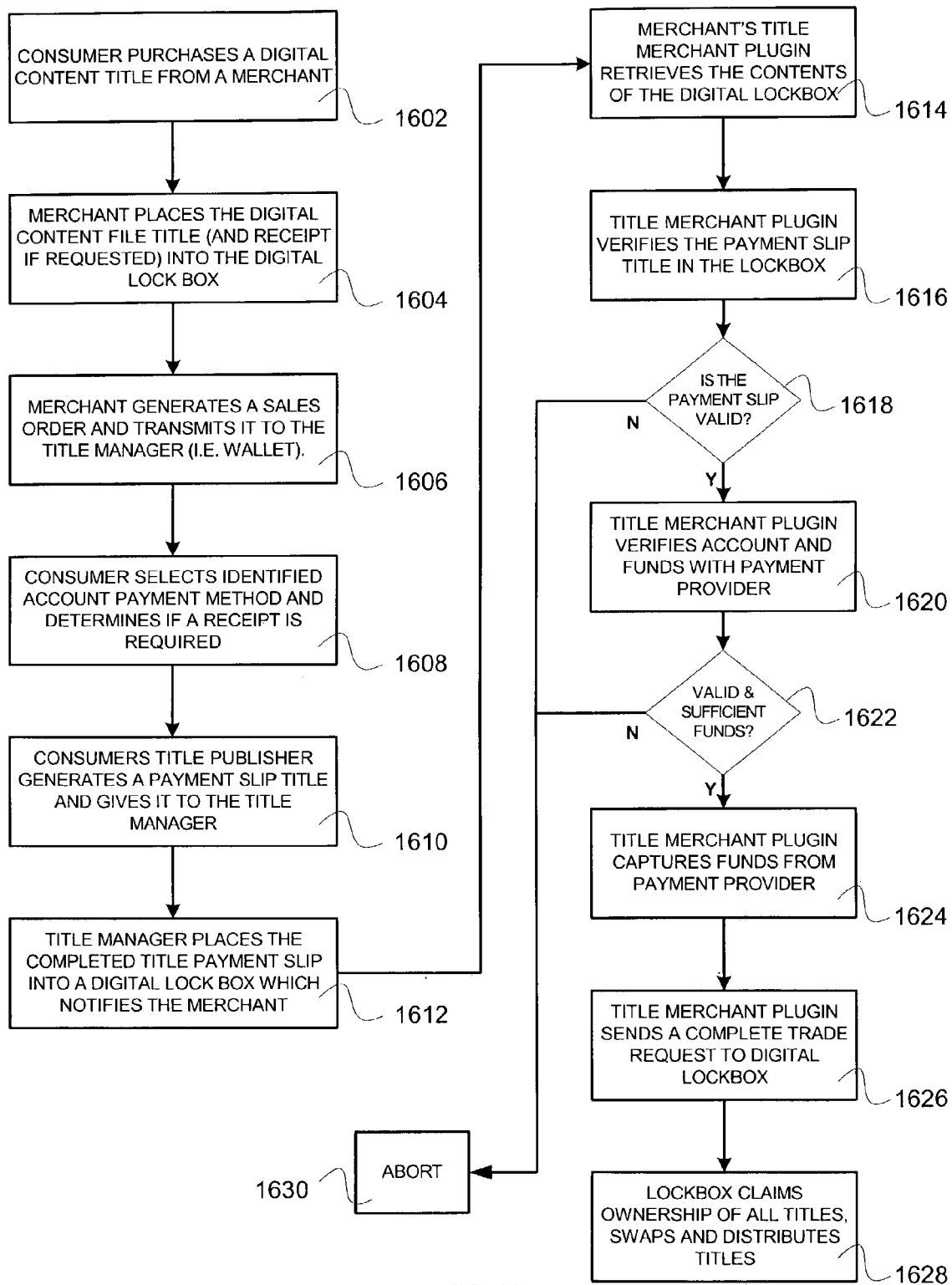
FIGS. 16-22B are flow charts showing steps for performing merchant transactions according to an embodiment of the invention.

FIG. 16 is an exemplary flow chart describing the steps in which the consumer chooses an identified account payment structure for the payment slip title. In this example, an identified (or named) account could be a Visa credit card account where the owner of the account is named on the card as well as the card number. This differs from a blinded account where the owner and account information is not divulged. This example is intended to show a typical credit card transaction where the title transaction system is setup to handle traditional payment mechanisms using current, traditional payment provider networks and technologies. In step 1602, the consumer purchases a digital content file title from a merchant, such as MerchantStore.com. In step 1604, the merchant places the titles expressing rights to the digital content files and if requested a digital receipt into the digital lockbox 1212. In step 1606 the merchant generates a sales order title and transmits it to the consumer's title manager 1208. In step 1608, the consumer then selects the desired form of payment and if a receipt is required from the merchant. In this example, the consumer would select a Visa credit card account. In step 1610, the consumer's title publisher 1206 creates a payment slip title and in step 1612 the title manager 1208 places it into the digital lockbox 1212 which then notifies the merchant. In step 1614, the merchant's title merchant plugin 1210d retrieves the contents of the lockbox. In step 1616, the title merchant plugin 1210d verifies the payment slip title and if valid (step 1618) may verify the identified account and funds in step 1620. If the account is valid and sufficient funds are available (step 1622), the title merchant plugin may capture funds from the payment provider 1216 (step 1624). In step 1626 the title merchant plugin sends a complete trade request to the digital lockbox. In step 1628 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 17:
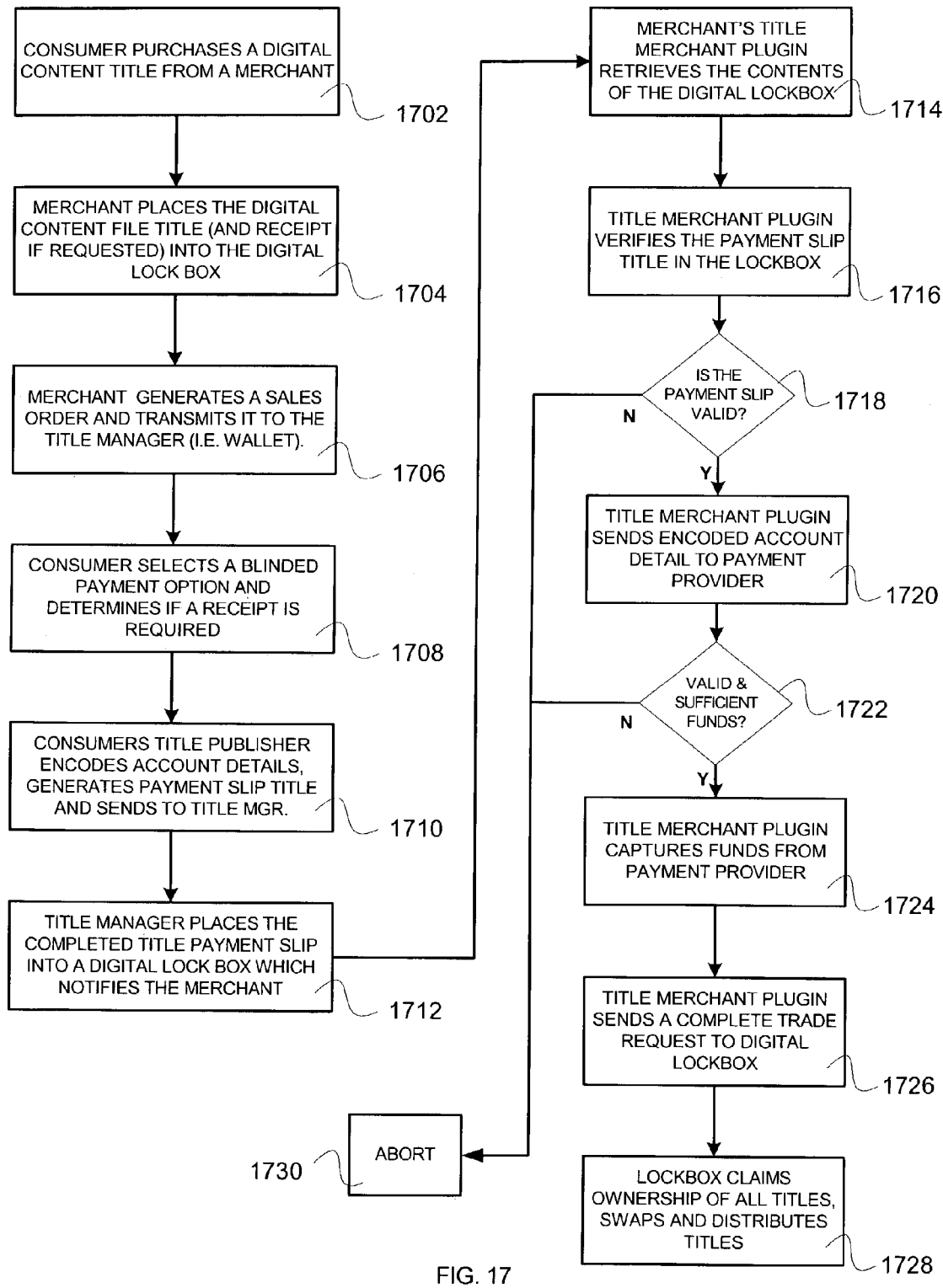

FIG. 17 is an exemplary flow chart describing the steps in which the consumer chooses a blinded payment structure for the payment slip title. In this example, a blinded account is used as the payment mechanism in order to protect the account holders name and the account number. The actual account in this case can be a credit card, bank card or other account or even some other payment mechanism. In step 1702, the consumer purchases a digital content file title from a merchant, such as MerchantStore.com. In step 1704, the merchant places the titles expressing rights to the digital content files and if requested a digital receipt into the digital lockbox 1212. In step 1706 the merchant generates a sales order title and transmits it to the consumer's title manager 1208. In step 1708, the consumer then selects the desired form of payment and if a receipt is required from the merchant. In this example, the consumer would select a blinded Visa credit card account. In step 1710, the consumer's title publisher 1206 creates a payment slip title using encoded account information (rather than clear text account information) and in step 1712 the title manager 1208 places it into the digital lockbox 1212 which then notifies the merchant. In step 1714, the merchant's title merchant plugin 1210*d* retrieves the contents of the lockbox. In step 1716, the title merchant plugin 1210*d* verifies the payment slip title and if valid (step 1718) sends the encoded account information to a payment provider for approval in step 1720. If the account is valid and sufficient funds are available (step 1722), the title merchant plugin may capture funds from the payment provider 1216 (step 1724). In step 1726 the title merchant plugin sends a complete trade request to the digital lockbox. In step 1728 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 18:
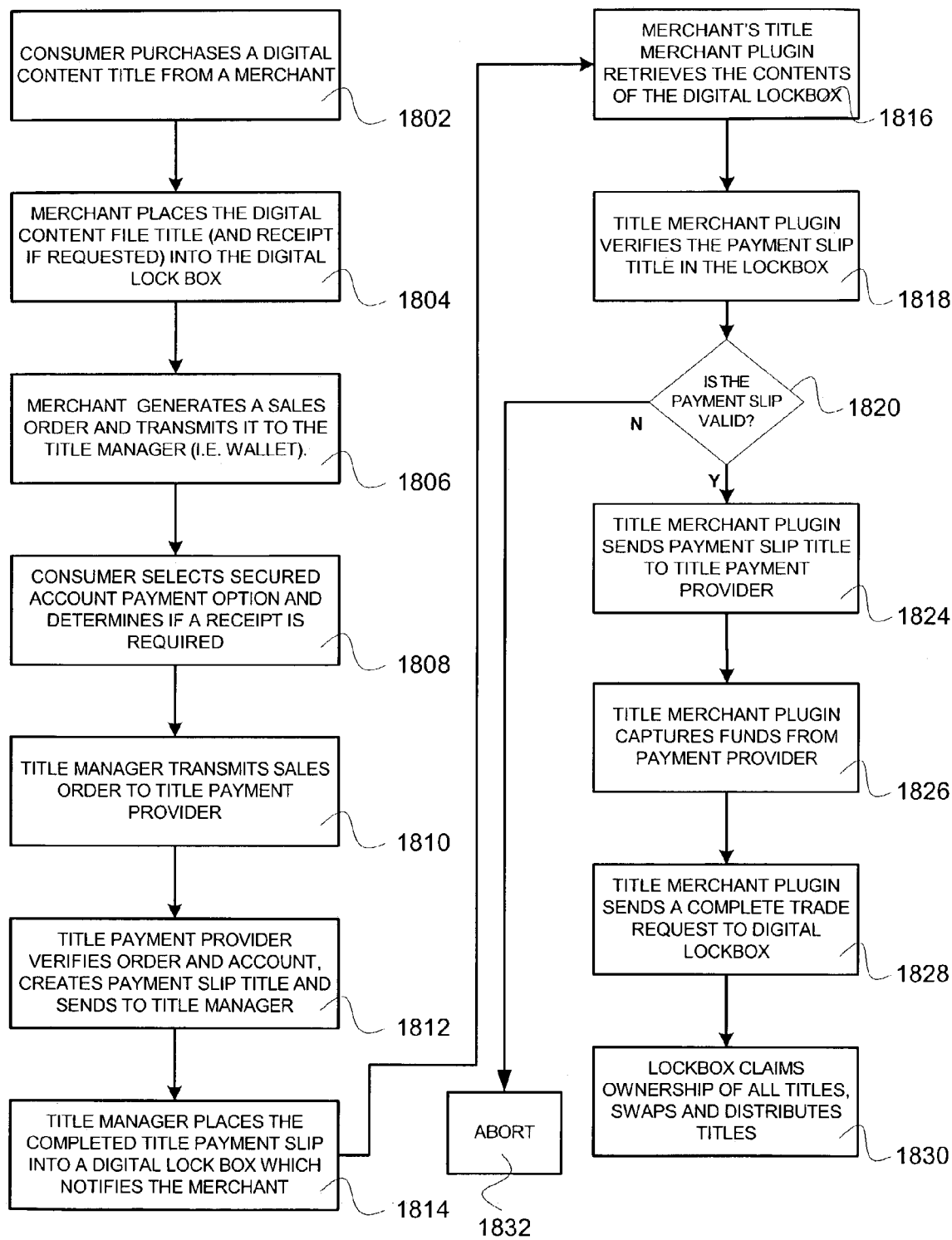

FIG. 18 is an exemplary flow chart describing the steps in which the consumer chooses a secured account payment structure for the payment slip title. In this example, a secure account is used as the payment mechanism in order to protect the account holders name and the account number. The actual account in this case can be a credit card, bank card or other account or even some other payment mechanism. In this example, a secured account differs from a blinded account in that the secure code used for approving the release of funds is obtained by the consumer rather than the merchant. This example is intended to show the flexibility of the title transaction system in supporting a variety of transaction processes. In step 1802, the consumer purchases a digital content file title from a merchant, such as MerchantStore.com. In step 1804, the merchant places the titles expressing rights to the digital content files and if requested a digital receipt into the digital lockbox 1212. In step 1806 the merchant generates a sales order title and transmits it to the consumer's title manager 1208. In step 1808, the consumer then selects the desired form of payment and if a receipt is required from the merchant. In this example, the consumer would select a secured account payment option. In step 1810 the consumer's title manager 1208 transmits the sales order to the title payment provider 1214. In step 1812 the title payment provider 1214 verifies the order and account, and if the account is valid and sufficient funds are available, creates a payment slip title and transmits it back to the consumer's title manager 1208. In this example, the title enabled payment provider's title publisher 1214*b* creates the payment slip. Also in this example, the title enabled payment provider creates an approval code that the merchant can verify. In step 1814, the consumer's title manager 1208 places it into the digital lockbox 1212 which then notifies the merchant. In step 1816, the merchant's title merchant plugin 1210*d* retrieves the contents of the lockbox. In step 1818, the title merchant plugin 1210*d* verifies the payment slip title and if valid (step 1820) sends the payment slip title to the title enabled payment provider 1214. In step 1826 the title merchant plugin may capture funds from the title enabled payment provider 1214. In step 1828 the title merchant plugin sends a complete trade request to the digital lockbox. In step 1830 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 19:
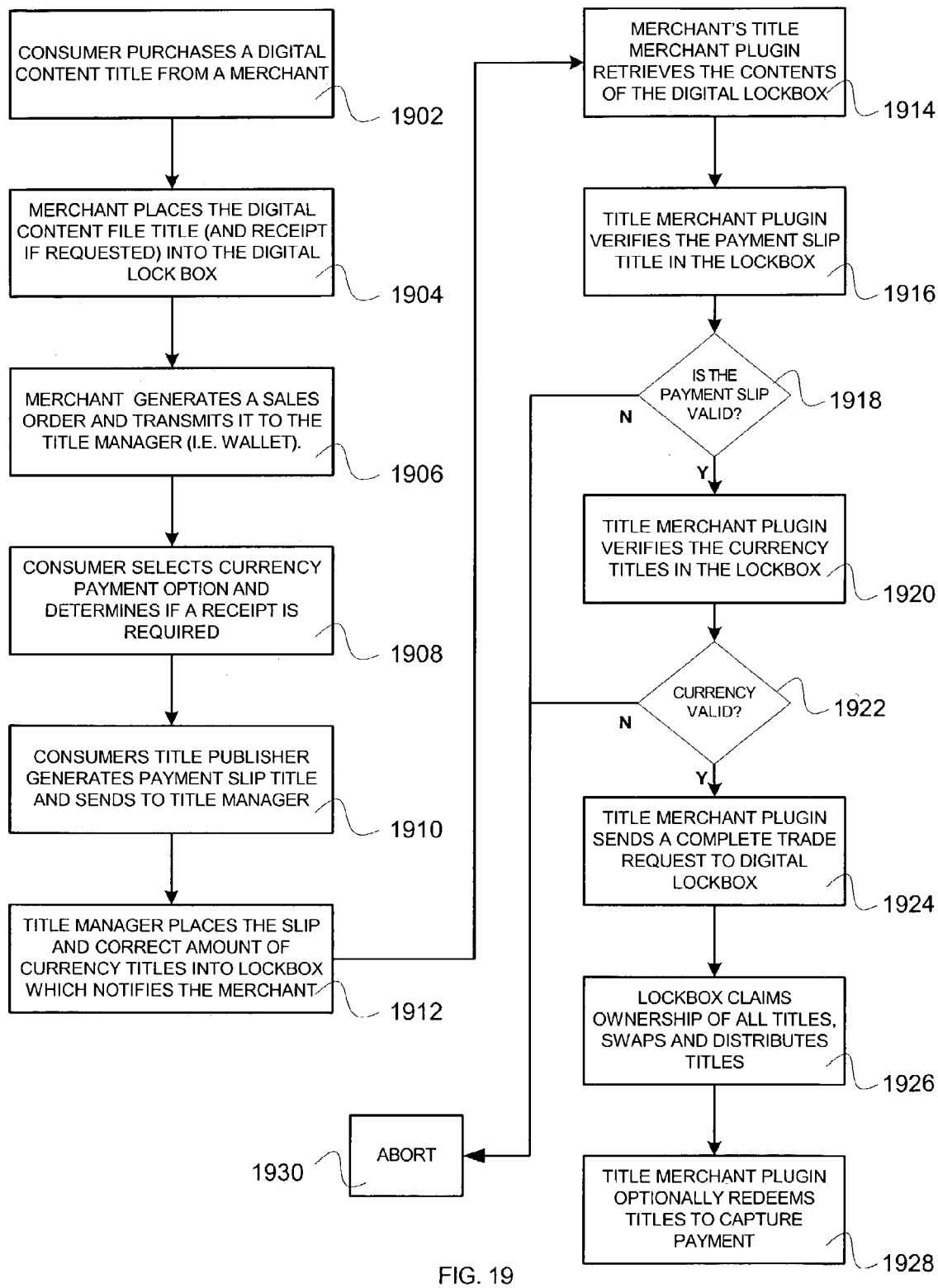

FIG. 19 is an exemplary flow chart describing the steps in which the consumer chooses a currency payment structure for the payment slip title. In this example, currency titles (such as US dollars) are used as the payment mechanism. This is similar to a physical cash transaction. The currency can be any type of currency supported by the merchant and/or their payment provider. For example, the merchant could support Euros or even reward points as valid currency. In step 1902, the consumer purchases a digital content file title from a merchant, such as MerchantStore.com. In step 1904, the merchant places the titles expressing rights to the digital content files and if requested a digital receipt into the digital lockbox 1212. In step 1906 the merchant generates a sales order title and transmits it to the consumer's title manager 1208. In step 1908, the consumer then selects the desired form of payment and if a receipt is required from the merchant. In this example, the consumer would select US dollars currency. In step 1910, the consumer's title publisher 1206 creates a payment slip title referring to the US dollar currency and in step 1912 the title manager 1208 places the payment slip title and the correct amount of currency titles into the digital lockbox 1212 which then notifies the merchant. In this example, the payment slip title is provided but maybe optional in currency title transactions since the currency titles are valid themselves and do not refer to a user held account. Additionally, the title manager 1208 can process the currency titles to ensure that the exact amount of currency titles is placed in the digital lockbox 1212. This processing depends on the currency type being supports, for instance the title manager may need to divide the currency or go through a process where in the title manager exchanges the currency in the wallet for change. In step 1914, the merchant's title merchant plugin 1210*d* retrieves the contents of the lockbox. In step 1916, the title merchant plugin 1210*d* verifies the payment slip title and if valid (step 1918) verifies the currency titles in step 1920. If the currency titles are valid (step 1922) the title merchant plugin sends a complete trade request to the digital lockbox in step 1924. In step 1926 the digital lockbox completes the trade by claiming ownership over the titles in the lockbox, swapping the titles, and distributing them to the appropriate party. In this example, the consumer may receive the digital content file titles, and the merchant may receive the payment slip title and the currency titles. The merchant can optionally redeem the currency titles to capture payment in their account as indicated in step 1928.

Figure 20:
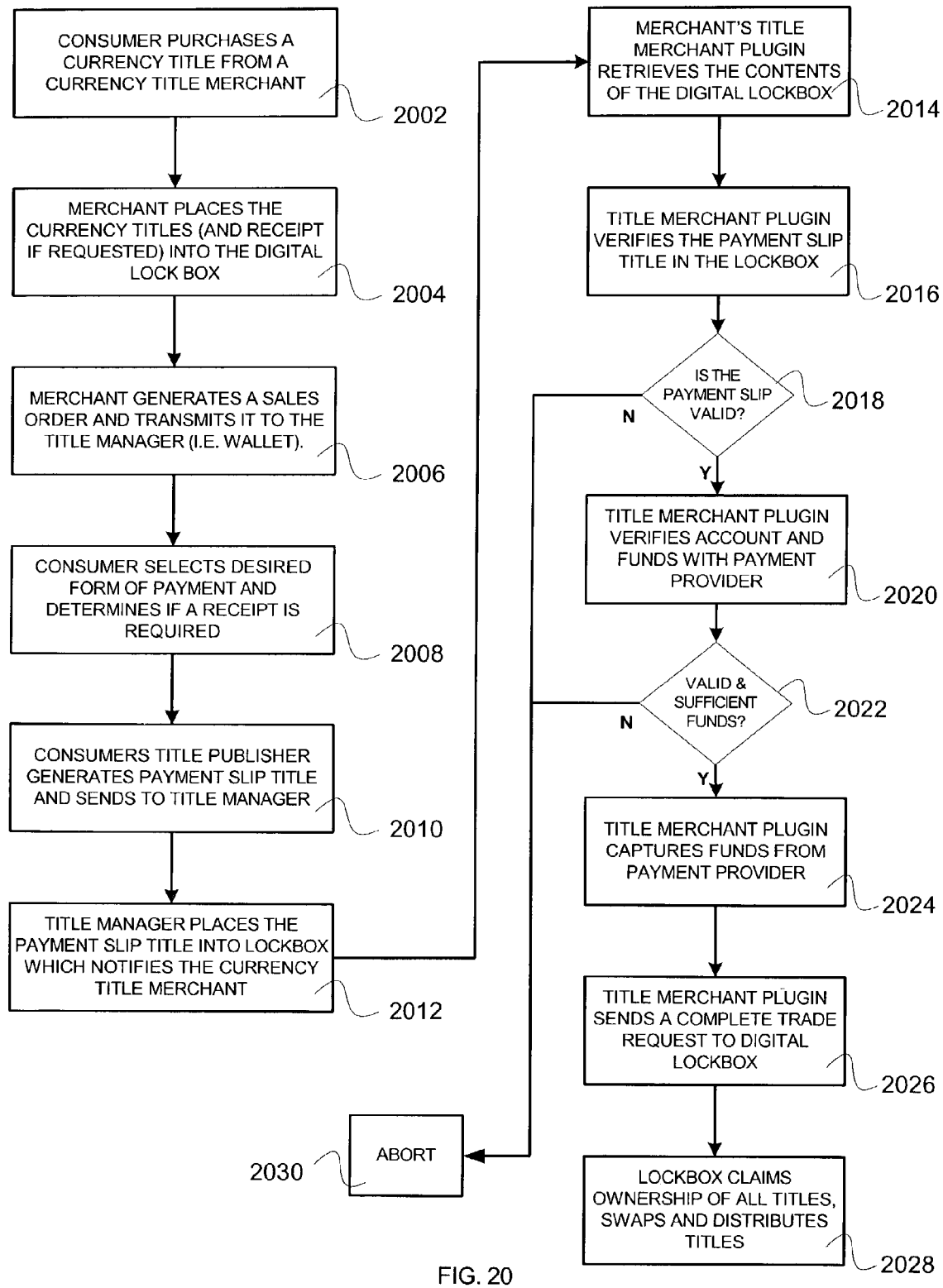

FIG. 20 is an exemplary flow chart describing the steps in which the consumer purchases additional currency title using an account payment structure for the payment slip title. In this example the user is using a credit card (identified) account in order to get currency titles. In step 2002, the consumer purchases the currency title from a merchant, such as BankStore.com. In step 2004, the merchant places the currency title and if requested a digital receipt into the digital lockbox 1212. In step 2006 the merchant generates a sales order title and transmits it to the consumer's title manager 1208. In step 2008, the consumer then selects the desired form of payment and if a receipt is required from the merchant. In this example, the consumer selects a checking account. In step 2010, the consumer's title publisher 1206 creates a payment slip title and in step 2012 the title manager 1208 places the payment slip title into the digital lockbox 1212 which then notifies the merchant. In step 2014, the merchant's title merchant plugin 1210*d* retrieves the contents of the lockbox. In step 2016, the title merchant plugin 1210*d* verifies the payment slip title and if valid (step 2018) verifies the account and funds in step 2020. If the account is valid and sufficient funds available (step 2022) the title merchant plugin sends a complete trade request to the digital lockbox in step 2024. In step 2026 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 21:
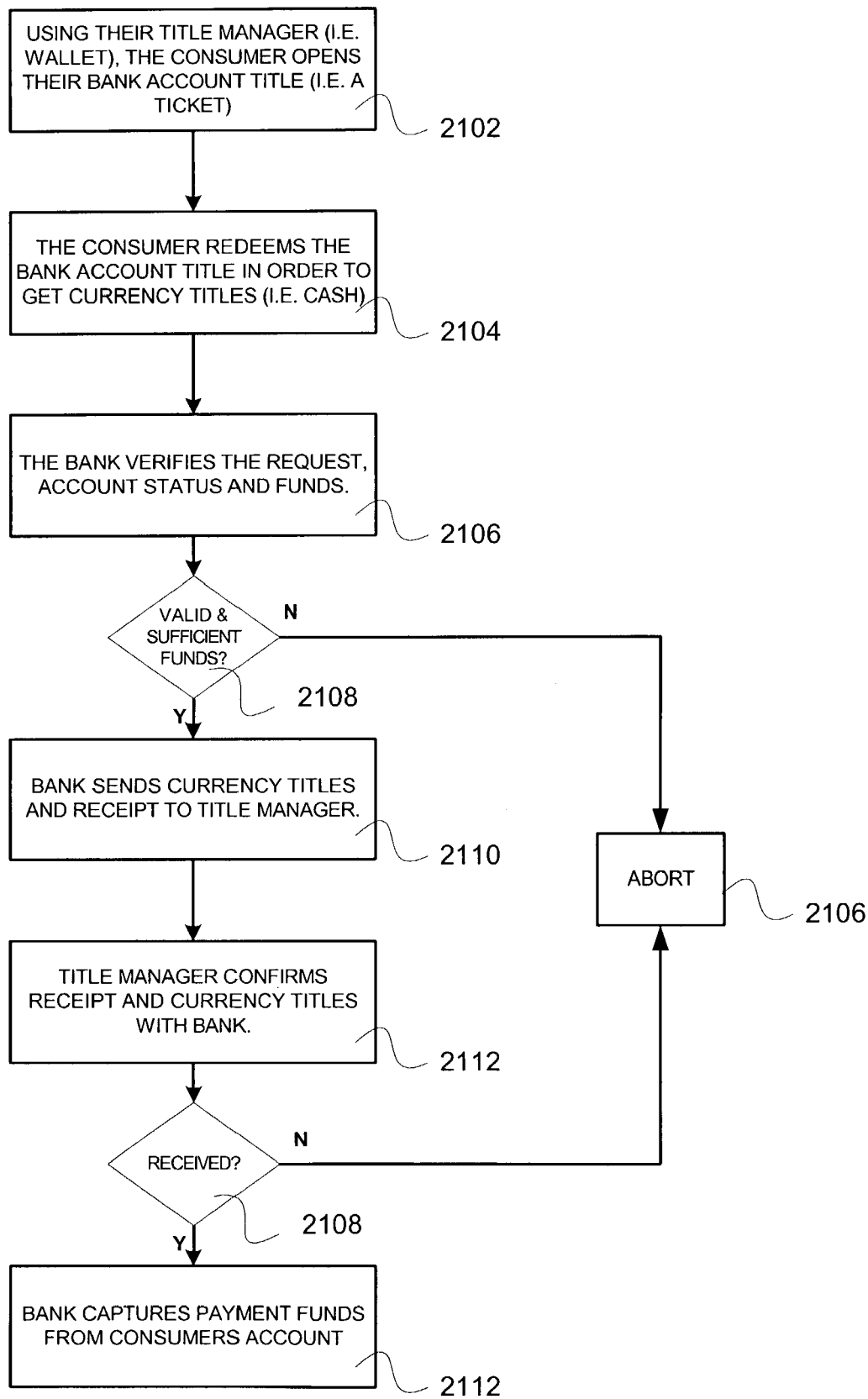

FIG. 21 is an exemplary flow chart describing the steps in which a consumer uses a bank checking account title to purchase currency titles. This flow is an alternate and simplified flow to that shown in FIG. 20 and is intended to demonstrate how a consumer can obtain currency similar to obtaining cash at an ATM. In step 2102 the consumer views their bank account title using the wallet function in the title manager 1208. Since this title access the consumer's checking account it would be a ticket. In step 2104 the consumer redeems the bank account title in order to get currency titles (e.g. cash). The redemption process could be one of many redeem methods that the bank account title supports and could be displayed to the consumer simply as "get cash". In step 2106 the bank verifies the request, account status, and ensures that sufficient funds are available. The bank processes this redemption request because of the instructions contained within the title and in this example the bank would be title enabled similar to the merchant site 1210. If valid and sufficient funds (step 2108), the bank sends the correct amount of currency titles to the consumer's title manager 2110. If the account is invalid or insufficient funds are available, then the process is aborted in step 2106. In step 2112 the title manager confirms receipt and currency titles with the bank. If the acknowledgement is received (step 2108) by the bank, then the bank complete its end of the transaction and captures payment funds from the consumers account in step 2112.

Figure 22A:
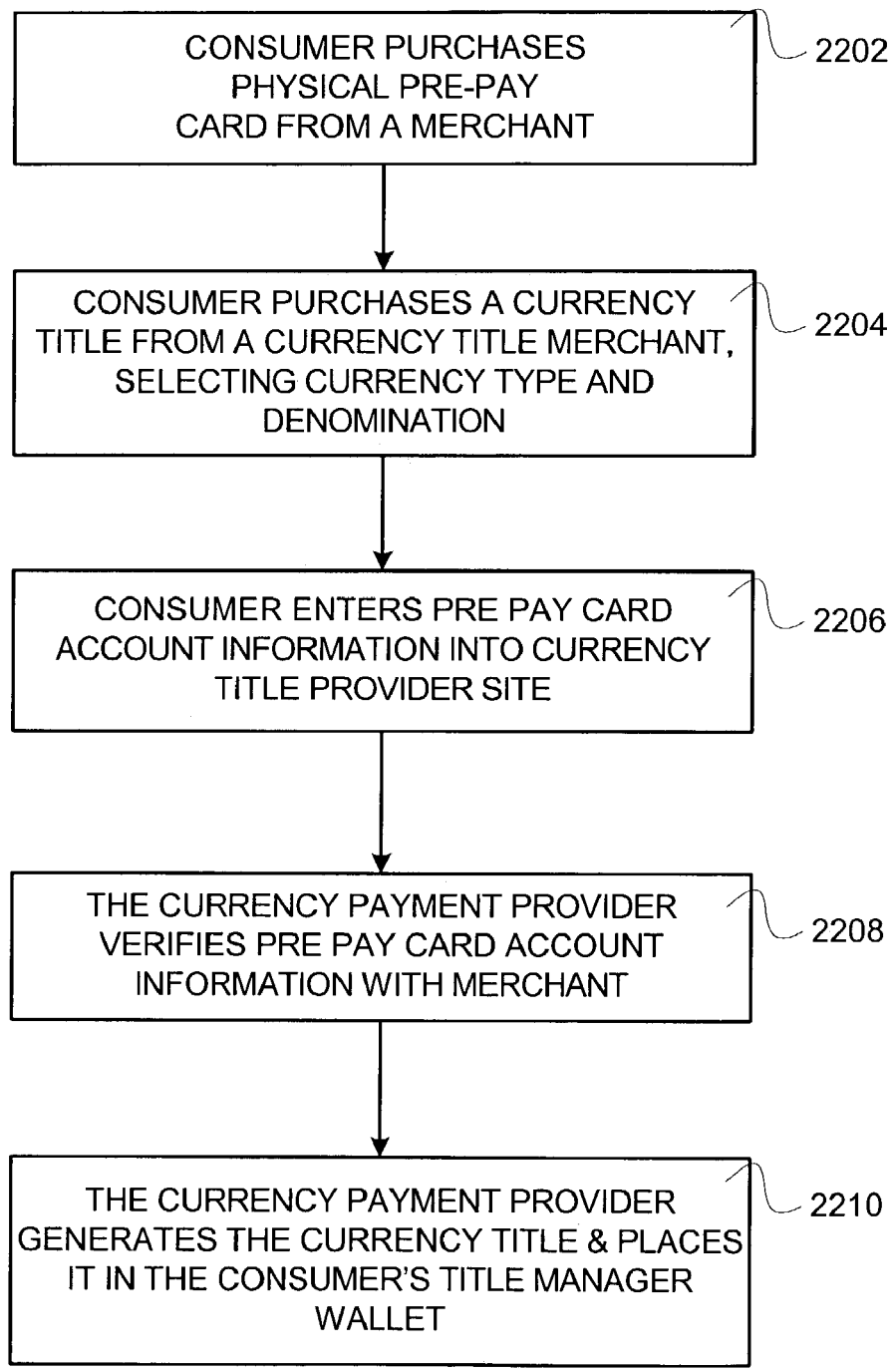

FIG. 22A is an exemplary flow chart describing the steps in which consumer uses a pre-pay card to purchase a currency title. In step 2202, the consumer purchases a physical pre-pay card from a merchant. In step 2204, the consumer then uses the pre-pay card to purchase a currency title from a currency title merchant, selecting a specific currency type and denomination, for instance, $5.00. In step 2206, the consumer enters the pre-pay card account information into the currency title provider web site. In step 2208, the currency payment provider verifies the account information with the merchant. In step 2210, if the pre-pay card is valid, the currency payment provider generates the currency title and places it in the consumer's title manager wallet.

Figure 22B:
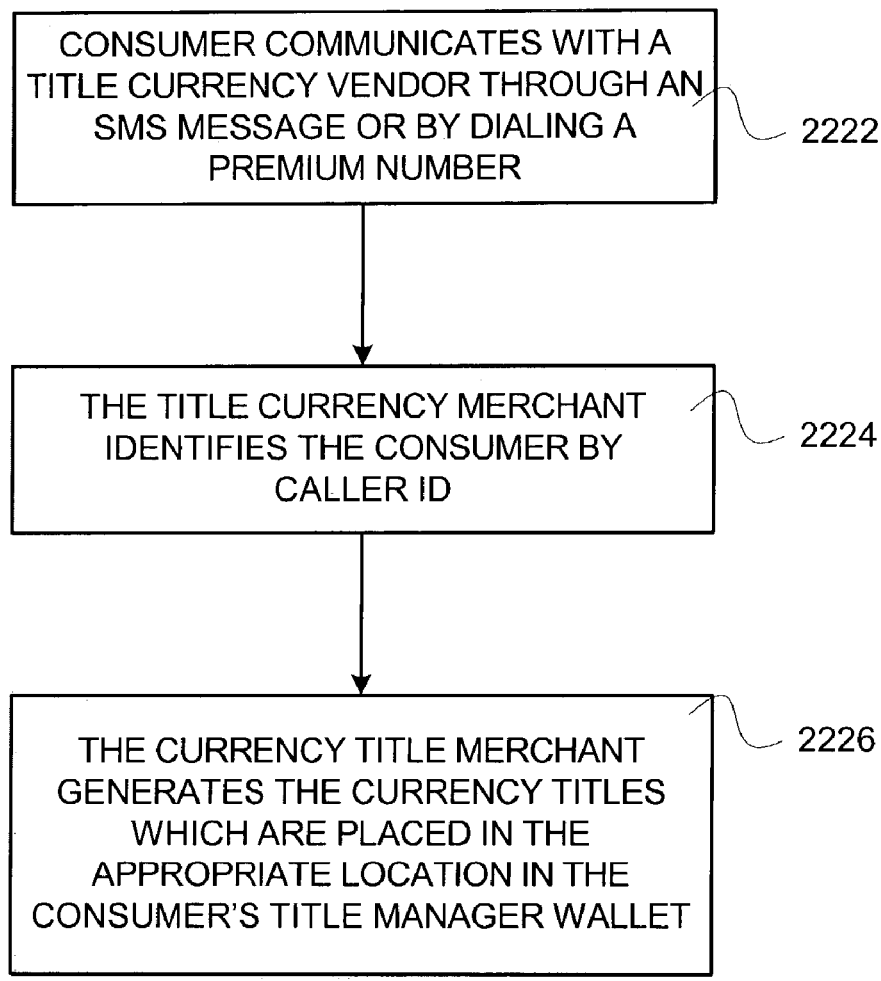

FIG. 22B is an exemplary flow chart describing the steps in which consumer bills the purchase of a currency title to a telecommunications account, such a mobile phone bill. In step 2222, the consumer communicates with a title currency vendor through an SMS message or by directly dialing the premium number. Upon receipt or connection in step 2224, the title currency merchant identifies the consumer by caller identification. In step 2226, the currency title merchant then generates the currency title which is placed in the appropriate location in the consumer's title manager wallet.

D. Methods of Facilitating Contact Management

Figure 23:
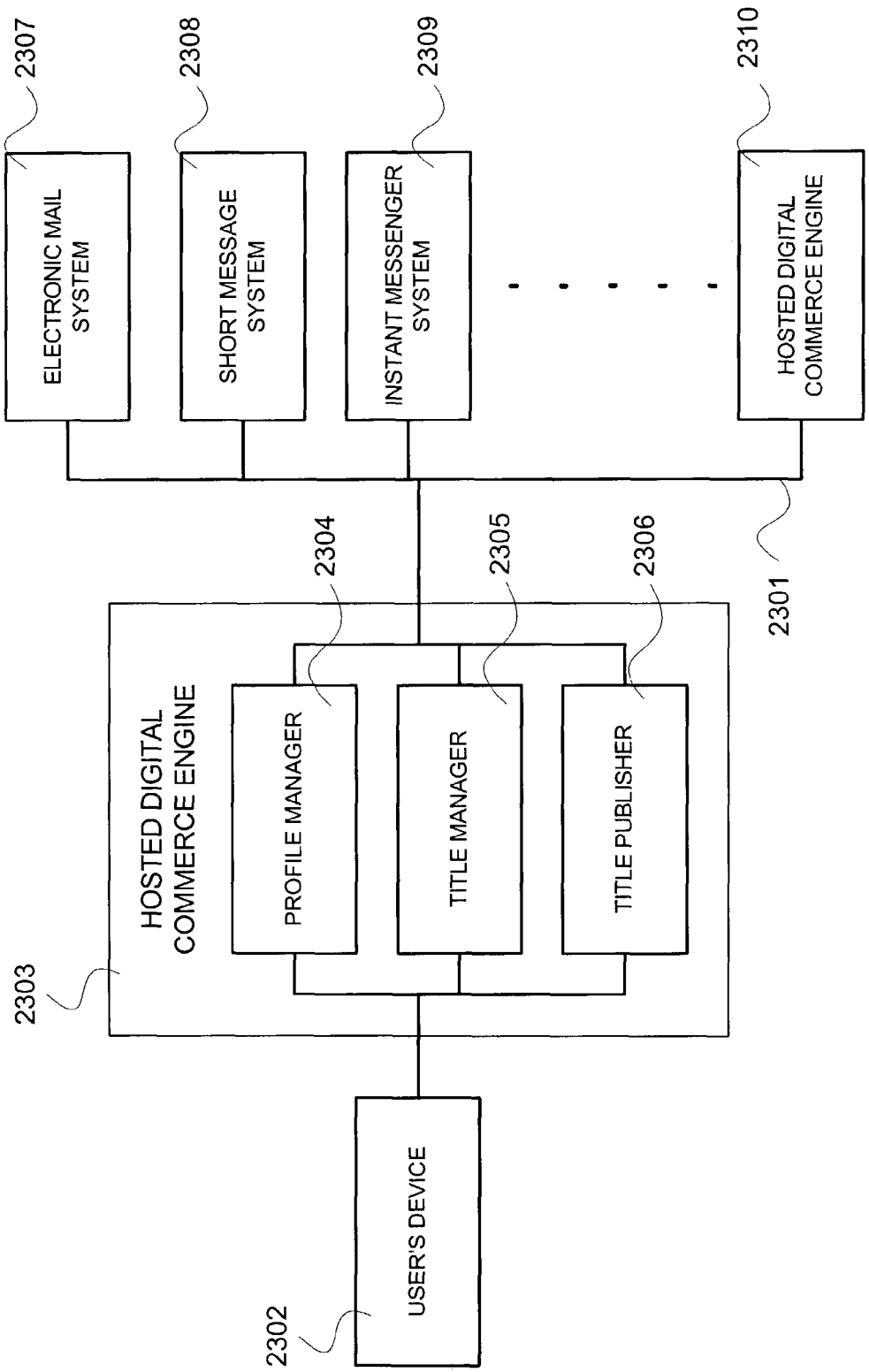
FIG. 23 depicts a simplified diagram in which an online contact management system is optimized through the redemption of titles, according to an embodiment of the invention.

FIG. 23 depicts a simplified diagram according to one embodiment of the invention, in which an online contact management system is optimized through the redemption of titles.

The exchange of paper business cards has been a familiar part of business for many years. The advent of the Internet enabled business cards to be digitized, and the exchange to be electronic. And while this was certainly easier and faster, digital business cards still suffered from the static content inherited from paper business cards. Previously, there had been no optimal way to update transmitted digital business cards short of permanently maintaining distribution lists and re-transmitting the updated digital business cards themselves.

FIG. 23 is an exemplary diagram of an online contact management system. This system is comprised of a user's device 2302, a hosted digital commerce engine 2303 that supports a profile manager 2304, title manager 2305, and title publisher 2306, as well as an electronic mail system 2307, a short message service system 2308, instant messenger system 2309, and additional hosted digital commerce engine 2240. While only these exemplary examples are depicted, any number can be supported by the invention. Each of the system elements is coupled to the other using a network protocol 2301, such as TCP/IP over the Internet.

The hosted digital commerce engine 2303 (DCE) is intended to depict an example implementation of the invention whereby the DCE hosts the title enabled systems on behalf of consumers that use devices 2302 to access the DCE. The title enabled systems include the profile manager 2304 that stores and manages the consumers profile information including their contact information, the title manager 2305 that stores and manages the consumer's titles, and the title publisher 2306 that generates titles for the DCE. In other embodiments of the invention, these title enabled systems may reside independently of each other, or even be integrated into a desktop application.

The electronic mail system 2307, short message service system 2308, and instant messenger system 2309 depict external systems that can be used to transmit and deliver titles to other consumers that may or may not use an online title enabled solution. Each of these systems would transmit Titles using their own network protocols and network systems. For example, an electronic mail system 2307 can deliver a title as an attachment to an electronic message using the SMTP protocol. The recipient can retrieve the message using the POP3 protocol, and open the attachment in a title enabled application.

An additional hosted digital commerce engine 2310 is shown in FIG. 23 to demonstrate that consumers on separate DCEs can share contact information between each other. In this case the hosted digital commerce engine 2310 provides the same title enabled components and service as the first engine 2303.

As previously described, a title is an object that may have a number of elements and attributes including embedded digital content, ownership attributes, and copy permissions. In this example, a contact title can redeem a single contact record, such as an electronic business card, or a contact list composed of multiple contact records, as in business directory. The contact record contains information that would be commonly found in a business card, such as full name, company name, address, phone number, email, etc. The contact title comprises as a pointer to the location of the contact record or contact list. That is, it directs the title management system to the specific online profile manager 2304 upon which the contact record or contact list resides.

For instance, a contact owner creates a single contact record and stores it on a specific profile manager 2304. The owner then requests a contact title, which would then be generated by the title publisher 2306 and stored in the title manager 2305 for distribution by the contact owner to users. Users could then use the contact title to redeem the latest contact record whenever needed.

The profile manager 2304 can store any type and quantity of information on behalf of the user including business, personal, financial, preference, and emergency information. Furthermore, any variation of contact titles can also be generated by the title publisher 2306 on behalf of the user. The titles can be any number of tags, tickets, or tokens as deemed necessary by the user. For instance, a tag can be published that points to business contact information as described previously. This tag can then be freely copied and distributed to other business recipients. By redeeming the tag, the recipient will only be able to dynamically read the business contact information from the profile. Alternatively, a ticket can be published that points a trusted business associate to financial information. This ticket can be redeemed by the business associate to dynamically read certain financial records within the profile to support the users business needs. Another example would be to give a ticket to a spouse in order to read and update certain profile records.

Figure 24A:
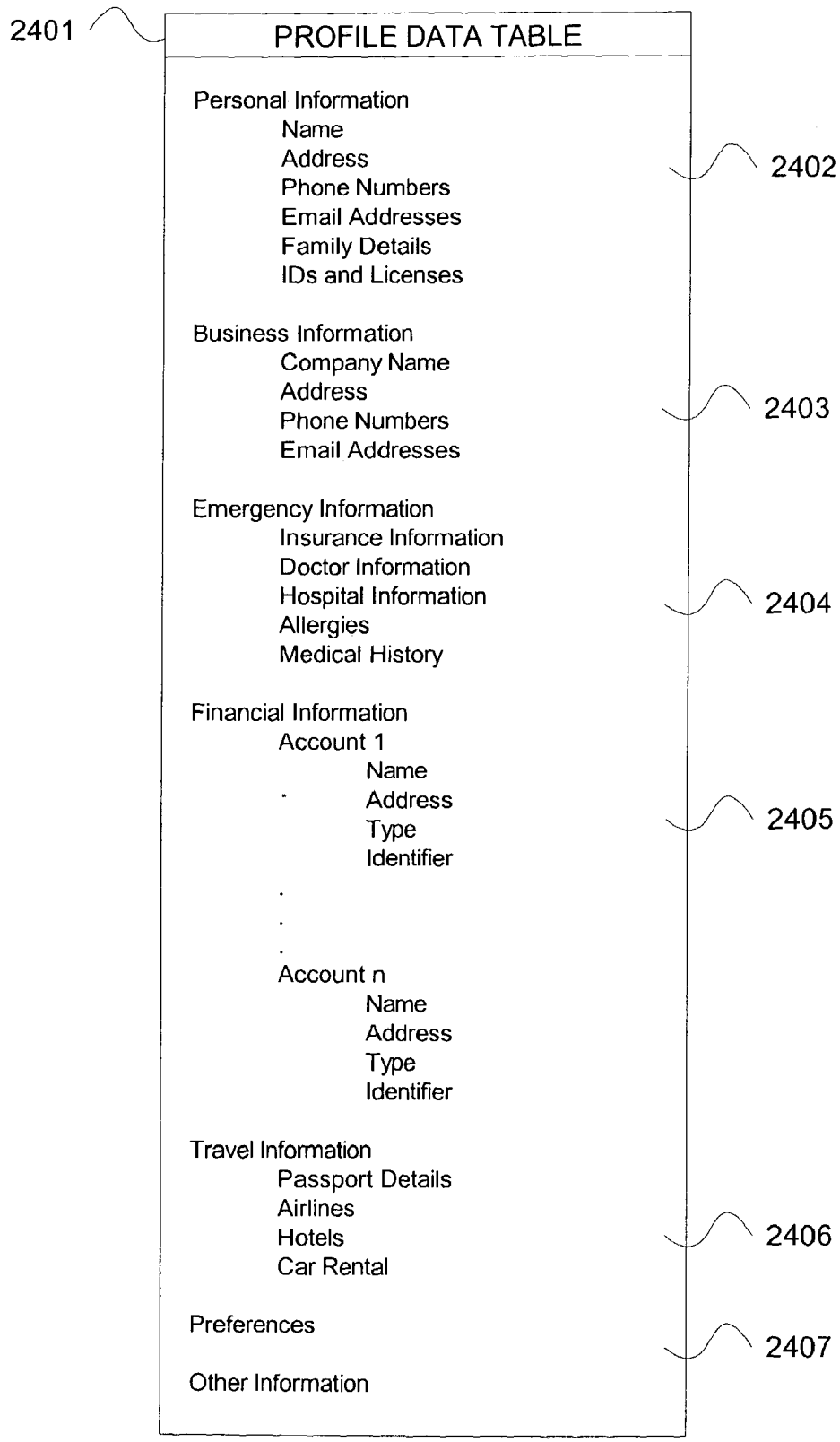

FIG. 24A provides an example of a profile data structure 2401 that would be stored by and managed by the profile manager 2304, as shown in FIG. 23. The profile data will be based on a well defined schema that can vary from implementation to implementation. Generally the structure of the data will be flexible to accommodate a variety of information and data types. As shown in FIG. 24A, the example data structure consists of several profile sections. The personal information section 2402 provides personal information on the user, including name, address, and contact information. The business information section 2403 provides business information including company name, address, and contact information. The emergency information section 2404 provides emergency information on the user such as medical insurance numbers and doctor contact information. The financial information section 2405 provides financial information on the user such as bank accounts and credit cards. The travel information section 2406 provides detailed information on the users travel related activities such as preferred airlines, reward programs, and car rental agencies. The preference section 2407 will provide a list of preferences of the user including system preferences, interface preferences, and notifications. Other information can be contained in the profile. Additionally, each informational element within the profile can be a pointer to an external system, third party profile system, or even a title.

Figure 24B:
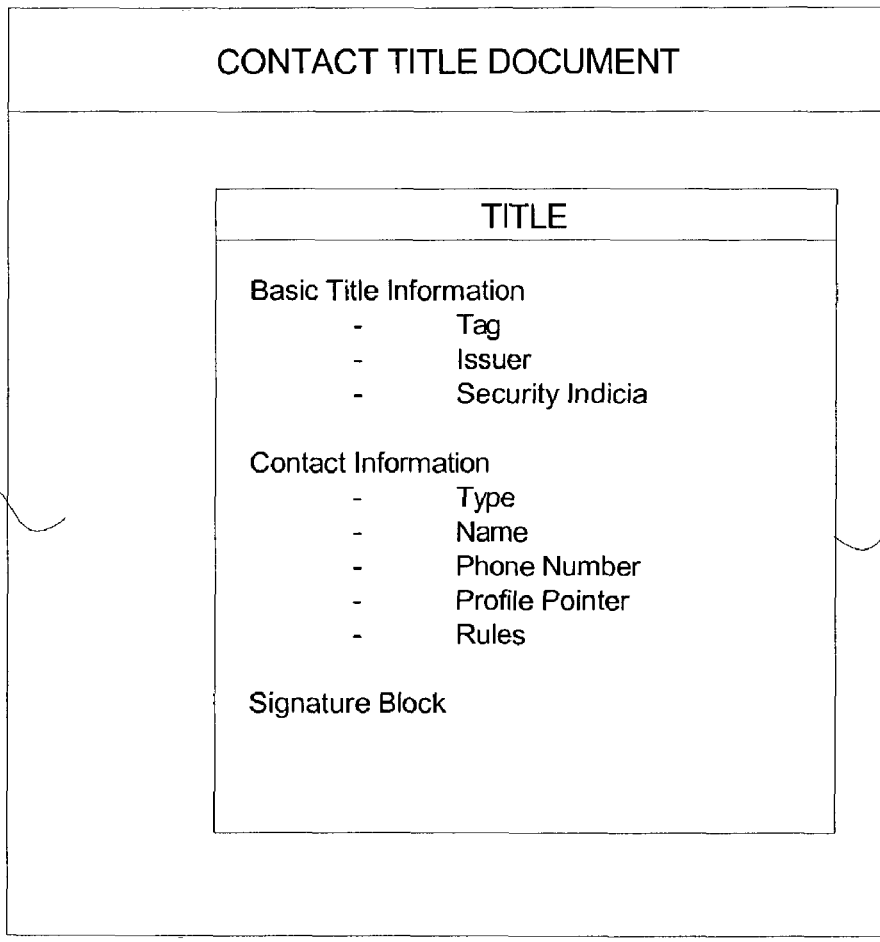

FIG. 24B is an exemplary diagram depicting a contact title. The contact title 2410 provides a pointer back to the profile stored in the profile manager 2304. In this example, the contact title 2410 is a tag and can be freely copy and distributed. Since the title is a tag it does not have an authenticator stub. The title portion of the document contains basic title information including issuer and any applicable security indicia. The contact information 2412 portion of the title would be contained with content elements within a title. The contact information 2412 provides basic information on the contact as well as a pointer to the actual profile. The basic information can contain simple contact information for reference purposes and in the event that the online profile is not available and no cached copy is available. The contact information 2412 portion of the title also contains a rules element that defines any usage rules regarding the profile such as what information, when it can be obtain, and how it maybe obtained. Furthermore, this element can contain a query statement or even many query statements restricting or opening the information available to the owner of the contact title. The query statement or statements can be used by the profile manager 2304 to execute queries against the profile database. The integrity of the queries can be protected within a title by the title infrastructure or even by an applied digital signature. If confidentiality of the query is required, then an appropriate encoding structure can be implemented and conveyed within the title.

Figure 24C:
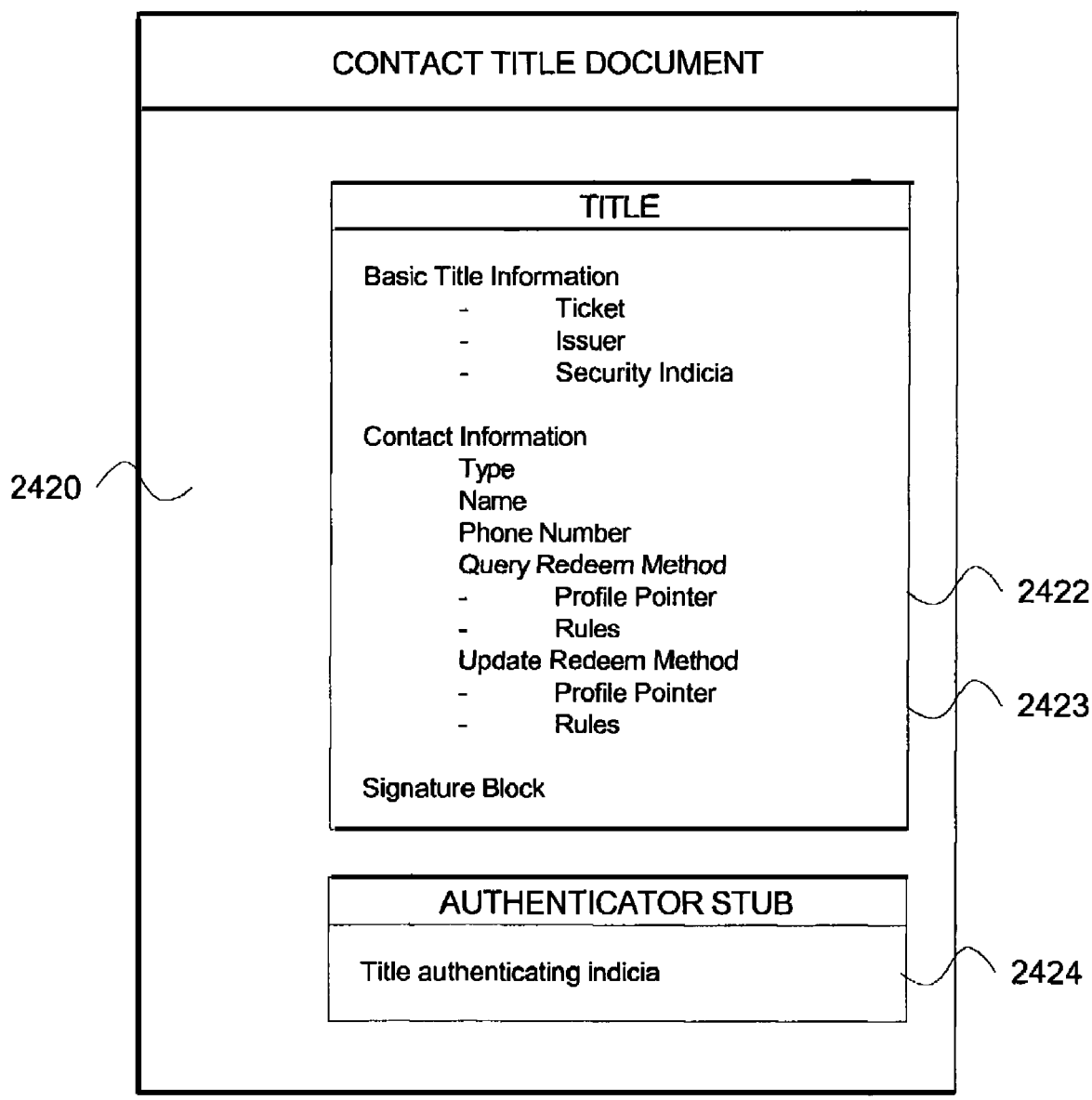

FIG. 24C is an exemplary diagram depicting another contact title. This contact title is a ticket and provides two distinct redemption methods. This differs from the previous example in FIG. 24B which had a single query redemption method. The query redeem method 2422 allows the owner of the ticket to query the profile to obtain information. The update redeem method 2423 allows the owner of the ticket to update the information contained within the profile. This structure provides very fine grained control over the viewing and updating of information within a profile. It is also an efficient structure with which to implement confidentiality policies in that certain people cannot view information but are allowed to enter or update information. Such a policy maybe implemented in government agencies or even in corporations where highly confidential information can be entered but not viewed after it has been committed. The rules and query statements can be applied to the title as a whole and/or separately within the redeem methods. Since the title depicted in FIG. 24C is a ticket it will have an authenticator stub 2424.

FIG. 24D depicts an exemplary contact title table according to an embodiment of the invention. The contact title table 2423 will be used by a title manager 2305 to store all titles obtained by the user including contact titles. These titles maybe stored separately from other titles as shown in FIG. 24D or stored as one large collection of all the user's titles. As shown in FIG. 24D the table can contain any number and type of contact title including tags 2425 and tickets 2427.

Contact titles can refer to individual contacts or a list of contacts, or set of lists of contacts, or even to other contact titles. This allows groups to be established and easily shared among members, with each member gaining controlled and granular access to dynamic and up to date information on other members. These types of titles would be similar in structure to the titles shown in FIG. 24B and FIG. 24C and would also be stored and managed by the title manager 2305. The rules within these titles can establish dependencies such as the user must be a member of the group in order for the title to be valid. Furthermore, these types of titles can be used between hosted digital commerce engines 2303 for collaboration, backup, and redundant operations.

Figure 25:
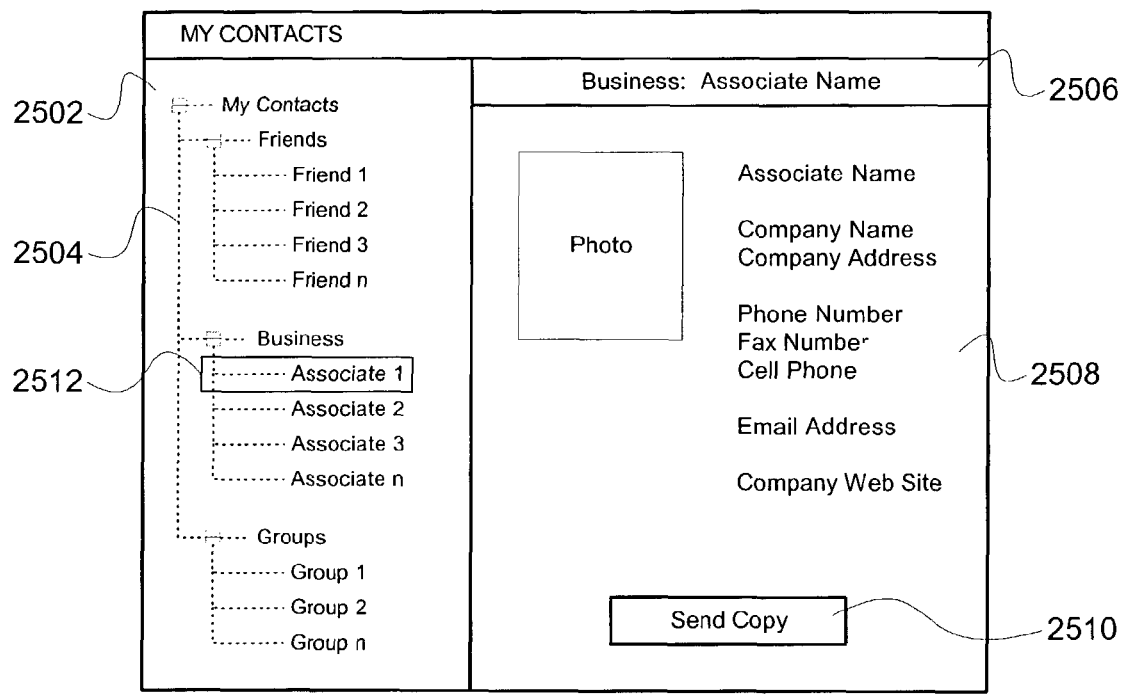
FIG. 25 depicts exemplary title management displays according to an embodiment of the invention.

FIG. 25 displays a simplified online title manager interface as would be displayed in a browser on user's device 2302, as described in FIG. 23. The display is divided into two sections, a title folder pane 2502 and a title content pane 2506. The tile folder pane 2502 further organizes the titles into folders based on the type of contact 2504. In this example only contact titles are displayed since it is assumed the user would be viewing their contact information rather than viewing all titles in their repository. Examples include friends, business, and group contact lists. Other types of categorizations can be setup by the user based on the taxonomy of the titles. The title content pane 2506 presents the contact details 2508 referenced by the selected contact title 2512, such as name, company name, company address, telephone number, fax number, cell phone number, email, and a picture. If permissible, the user can send a copy of the contact information to another associate or friend by selecting the send copy button 2510 on the interface. By sending a copy, the user is sharing the contact information and this would only occur if allowed by the title. It is assumed for this example, that the title is a tag and can be freely copied. If the title was a ticket or token, then a shadow copy may be allowed to be shared that provides anyone with a shadow copy to have very limited contact information, but not the full access privileges of the original ticket or token. This method of sharing information is more convenient, flexible and controlled than traditional or historical physical or electronic methods.

Figure 26:
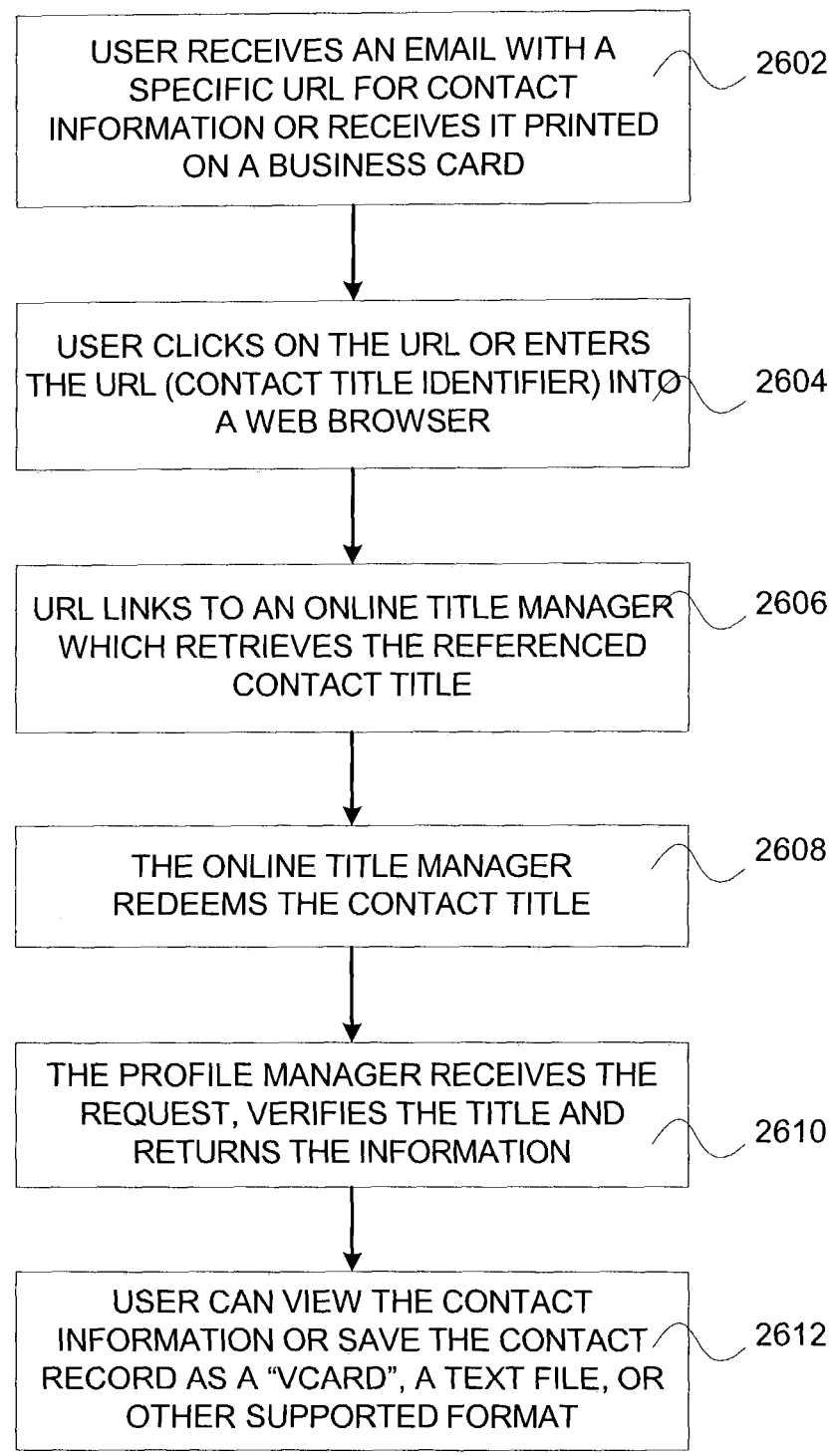
FIGS. 26-28 are flow charts showing steps for facilitating contact management, according to an embodiment of the invention.

FIG. 26 displays a simplified flow chart describing the steps in which a user redeems a contact record (i.e. certain profile information elements) with the contact title identifier. Each contact title has a unique alphanumeric string associated with it, called a contact title identifier. This contact title identifier can be expressed as a URL and by entering this URL (i.e. a string) into the address on the web browser, the contact title, and hence its contact record, can be redeemed, displayed, and downloaded. The user does not even need to be aware of the existence of title management system at all, simply entering the contact title identifier into a browser. This example assumes that the actual title is a tag that is readily available, or the user will be accessing a shadow copy of a ticket or token. This example is useful for sharing contact information outside of the title ecosystem. In step 2525, the user receives an electronic message with a URL linking to an associates business contact information. The URL is a unique identifier for the contact information and can even be printed on a physical business card. An example of the URL can be http://somedce.com/contact?id=xxxx-xxxx-xxxx-xxxx where the id can be a specially encoded sequence of characters that becomes the unique identifier. In step 2527 the user clicks on the URL link in the email message or enters the URL into the address field of their browser. By clicking the link the user is connected to an online title manager 2305 which in turn retrieves the title referenced by the unique identifier as indicated in step 2536. In step 2538 the title manager 2305 redeems the title. In step 2540 the profile manager 2304 verifies the title and if valid retrieves and returns the information according to the rules within the title. In step 2542 the user views the contact information in their browser and can optionally (if supported) save the contact information as a v-card, text file or other supported format.

Figure 27:
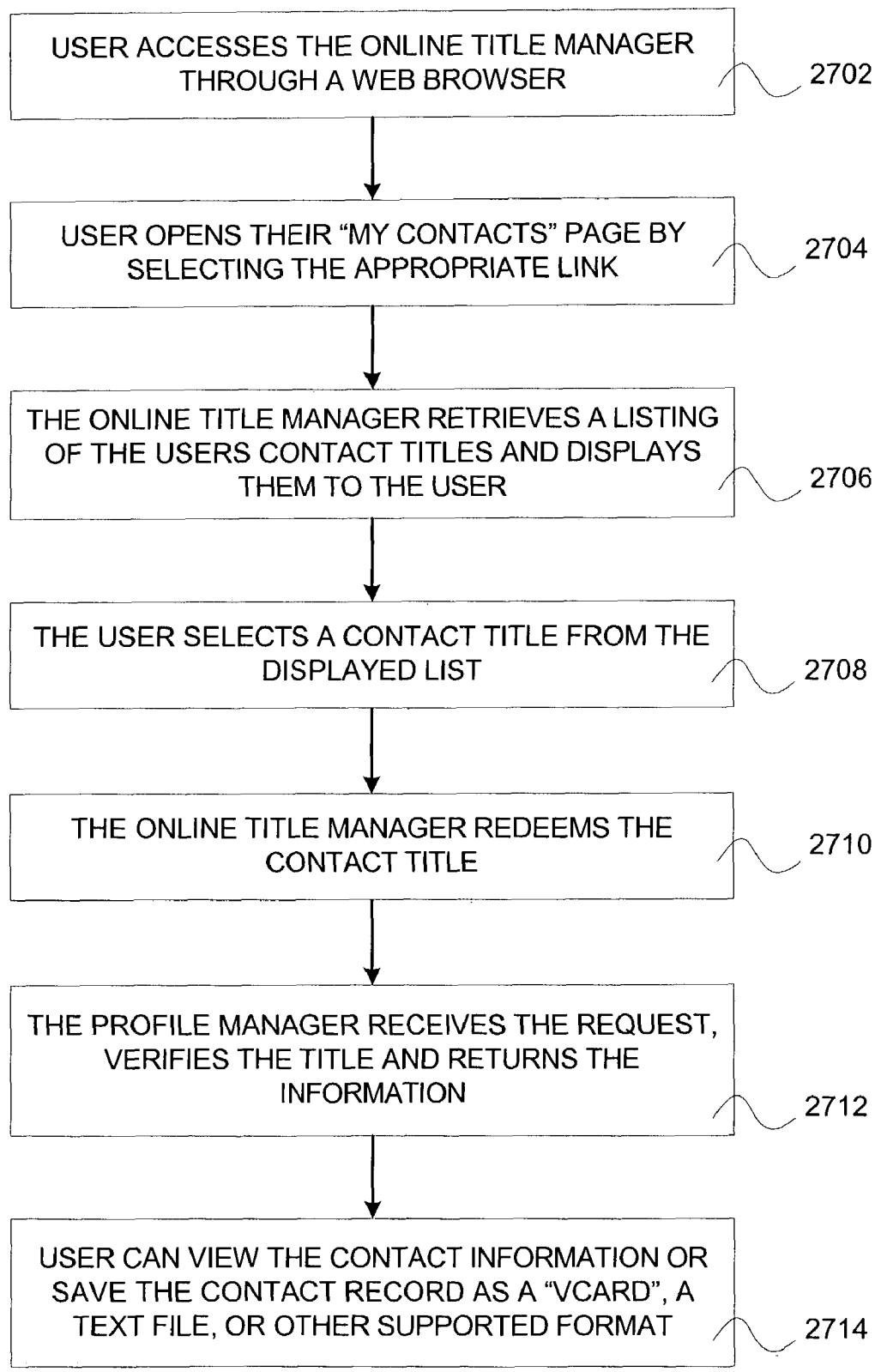

FIG. 27 displays a simplified flow chart describing the steps in which a user views a list of their contact titles and redeems a contact title. In this example, the user is registered with the DCE 2303 and uses title manager 2305, as shown in FIG. 23. In step 2702, the user accesses the online title manager through a web browser. In step 2704, the user opens their "my contacts" page by selecting the appropriate link. In step 2706, the title manager 2305 retrieves a listing of the users contact titles and displays them to the user in a view similar to that shown in FIG. 25. In step 2708, the user selects a contact title from the displayed list. In step 2710 the online title manager 2305 redeems the contact title. In step 2712, the profile manager (in another DCE such as 2240) receives the request and verifies the title. If the title is valid, the profile manager retrieves and returns the contact information according to the rules within the title. In step 2714, the use views the contact information in their browser and can optionally (if supported) save the contact information as a v-card, text file or other supported format.

Alternatively, the user can use an application such as a Microsoft Windows application (e.g. Microsoft Outlook) or a Macromedia Flash application to access the title manager and request title listings. In this case, these applications can have the added benefit of caching contact information, to enhance performance, reduce network traffic, and work offline. In this case, the application can retrieve contact information as the user requests and cache it for further reference, or can automatically retrieve contact information in the background and update it on a frequent and scheduled basis. This type of support allows the user to remove their device 2302 from the network and still view contact information. Another alternative is to have the title management functionality incorporated directly into the application along with the title data table.

Figure 28:
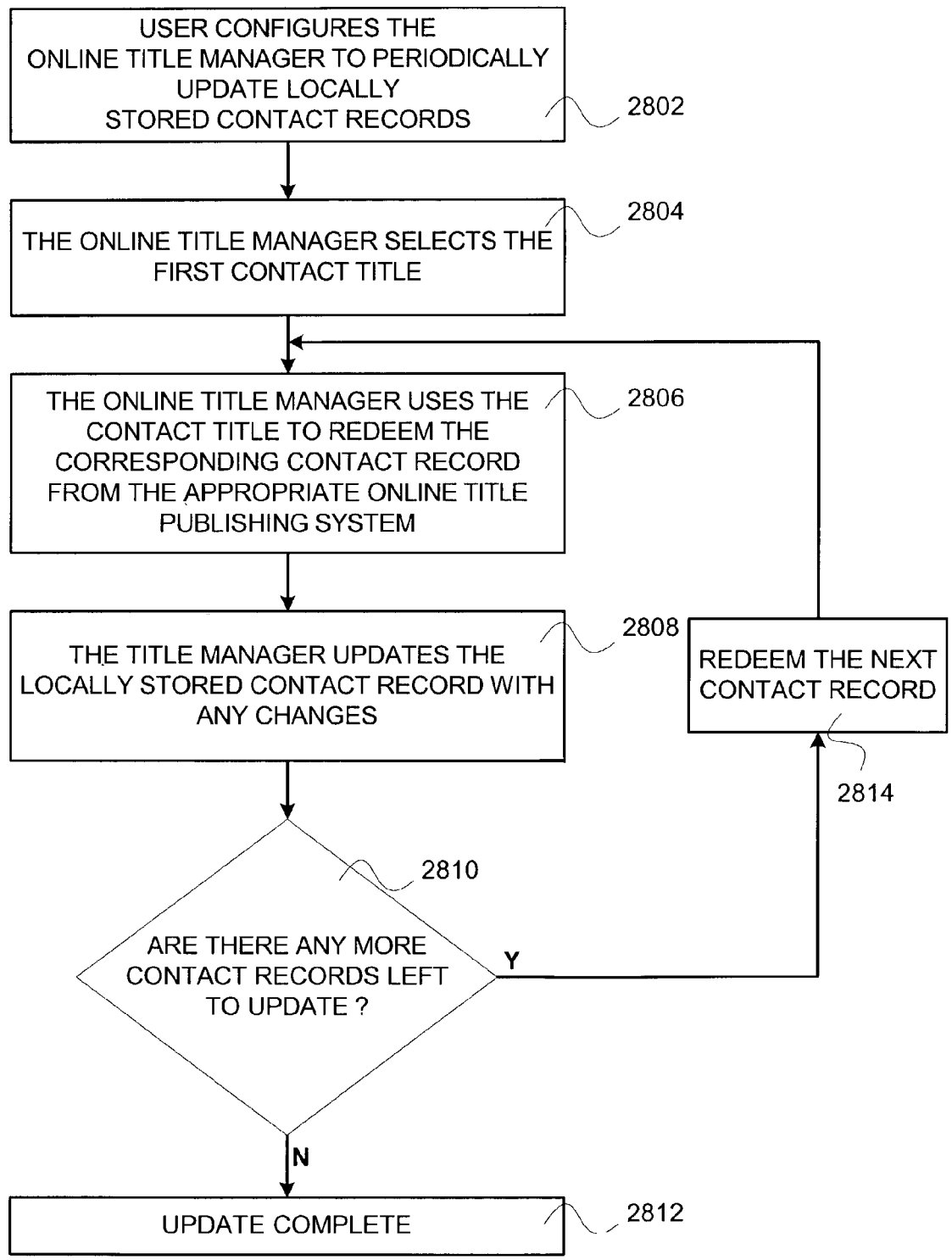

FIG. 28 displays a simplified flow chart describing the steps in which the online title manager works with a locally run application to automatically update locally stored contact records with contact information. In step 2802, the user configures the online title manager to periodically update locally stored contact records. In step 2804, the online title manager selects the first contact title 2804. In step 2806, the online title manager uses the contact title to redeem the corresponding contact record from the appropriate online title publishing system. In step 2808, the title manager updates the locally stored contact record with any changes 2808. Step 2810 determines if any more contact records are left to update. If so at step 2810 then at step 2814, the next contact record is redeemed. If not at step 2810, then the update is complete at step 2812.

E. Title Structure & Management

In another embodiment, a title structure is employed to optimize the description, creation, management and use of titles. Although, the structure of title objects as described herein maybe representative of certain technologies and formats such as XML, this is only as an example and to demonstrate one embodiment. A title object can be represented in a number of formats including XML, ASN.1, or other proprietary formats including textual and binary structures.

Although certain examples of the title structure are presented, the structure is intended to represent any number of digital and physical assets such as digital content, including music, images, video, and text, as well as physical goods such as computers, cameras, vehicles, and appliances. Furthermore, a title can be used to represent virtual assets such as an online experience created through a series of activities and events, and can also represent currencies such as cash. In one an embodiment, a title structure can be used to represent both a digital and physical asset such as the identity of a person, whereby the person has physical assets associated with their identity and also digital assets associated with their identity.

Figure 29:
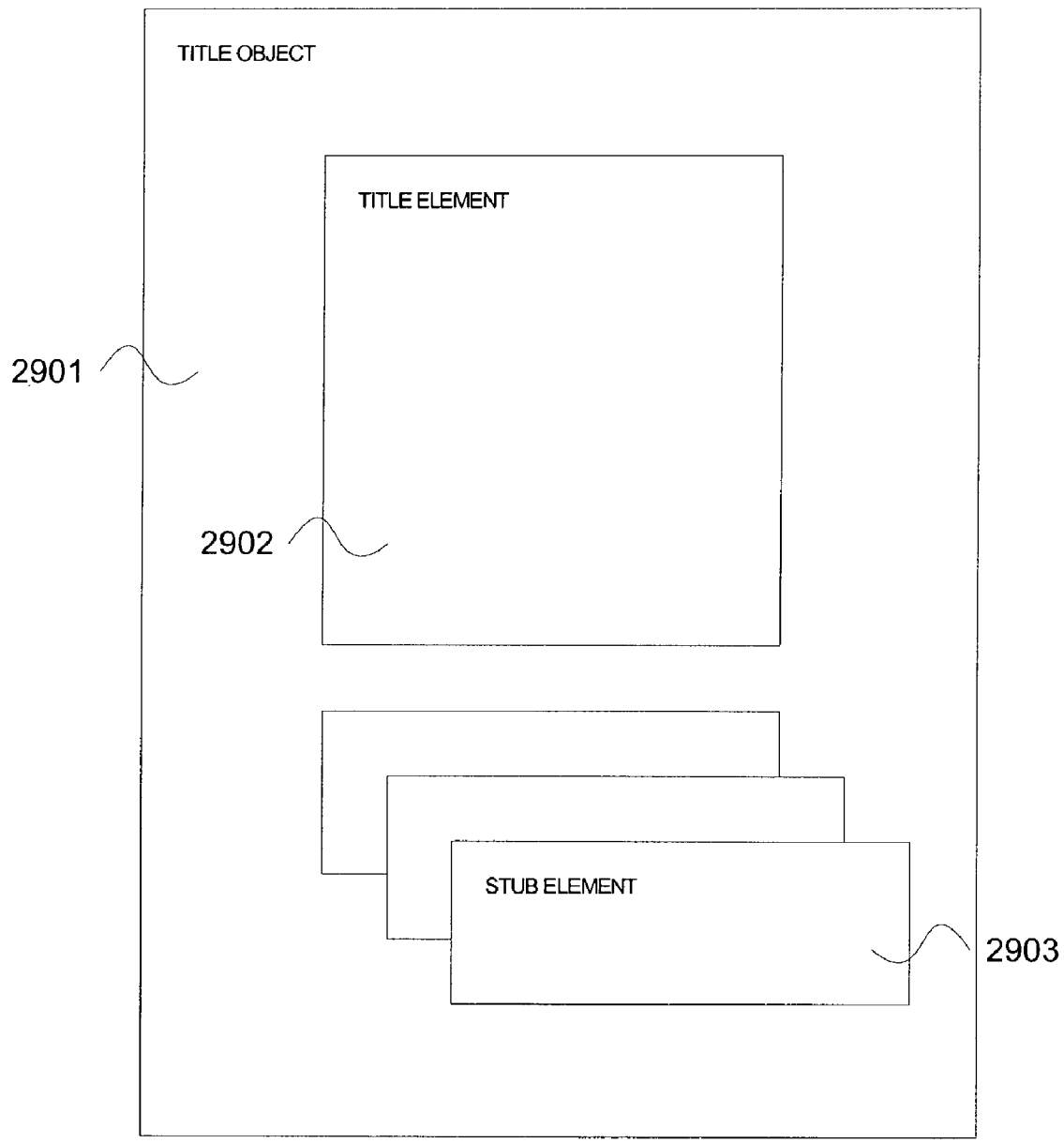
FIG. 29 depicts a title object in which a set of stub elements are employed to optimize titles, according to an embodiment of the invention.

Referring now to FIG. 29, title object 2901 is displayed in which a set of stub elements 2903 are advantageously employed to optimize titles. Although several stub elements are displayed within the title object, in other embodiments, a title object may have no stub elements or may just have one stub element.

In one aspect of the invention, a set of stub elements can be coupled to a specific title, to further optimize a title's content, attributes, and security indicia. In another aspect of the invention, a stub element can be created and coupled to the title, after the title is created. In yet another aspect of the invention, a stub element can be coupled to a set or group of titles as specified in the stubs binding information. This permits efficient coupling of stubs to titles.

Title element 2902 comprises a structure used to describe the title and the content (or asset), and express the rights associated with title object 2901. Title object 2901 can be issued for a specified period of time or can be left infinite. The integrity of title object 2901 can be further protected by the use of cryptographic algorithms. In one embodiment, a digital signature is used. In another embodiment a chained hash is used. Information within title element 2902 can be overridden by information contained within stub element 2902, as long as stub element 2902 was issued by the same entity as title object 2901, and further specifies what information is being overridden. In another embodiment of the invention, the issuer of a title object can delegate authority, thereby permitting other authorities to issue stubs on its behalf.

In one embodiment, title element 2902 is the only substantial piece of a title object 2901 that can be stored in a lockbox and inspected by participating parties in a trading transaction. This embodiment provides for separation between the descriptive information provided within a title element (2902) and security indicia, and/or content, and/or additional value-add information that maybe contained in stub elements (2903) that are coupled to the title. As an example, an effective separation permits trading parties to inspect the title that is being traded without comprising the security of the security indicia.

Stub element 2903 is a flexible extension mechanism to the title object 2901, and can be used to convey any related and appropriate information such as value-add content or additional rule processing. Each stub element 2903 can be issued and signed by different entities and can have different lifetimes. In one embodiment, stub element 2903 is optional for a tag. In another embodiment, an authenticator stub must be included for all valid tickets and tokens. The authenticator stub contains the security indicia that are used to authenticate a valid instance of a ticket or token.

Figure 30:
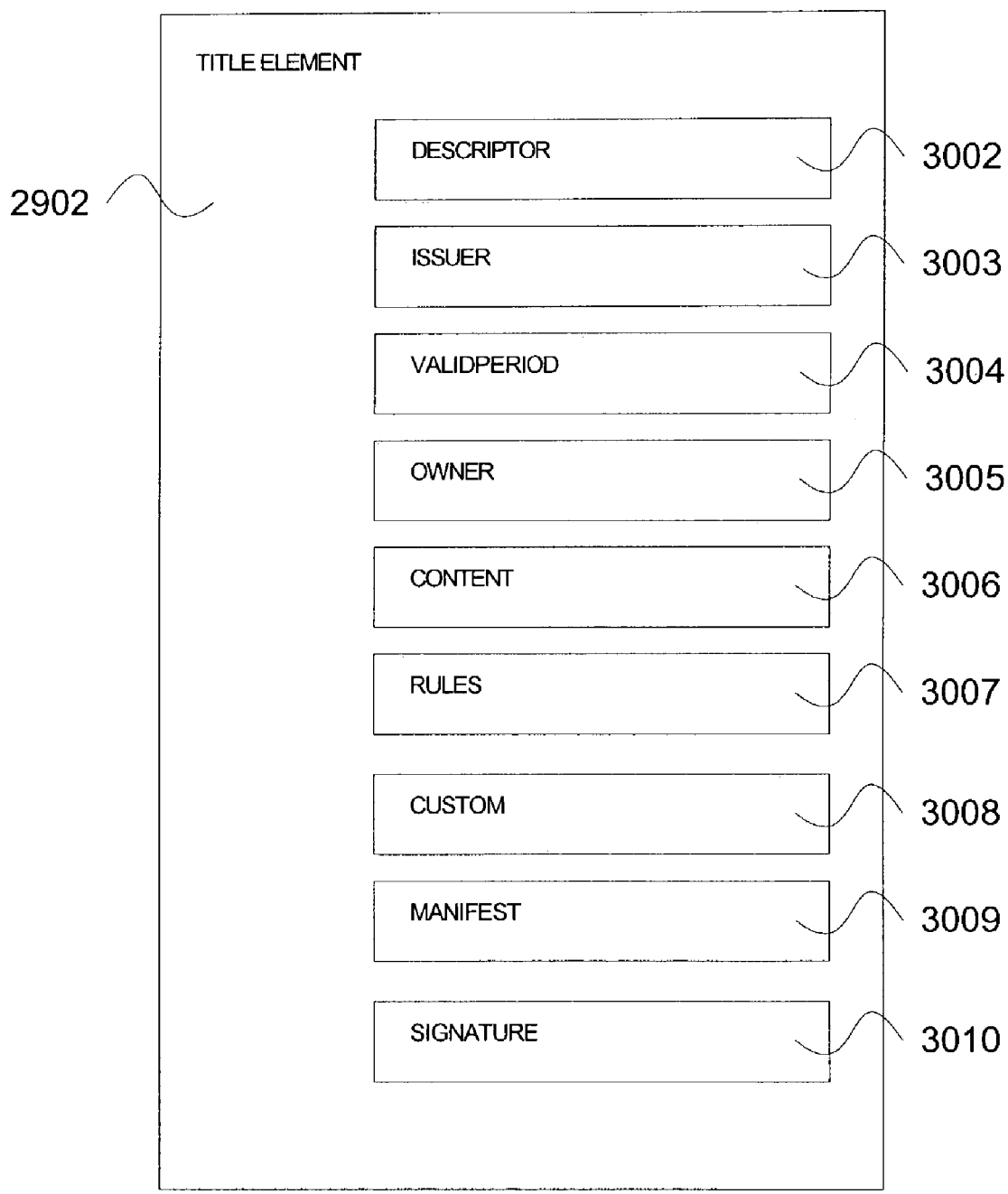
FIG. 30 depicts a simplified diagram in which components of title element are further displayed, according to an embodiment of the invention.

FIG. 30 depicts a simplified diagram according to one embodiment of the invention, in which components of title element 2902 of FIG. 29 are further displayed. Descriptor component 3002 comprises primary descriptive information regarding title object 2901 of FIG. 29, including ID, type, name, description, membership, and other technical elements used for processing. Issuer component 3003 comprises the "issuer" (e.g. the creator) of title object 2901. In one embodiment, issuer component 3003 can comprise a textual name string. In another embodiment, issuer component 3003 can comprise an alpha-numeric ID string. The textual name string can be informal or formal in context to participating parties, and if formal, may follow standard naming conventions such as an Internet Domain Name or even an X.500 Distinguished Name. Validperiod component 3004 comprises the range of dates of which title object 2901 is valid. In one embodiment, validperiod component 3004 includes a valid from date and valid to date. This time frame can further be specified as a UTC time value. Furthermore, the validity period of title object 2901 may be extended by attaching a stub element 2902 that overrides validperiod 3004.

Owner component 3005 comprises any valid type of identity indicia in context to the applications that create, manage, and use titles. The identity indicia maybe formal or informal depending on the requirements for the applications. For example, the identity indicia for the owner can be a name, email, phone number, X.500 Distinguished Name, user ID, tag pointer, etc. The identity indicia can include technical detail used to authenticate the owner. For example, the identity indicia may provide technical detail sufficient for an application to prove identity through the use of X.509 digital certificates or through the use of a biometric device. Similarly, the invention can utilize the identity indicia to instruct an application relying on the title to properly authenticate an owner through trusted sources such as a remote access server, or through a domain controller and rely on that trusted sources to properly authenticate the owner using standard means such as username and password. In one embodiment, owner component 3005 is optional for a tag and a token, but is required for a ticket.

Content component 3006 can comprise applicable information pertaining to an asset such as a digital content file associated with title object 2901. In one embodiment, content component 3006 comprises a pointer defining the location of the digital content file. In another embodiment, content component 3006 comprises a query that can be used to obtain the digital content file. Content component 3006 can further comprise additional information such as ID, name, creator, rating, etc. A single title object 2901, as shown in FIG. 29, can express rights to multiple digital content files, with the information regarding each in separate content components 3006. For example, a title object 2901 can express rights to a music album where the album is comprised of multiple songs, sheet music, pictures, and lyrics. Each content piece such as a song or lyrics in this case can be described in multiple content components 3006. In one embodiment, the content component 3006 can provide detailed information relating to a physical asset instead of a digital asset. In this case, sufficient information is contained within the title content component to identify the physical asset such as SIC, manufacturer, manufacturer ID, model number, serial number, etc. In another embodiment, the content component can contain industry or technology specific identifiers such as that used by the IANA, Rosettanet or even technologies specifications such as RDF.

Rules component 3007 comprises statements specifying the specific rules that are applied to the use of the title, as well as procedures for monitoring events associated with title object 2901, as shown in FIG. 29. In one embodiment, XSLT statements are used to define the rules and are executed in a compliant XSLT processor. In another embodiment, XrML statements are contained within the rules component to express rights associated with the title. In another embodiment, application specific rules are expressed in a proprietary, format within the rules component 3007 and can be executed by applications that understand, interpret, and execute the rules. In another embodiment, the rules can be expressed through pointers, references, and links such as the rules component 3007 containing a set of URI references to rule logic contained within a dictionary. The rules component can contain business logic associated with the title and are not exclusively used for access control, authentication, or rights expression. Business logic rules can be incorporated for additional processing, pre-processing, event processing, triggers, callbacks and other business logic that maybe associated with the title. For example, rules can be implemented to perform event processing based on a certain action being taken, or a specific state of the title. The rules expressed within this component can trigger off certain state information that maybe contained within stub components along with information contained within the title. The rules can even be used to query information on other systems in order to perform a certain event. Rules component 3007 may have attribute elements provided within its structure for properly identifying the rules language that is being described.

Custom component 3008 comprises custom information desired by title object 2901 publisher. In one embodiment, custom 3008 can contain any text and/or valid XML, which in turn can be referenced throughout title element 2901 or stub element 2902. The custom component may also contain pointers, references, or links to additional information or resources that are applicable to the title object.

In one embodiment, manifest component 3009 comprises reference information that must be included as part of title object 2901. For example, if a stub element must be included along with title object 2901, then it could be referenced here. In another embodiment, external data that must be included as part of title object 2901, can also be referenced within the manifest component. Applications that process the title can also process the content or referenced content within the manifest, and in another embodiment use this manifest as part of an integrity check of the title object.

Signature component 3010 comprises cryptographic information used to verify the integrity of title element 2902. In an embodiment of the title object, the signature component can be an XML Digital Signature block in compliance with the W3C. In another embodiment, the signature component may contain proprietary cryptographic information used to verify the integrity of the title, as well as provide functionality generally associated with digital signatures.

Figure 31B:
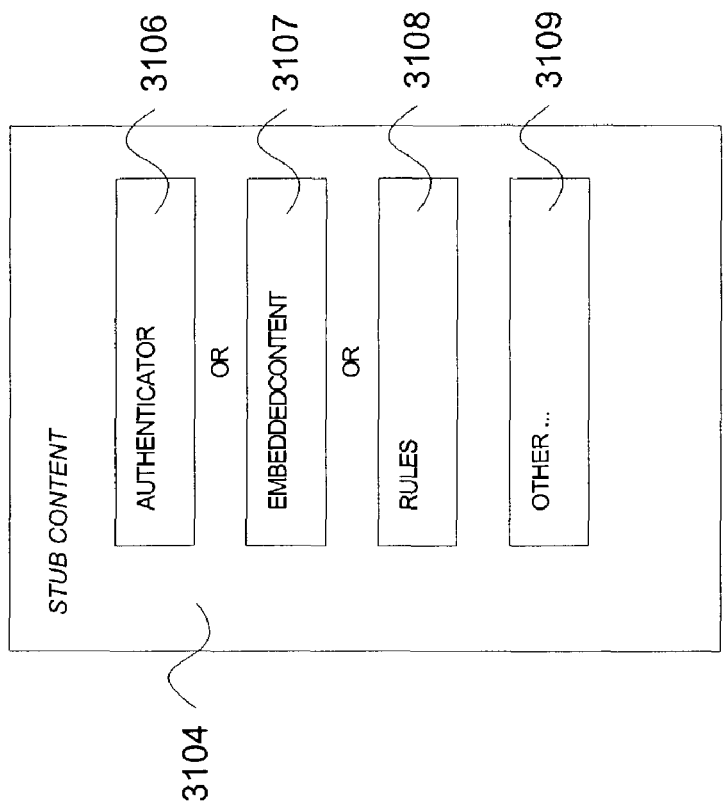
FIG. 31A-B depict simplified diagrams of components of the stub element, according to an embodiment of the invention.
Figure 31A:
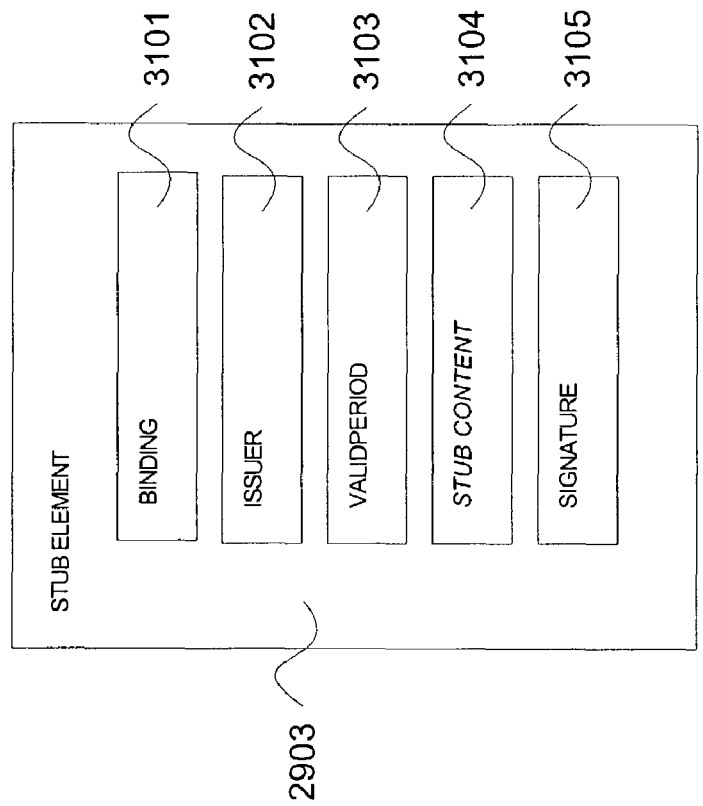

FIGS. 31A-B depict simplified diagrams according to one embodiment of the invention, in which components of stub element 2902, as shown in of FIG. 29, are further displayed. Referring now to FIG. 31A, binding component 3101 comprises detailed information on how a stub will be bound to a title or set of titles. In one embodiment, the binding information can be as simple as a single title ID. In another embodiment, the binding information can be a complex statement where the stub is bound based on a set of properties or parameters. Another embodiment can bind a stub to a title or set of titles based on a specific reference such as an XPointer. Issuer component 3102 comprises the "issuer" (e.g. the creator) of stub element 2902. In one embodiment, as with issuer component 3003, as shown in FIG. 30, issuer component 3102 can comprise a textual name string. In another embodiment, issuer component 3102 can comprise an alpha-numeric ID string. The textual name string can be informal or formal in context to participating parties, and if formal, may follow standard naming conventions such as an Internet Domain Name or even an X.500 Distinguished Name. Validperiod component 3103 comprises the range of dates of which stub element 2902 is valid. In one embodiment, validperiod component 3103 includes a valid from date and valid to date. This time frame can further be specified as a UTC time value. Signature 3105 comprises cryptographic information used to verify the integrity of stub element 2902 utilizing similar conventions to the signature component 3010 in the title element.

Referring now to FIG. 31B, stub content component 3104 as shown in FIG. 31A is further described. In one embodiment, authenticator component 3106 comprises information that can be used by title transaction system applications to authenticate title object 2901. In another embodiment, authenticator component 3106 can verify that title object 2901 is a valid, single instance of a title object. Tickets and tokens within the title ecosystem will have authenticator stubs associated with the title in order to properly authenticate the title object, and validate that it is the correct instance of the title object. In another embodiment, a tag or shadow title may not have an authenticator stub as it may not be required for authentication and validation. In this example, a shadow title would be a title that is a "copy" of the valid and authenticate title, although by itself is not valid. Shadow titles, in this instance, are valuable techniques for sharing content, such that a shared title can still give the recipient access to sample information, or limited content such as a restriction for one time only use, or access to a low quality version of a song. In an embodiment, the authenticator stub contains the security indicia associated with the title, and the structure of the security indicia would be dependent on the authentication technique applied by the publisher of the title.

In one embodiment of authenticator component 3106, a chained hash technique can be employed to authenticate the title. Authenticator component 3106 would contain the encrypted seed for the hash, a copy of the current valid hash in the hash chain, and an algorithm identifier, all of which would be used by a state server to authenticate the title in conjunction with an index that the state server maintains. In another embodiment, a hash tree can be implemented within the authenticator stub to support divisible titles. The hash tree technique can be employed by titles that represent cash or some form of currency that can be divided.

In another embodiment, stub content 3104 comprises embeddedcontent 3107, which can further include a digital content file. Embeddedcontent 3107 can be also be used by issuers who wish to provide an option to their customers for embedding content directly into title object 2901. Advantages includes additional functionality in processing title object 2901 (for example, while executing a trade only title objects are included in the lockbox, therefore eliminating any potential security exposure by having embedded content directly inside the title object 2901). In another embodiment, the embeddedcontent can contain textual information or even XML structured information.

In another embodiment, stub content 3104 comprises rules component 3108. In another embodiment, a rules component 3108 procedure can override rules component 3007 procedure, as shown in FIG. 30. The structure of the rules would be similar to that of the rules component 3007 in the title element.

Other component 3109 comprises other functionality that may be included in stub content 3104 and defined by the publisher of the title and understood, interpreted, and processed by applications involved in the title transaction ecosystem.

Figure 32:
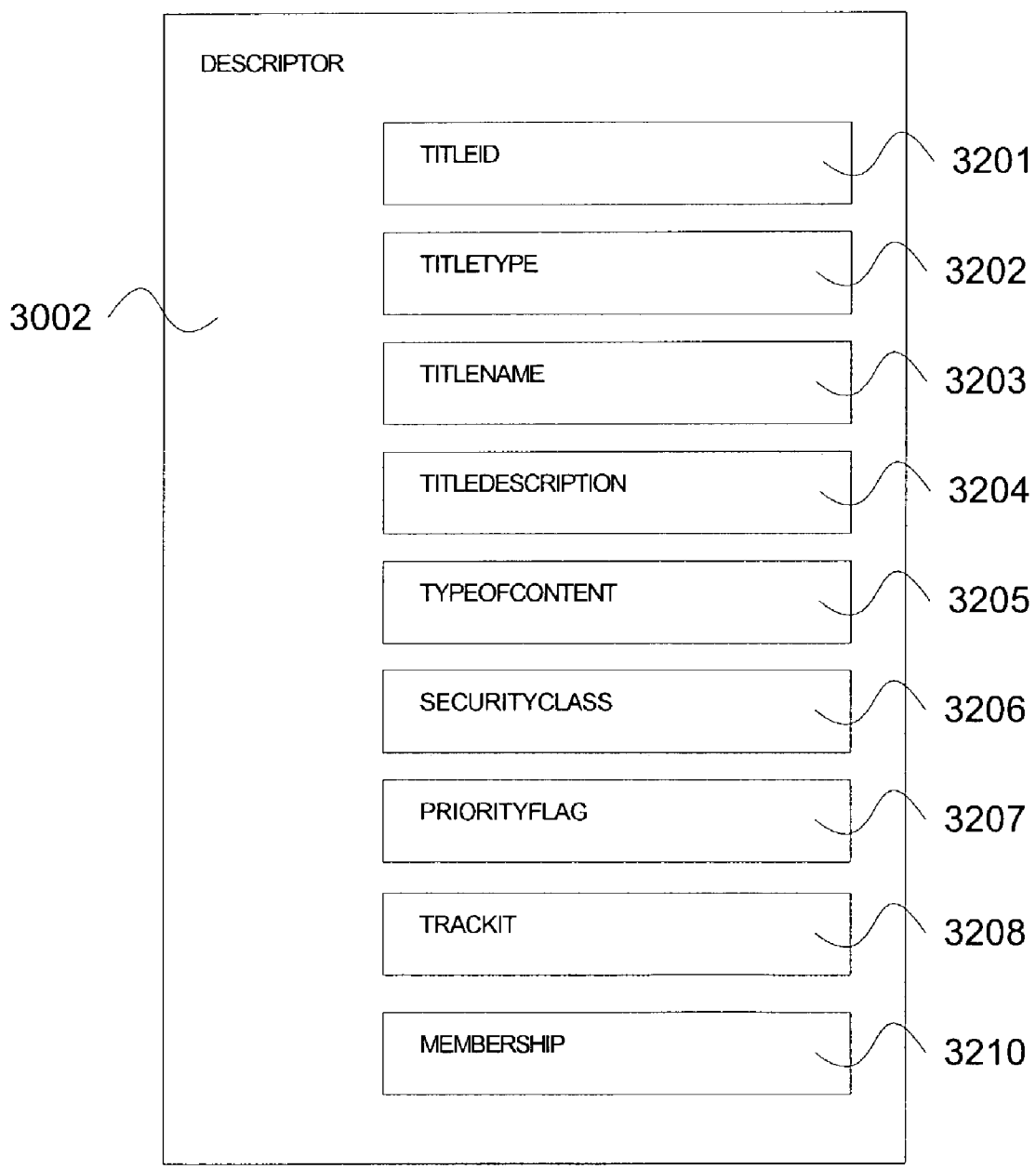
FIG. 32 depicts a descriptor component, according to an embodiment of the invention.

Referring now to FIG. 32, descriptor component 3002 as shown in FIG. 30 is further described. Descriptor component can function as a "header" element for title object 2901, as shown if FIG. 29, and provides descriptive information related to the title. The descriptor can be used by system applications used in processing the title, and can be used by system applications involved in generic processing of titles such that they only interpret and act upon title specific information regardless of the content they contain, reference, or express rights to. For example, a system application may only be concerned with the type of title that is being processed such as tag, ticket, or token. Likewise, another system application may only be concerned with the security classification and the priority setting associated with the title.

Titleid component 3201 comprises the unique identifier associated with the title. In one embodiment the titleid is a GUID (globally unique identifier). In another embodiment, the titleid is a unique identifier within all titles created by a single issuer. The identifier used in title id can be formal or informal, registered or not registered. Titletype component 3202 comprises the type of the title object 2901 such as tag, ticket, or token and states the type in this component. The type can be specified as a textual string element such as "Tag", "Ticket", or "Token", or in another embodiment can be specified through formal or informal identifiers such as a registered OID (object identifier). In another embodiment, titletype can provide a formal structural hierarchy to the title such that title can be associated with a family of titles, and can be used to describe how the title was formed based on a type of inheritance. The titletype would contain specific title-typing indicia such that the processing applications can retrieve, understand, interpret, and process properties associated with ancestor titles. In another embodiment, the titletype can be used to reference the template that was used to create the title.

Titlename component 3203 is a short text string used to name the title object 2901, and is similar to a file name. Titledescription 3204 comprises a longer text string, and can be used to contain primary descriptive information regarding title object 2901, including ID, type, name, description, and technical elements used for processing. Typeofcontent 3205 comprises the type of content referred to by title object 2901. In one embodiment, Typeofcontent 3205 can include terms such as "mixed", "music" or other descriptive term. In another embodiment, typeofcontent can contain more formal definitions such as MIME type classifications or industry standard codes such as that used in Rosettanet and EDI systems. Additionally, typeofcontent can be used to specify a title content such that other titles may be embedded within or specified by this title. In this example, a title can refer to other titles and convey additional rules or taxonomy regarding the referred to or contained titles.

Securityclass component 3206 comprises security classification identifiers that can be used by processing applications. In one embodiment, the classification can be as simple as a numerically ordered scheme that identifies the security processing level required of this title from an range of low to high. In another embodiment, the classification scheme can be a registered scheme or even a more technically descriptive classification such as that used in ASN.1 encoding schemes for X.509 certificates. Priorityflag component 3207 comprises a priority indicator to be used by processing applications to apply appropriate levels of processing such is the case for service level agreements, or quality of service guarantees. For example, a high priority setting can indicate to processing applications that this titles requires priority processing (that is, preferred status) and can be placed at the front of the queue. In an embodiment, the priorityflag can be textual, numerical, or structured information to be used by processing applications. In another embodiment, the priorityflag can provide or reference technically descriptive service level agreement detail that can be directly processed by applications, such as that used in Policy Based Networks or Directory Enabled Networks.

Trackit component 3208 comprises indicators for the level tracking information that should be maintained by processing applications, such as if title object 2901 must be tracked on every event. In another example, the trackit component can specify that both the transaction request and response information be tracked in the log. In another embodiment, the trackit component can specify that every action must be tracked in a stub element 2903 of the title object 2901. By tracking transactions and events in the stub, the title can maintain a journal of activities and provide a self contained log. The logging activity within a single stub or multiple stubs can be used as a record of the activities that comprise the titles experience. This can be used as an effective tool for analysis and reporting, and is also an essential aspect for titles creating and representing an experience, whereby the title maintains its own state. For example, a title can be used to create a digital treasure hunt, where the owner of the title redeems it for each step in the treasure hunt. Completing each step requires that the title maintain its state and also record the activities completed by the owner. When the treasure hunt is complete, the owner is entitled to receive a prize. The trackit component 3208, along with the recording ability of stubs, permits the title to create this experience. The title also becomes a record that can prove a sequence of steps. The tracking ability enabled by the trackit component 3208 and stubs can be used by rules components for fine-grained control over a title and for event processing. For example, based on a specific step within an experience, the title can initiate certain actions. This would require understanding of the current state and the sequence of steps that led up to the event.

The membership component 3210 comprises title membership information such as the group or family that a title may belong. In one embodiment this could be implemented as a group identifier and in another embodiment this could be implemented through references.

Figure 33:
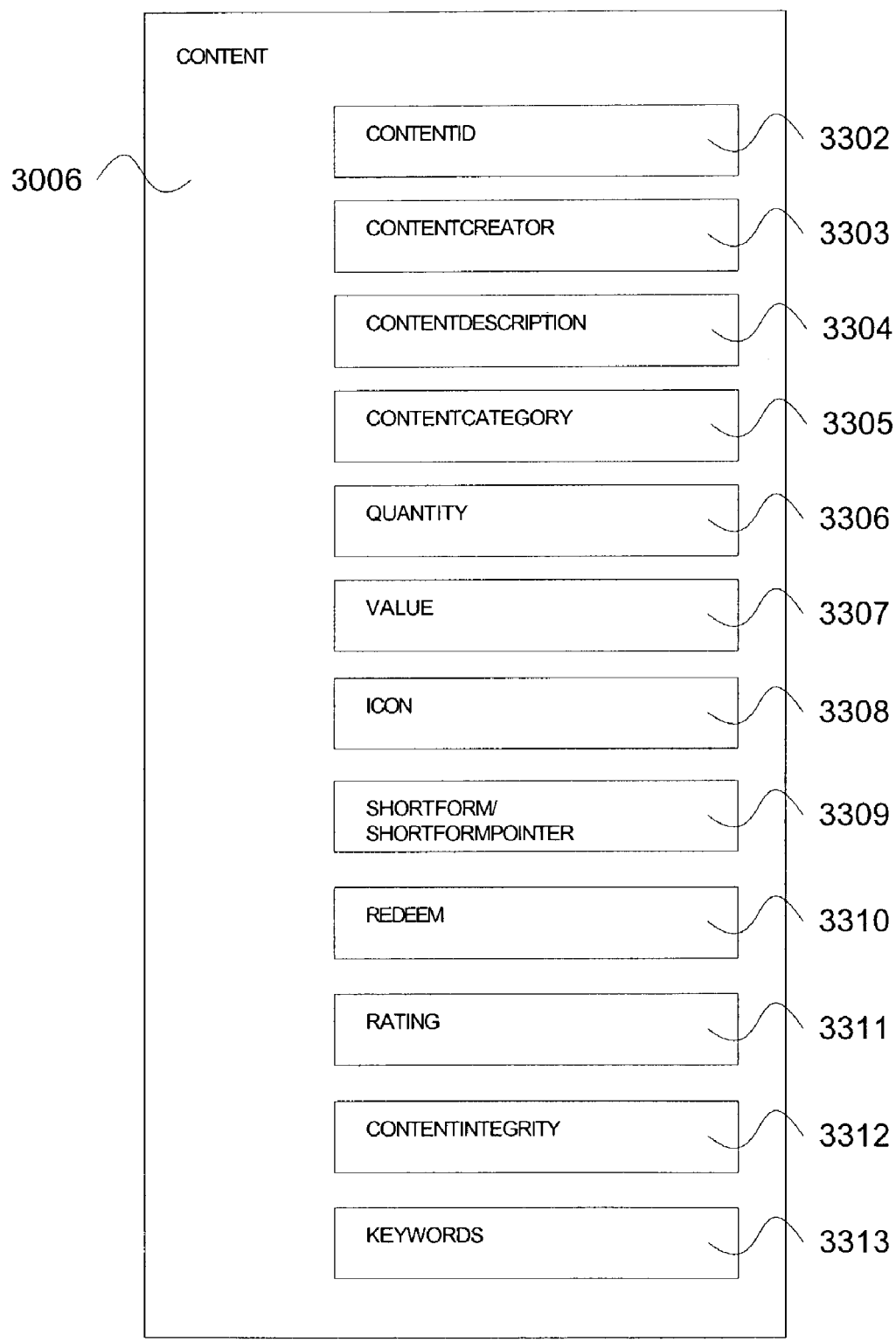
FIG. 33 depicts a content component, according to an embodiment of the invention.

Referring now to FIG. 33, content component 3006 as shown in FIG. 30 is further described. The content component is used to describe the content or asset to which the title expresses rights. In the case of digital content, the information would specifically refer to the detail associated with that digital content such as an encoded song or video. In the case of a physical asset, the content information would provide detailed information regarding the physical asset such as location, coordinates, SIC, manufacturer, model number, part number, and/or serial number.

ContentID component 3302 comprises an identifier for the content. In one embodiment, contentID component 3302 can be used to convey any type of content ID used by content publishers such as DOI, OID, or a proprietary scheme. In another embodiment, the identifier could be a serial number. Contentcreator component 3303 comprises a text string identifying the creator of the content such as a digital content file or asset. The contentcreator component can be a textual string, an identifier, or even structured identity indicia on the creator as described in other identity related components such as the owner component 3005. Contentdescription component 3304 comprises a longer text string, and can be used to contain primary descriptive information. Contentcategory component 3305 comprises the categories or taxonomy of content referred to by title object 2901. In one embodiment the contentcategory can be a simple text label, while in another embodiment the contentcategory can be a structured component with detailed taxonomy on the content referred to by the title object.

Quantity component 3306 comprises the instances of a single digital content file associated with title object 2901. Value component 3307 comprises the economic price associated with title object 2901. Icon component 3308 comprises the computer icon to be displayed in the title management system or by processing applications. Shortform/shortformpointer component 3309 comprises a pointer to a sample of the content or asset such as an image, thumbnail image, short sample audio, or low quality audio. In another embodiment, the shortform component can contain the actual sample such as textual information. For example, the shortform can contain a name and email address for a contact record. In this case, the shortform provides quick and immediate access to information, whereas the title provides access to the entire contact information. Shortform and shortformpointer and useful components when titles are traded and shared.

Redeem 3310 component comprises methods for the redemption of the title object. Redemption of the title object can be obtaining the digital content that the title refers to, or can also be the trading of the title or the sharing of the title. The redeem component is a structured component that has one to many methods describing in detail how the title may be redeemed. This structure is flexible to accommodate a variety of redemption processes and procedures that are required by publishers and consumers of title objects.

Rating component 3311 comprises a content rating for the digital content file, such as the MPAA rating of "G", "PG", etc. The detail within the rating component is context specific according to the content or asset referred to by the title object.

Contentintegrity 3312 comprises a cryptographic message digest which is used for verification of digital content integrity. The contentintegrity component provides attributes to identify the method employed for integrity checking such as the SHA-1 algorithm. Keywords component 3313 comprises a list of keywords associated with the content or asset. This can be used during queries, searches, and categorizations.

Figure 34B:
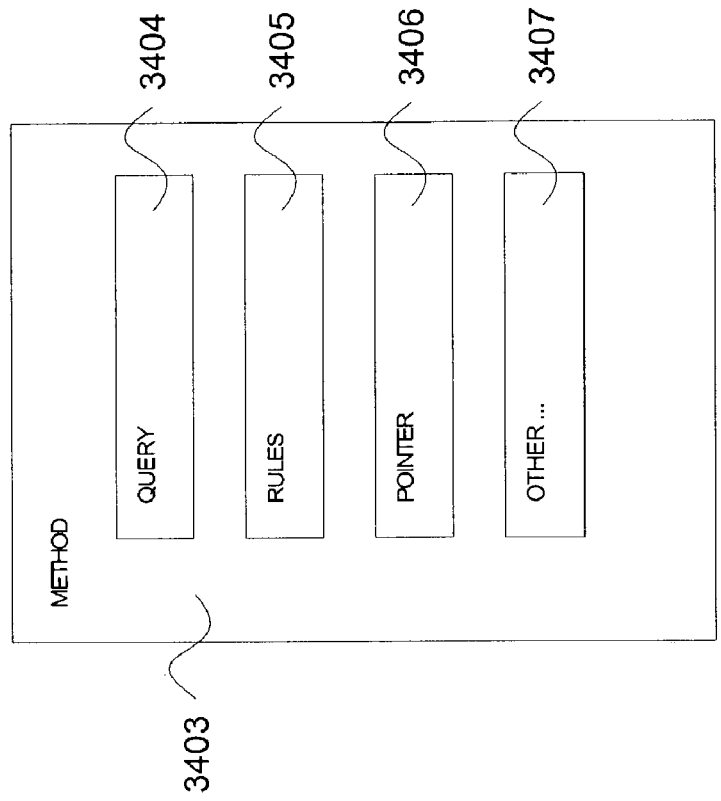
FIGS. 34A-B depict a redeem component, according to an embodiment of the invention.
Figure 34A:
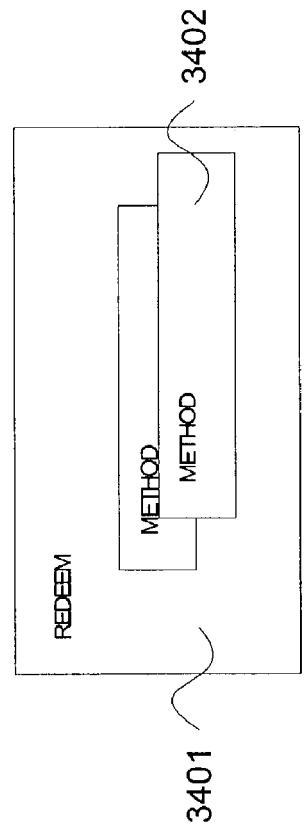

Referring now to FIGS. 34A-B, redeem component of FIG. 33 is further described. Redeem component further comprises a set of methods 3402, including a query component 3404, a rules component 3405, a pointer component 3406, and other component 3407. As mentioned, the redeem component can include from one to many methods, with each method describing how the title object can be redeemed. In one embodiment, a method can describe how the digital content maybe obtained. In another embodiment, a method may describe how digital content maybe obtained in a streaming version. In yet another embodiment, a method can describe how the title object can be shared, traded, sampled, archived, destroyed, communicated, or processed depending on the specific requirements of the publisher and the consumer application. In another embodiment, a redemption method can be used to specify how a new title can created based on the current title object being redeemed. A redeem method may include one, some, or all of the components identified in FIG. 34B.

In another embodiment, a query component 3404 comprises searching procedures for the digital content file. This component has attributes to identify the query mechanism being described. In one embodiment, the query component can contain SQL queries in order to obtain dynamic information from a database. In another embodiment, the query component can contain an XQuery statement to obtain data from an XML data set or document collection. In another embodiment, the query component can contain computer executable statements to process some query business logic in order to calculate or process the results. The rules component 3405 comprises statements specifying the specific rules that are applied before, during, and after redemption. The structure and statements contained within the rules component is similar to that described for the rules component 3007 in the title object, in that it can contain and describe any type of rules statement such as XSLT, XrML, BRML; and can also contain pointers or references to external rules. However, this rules component is specifically associated with a redemption method.

The pointer component 3406 specifies a pointer to the content or asset being referenced by the title object. The pointer structure is specified in the component and in one embodiment can be a simple URL. In another embodiment this may be a URI, XPointer, XLink, coordinates or other pointer description to the content or asset.

Other component 3407 comprises additional functionality that may be added to the set of methods 3402. The other component accommodates proprietary or custom information to be used during redemption and should be understood, interpreted, and processed by applications.

Referring now to FIG. 35A, issuer component of title element 2902 as shown in FIG. 30 is further described. Issuedate 3502 comprises the date that title object 2901 was issued. In one embodiment, name component 3503 comprises a textual name string for the issuer of title object 2901. As described earlier, the name component can be a formal name for the issuer of the title such as a registered Internet Domain Name or X.500 Distinguished Name. In another embodiment, ID component 3504 can comprise an alpha-numeric ID string for the issuer of the title object 2901. As described earlier, the ID component can be a formal or informal identifier.

Referring now to FIG. 35B, owner component 3005 of title element 2902, as shown in FIG. 30, is further described. Name 3506 comprises a textual name string for the owner of title object 2901 or as described earlier for the owner component can be a formal name definition such as a X.500 Distinguished Name. Authentication component 3507 comprises technical detail such as cryptographic information that can be used to verify the identity of the title object 2901 owner. The technical information will be sufficient enough for the processing application to correctly identify and authenticate the owner of the title. Information contained in this component can be cryptographic information used in processes such as biometric identification or even for identification through the use of digital certificates and a public key infrastructure. Component 3510 comprises the activation date for title object 2901. Title object processing applications may use the information contained within the validperiod component 3004 to ensure that a title object will not be processed before it becomes valid as specified in the from component 3510 and not processed after it becomes invalid as specified in the to component 3509. The date can be specified in the UTC date/time format.

Figure 36:
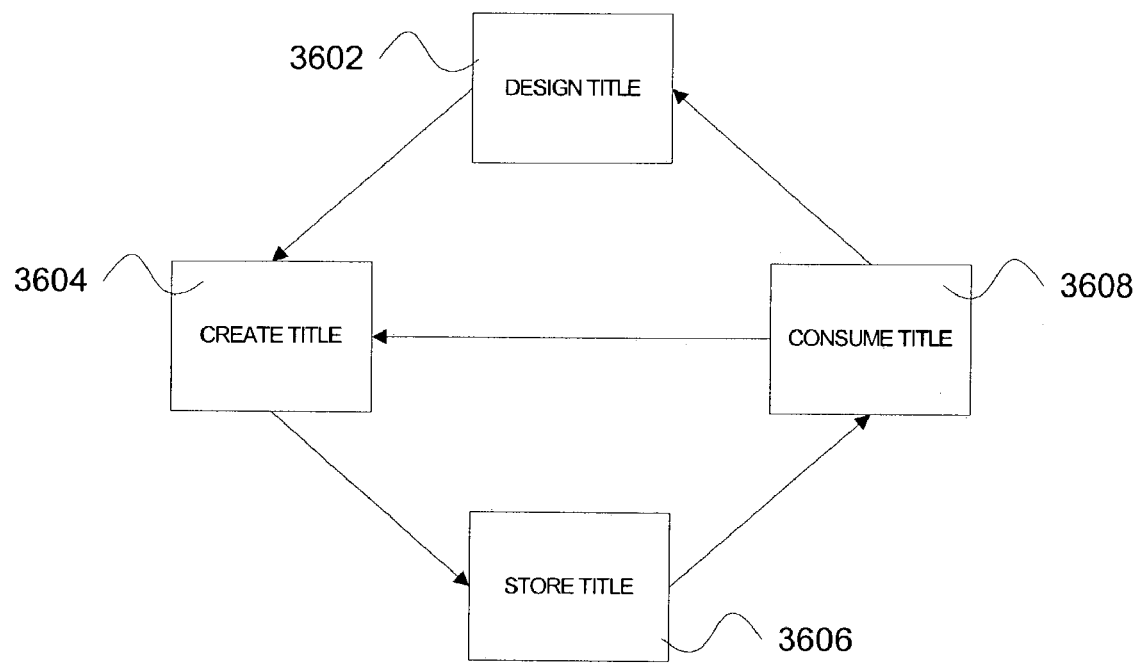

Referring now to FIG. 36, a simplified diagram displaying title object 2901 lifecycle and management steps is displayed, according to one embodiment of the invention. Initially, a title is designed at step 3602. The design process would take into consideration the source content or asset and identify properties that should be included in the title. The design process must also carefully consider the redemption methods that are appropriate for the content (or asset) and clearly specify the redemption processes that will be described in each method. All taxonomy, security, rule processing, business logic, and descriptive information will be identified, described, and documented during the design phase of a title object. As an output to the design phase, a title object template will generally be created and identified. The template is used as a technical guideline, script or set of instructions that can be used during the creation process to generate a title object. Templates can be stored for re-use. An application that assists or implements the design aspects of a title can provide typical design functions such as collaboration, planning, scheduling, and reporting. Collaboration in title design can be an effective tool for creating complex title objects that consist of multiple elements. As an example, a digital album can involve several parties for design of covers, images, audio, text, and sheet music elements. Scheduling aspects maybe required to schedule the creation of titles. For instance, titles can be created on demand on created in batch.

The next step in the lifecycle and management is the production or creation stage, as shown in create title 3604. The create title 3604 stage involves a "factory" or similar process to produce titles. Production can be on-demand, in bulk, or as scheduled depending on the requirements of publishers. Implementations of the create title 3604 process can consider request, complexity, reporting, control, and performance factors to ensure that production demands are satisfied. Additional functionality supported by the create title 3604 process can include warehousing and distribution of titles that are created. Warehousing and distribution functions can be used to service requests by several parties involved in the title object lifecycle such as in syndication and content distribution networks. The creation process is described further in FIG. 37A. The output from this stage would be title object instances.

The next stage in lifecycle and management is the storage of titles as depicted in 3606. This stage would include typical title object storage and management functions including securing title objects as they are stored, properly authenticating owner's access to title objects, and viewing title objects that maybe stored. Storage functions can be implemented as server applications or incorporated directly into client applications that run directly on consumer computing devices such as desktop computers and mobile devices. Server applications can be implemented to support a community of users. Storage of title objects can be a critical stage in the lifecycle as a title object may tend to spend a majority of its life in storage. Therefore, it will be essential for applications involved in this stage to provide proper handling such as ensuring that security requirements are satisfied.

The next stage in the lifecycle and management is the consuming of titles as depicted in 3608. Consuming of titles primarily involves the use of titles in order to experience the content. This is accomplished by redeeming the title using the Variety of redemption methods defined within a title object. Applications that are involved in this stage can be complex as they must effectively process the title object, including rule processing, business logic processing, interpretation of descriptive information, resolution of references and pointers, and most importantly the authentication of titles and owners. In an embodiment of the lifecycle there would also be the communication, interpretation and processing of fine-grained trust between all parties involved in the lifecycle. In one embodiment, the title manager, resolver, state server, content proxy, and content server would all be involved in the consumption of a title object.

Consume title 3608 component can tie back to the design title 3602 and create title 3604 components to complete the lifecycle. In one embodiment, the detail obtained through the consumption and use of title objects will be essential information used in the design of subsequent and additional titles. In another more direct embodiment, the consumption of title can be effectively tracked and directly used by one title object to create a new or enhanced title object template. In this instance, as a title is consumed it will progressively track and update various properties within its stub element structure. These properties will combine to represent the experience of the title object, and on a particular redemption method will generate either a new title object template or an enhanced title object template. The new or enhanced template can then be used to create additional title objects. In this embodiment, a title can be an effective tool and mechanism for use in expert systems or artificial intelligence engines. In another embodiment, a title can be used as a data source into the create title 3604 process to create new titles, and this can be triggered by one of the redemption methods in the original title. This embodiment can be an effective technique in using title objects for syndication or delegation. It can also be an effective technique for transforming a title object, enhancing a title object, evolving a title object, or morphing a title object.

Figure 37B:
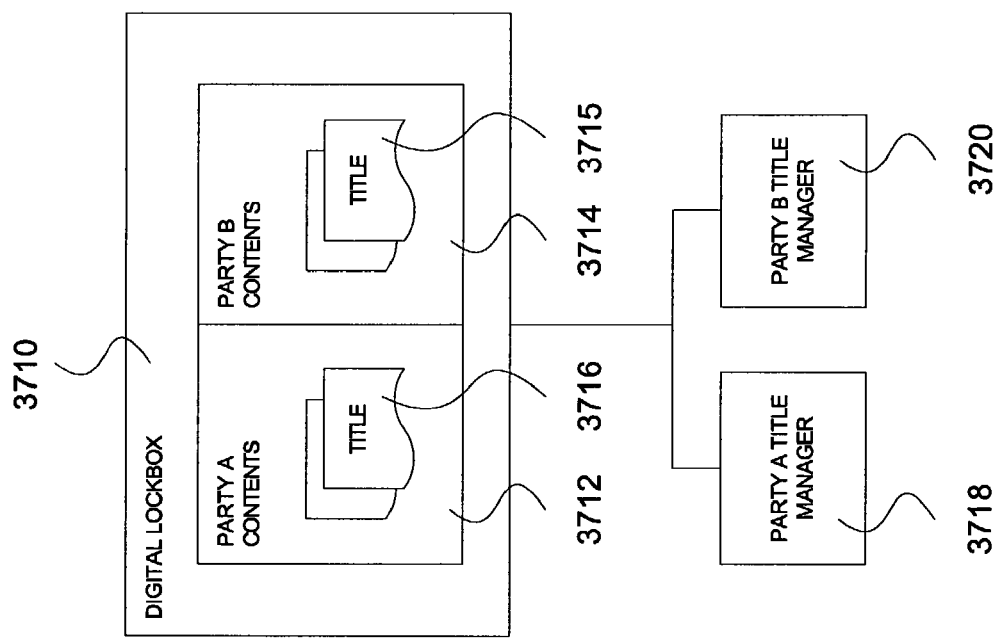
FIG. 37B depicts a simplified diagram a digital lockbox, according to an embodiment of the invention.
Figure 37A:
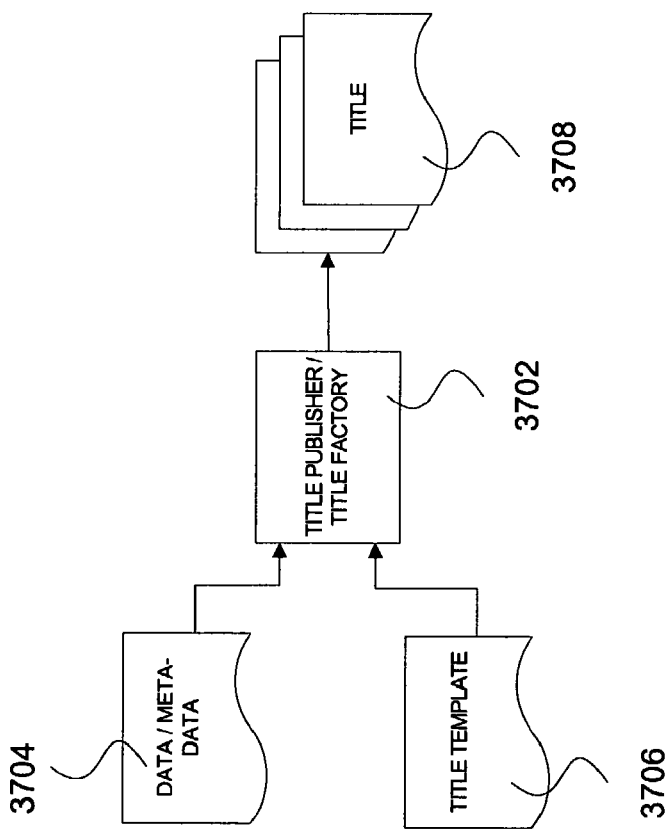

FIG. 37A is a simplified embodiment of the create title 3604 process shown in FIG. 36, according to one embodiment of the invention. The title publisher/title factory 3702 is responsible for implementing the process that creates titles. In this embodiment, the factory receives data/meta-data 3704 from a content publisher and also receives a title template 3706. The data and template combined may be used by the factory to produce the title. The data 3704 portion may provide specific data to be included in the title as well as instructions to control productions, such as the template to use, the number of titles to be produced, and the location of where the titles are to be sent. The template 3706 can be referenced by the content publisher and actually stored in the factory or it can be sent by the content publisher to the factory. The data 3704 source and format depends on the content publisher and can be proprietary information, standards-based information, or even another title object. The template can be an XSLT template or can be any format of template instructions that can be interpreted and processed by the factory. In this embodiment, the factory will use the template to interpret and process the data in order to produce title objects. Although FIG. 37A shows the factory output as title objects, another embodiment may only produce a single title, and yet another embodiment can produce great quantities of titles to fulfill a quota.

Title trading is supported by the title technology and the applications that process titles. Trading between parties can be accomplished in many different ways and involve any number of technologies and techniques. Referring now to FIG. 37B, a simplified diagram of a digital lockbox component is shown, according to one embodiment of the invention. In this example, digital lockbox component 3710 is used as a secure container for the title objects that are being traded between party A and party B. Digital lockbox component 3710 further comprises two secure areas that contain the title objects for trade, party A's title objects 3716 are stored in drawer 3712, while party B's title objects 3715 are stored in drawer 3714. Digital lockbox component 3710 further permits inspection by either party into the contents of the lockbox in order for each to verify the title objects and approve or cancel the trade. Digital lockbox component 3710 would not permit ownership to be transferred and only permits viewing of sample content, or of the content permitted by a redemption method (e.g. content legally shared). When both parties have confirmed the trade and approved of title objects 3716 and 3715, digital lockbox component 3710 claims ownership over all title objects in the lockbox, and then transfers ownership to the respective party. Transferring ownership involves delivering title objects 3716 and 3715 to the appropriate title manager 3718 and 3720 and subsequently having title managers 3718 and 3720 claim ownership for their respective party. Digital lockbox component 3710 in this case is similar to a $3^{rd}$ party escrow system by providing a substantial level of guarantee to both parties involved in the trade. For instance, if any part of the trade failed during the claim process, digital lockbox 3710 can rollback the entire trade. Digital lockbox 3710 can also provide a legal record of the trade to all parties involved in the trade. As shown in the example, the contents of the trade can be one or multiple title objects.

In another embodiment, digital lockbox component 3710 supports a transfer in which party A intends to give party B the title objects with nothing expected in return. For example, party B could sample the content and review it before accepting the transfer. The claim process for the title objects would remain the same and digital lockbox component 3710 can provide a record of the transaction. In yet another embodiment, digital lockbox component 3710 can support: multi-party, dependent trades, nested-trades. In yet another embodiment, digital lockbox component 3710 may support complex trades involving service level agreements, insurance, legal recourse, guarantees, and content introspection. For example, a highly confidential trade can be implemented with special content inspection rights provided through digital lockbox component 3710. This would provide both parties with the ability to view the confidential content for the duration of the trade negotiations under special circumstances, such as viewing directly using a controlled application similar to that provided by digital rights management software.

In another embodiment, a simplified trade can be executed directly between two parties by having title manager components 3718 and 3720 simply transfer title objects 3716 and 3715, and subsequently have the receiving title manager 3718 and 3720 claim ownership over the respective title objects 3716 and 3715. In yet another embodiment, a trade can be executed directly by title manager components 3718 and 3720 acting as secure agents. An established protocol can be used by title managers 3718 and 3720 to securely trade the title objects. For example, a Boolean circuit can be utilized by the title managers. In another embodiment, security ownership indicia associated with each title object can be updated according to specific title authentication techniques employed by each respective title objects 3716 and 3715.

Although the structure and management of titles as described herein may make specific or general references to certain technologies such as XML, other technologies may be available. Title structures can be represented in any number of formats, and management or lifecycle processes can be implemented in any number of ways. For example, a title object and its management maybe implemented directly in computer executable code. This type of title object can be an effective method for creating title enabled mobile code, self-executing title objects, digital robots, and crawlers. In this example, using the title object can provide significant benefits in that trust and integrity can be transmitted with the mobile code. In the example where the title object is self-executing code, the title object can implement title creation functions to morph or transform itself. In another embodiment, a title object can be described in a scripting language and executed as required. For example, a title object can be described and implemented as a Javascript program and embedded within a web page. The Javascript program would comprise not only the title structure, but also the logic to process the titles such as implementing the rules and redemption methods. The Javascript code can be used to embed titles in a web page and participate in the title transaction ecosystem.

In another embodiment, title objects and management components are directly embedded into hardware. For example, a title object can be stored on a smartcard device along with a secure management component that is responsible for processing and updating the title object's security indicia. A user would subsequently insert the smartcard into a terminal in order, among other things, to guarantee transaction validity. The title object's security indicia would be securely updated directly on the smartcard, as a security precaution. In another example, management components are implemented as firmware in hardware computing appliances (i.e., firewalls, consumer set-top boxes, etc.), or in portable hardware tokens that can be attached to computing devices through direct interfaces, cables or wireless connections.

F. Title Protocol and Authentication

Figure 38:
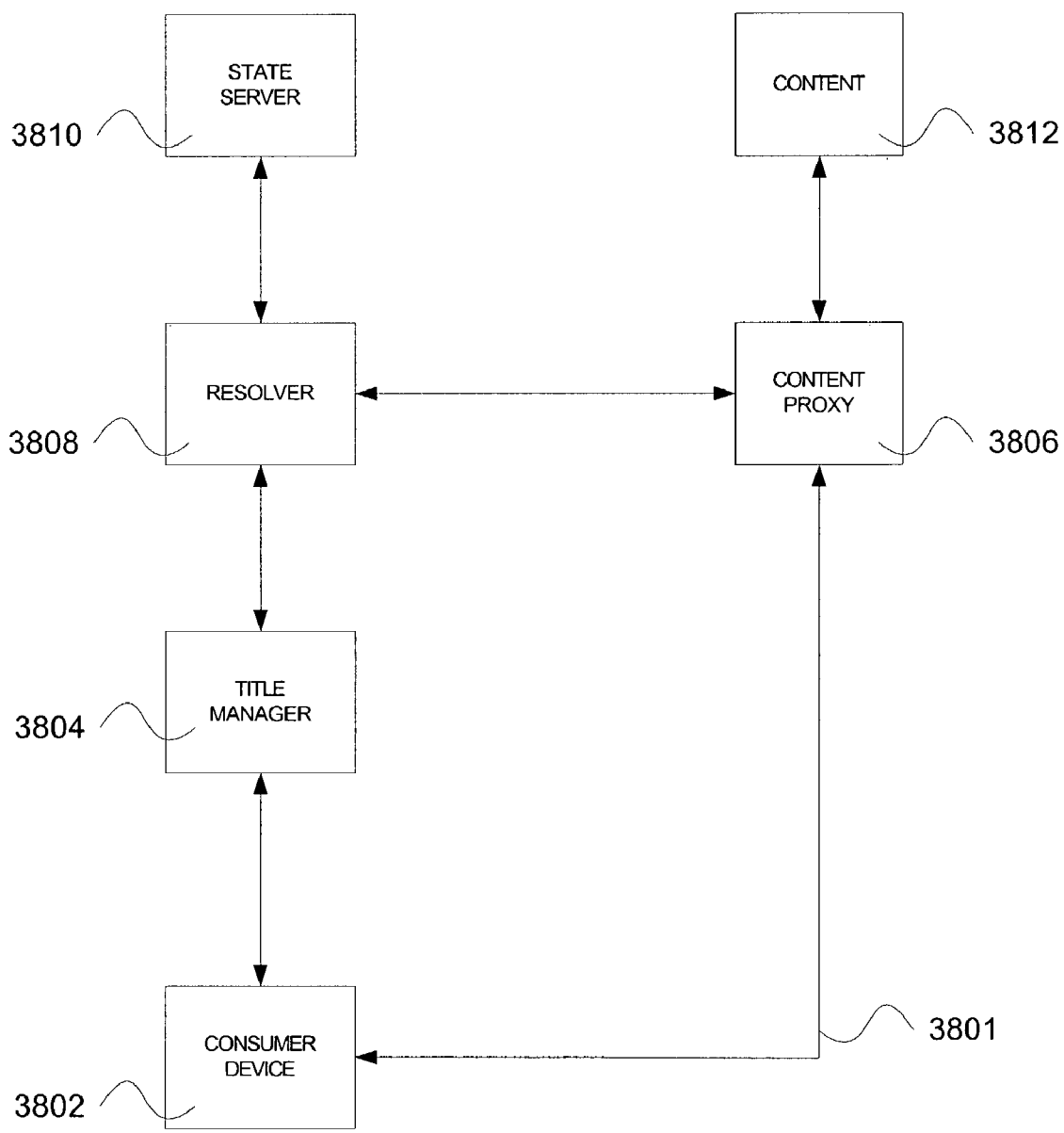
FIGS. 38-39 depict a simplified title transaction flow, according to an embodiment of the invention.

In another embodiment, a title protocol is employed for communication between systems participating in a title based transaction. Referring now to FIG. 38, a simplified title transaction flow is shown, such as the redemption of a title to obtain content. In one embodiment, the title transaction components operate on separate computing devices. In another embodiment, the title transaction components operate on the same device. For example, the functionality of title manager 3804 can be operated directly on consumer device 3802 as a complete application. Likewise, the functionality of content proxy 3806 can be operated directly on content server 3812. Furthermore, this transaction flow can be used to assist in the description of the protocol requirements, and additional transaction flows are intended to be supported by the protocol.

The components depicted in FIG. 38 may communicate using protocol 3801. In one embodiment, protocol 3801 is a layered protocol whereby a title specific protocol must operate on top of another underlying protocol, which may also run on top of another protocol. For example, protocol 3801 may comprise a SOAP message which uses the HTTP protocol for communication over a TCP/IP network. In another embodiment, protocol 3801 can be the title protocol expressed in a format communicated directly over a TCP/IP network. In this embodiment, the protocol 3801 can be implemented with a complete set of specifications in a similar fashion to HTTP. This implementation can include protocol message structures, choreography, standard command languages, and extensible constructs. As and example, protocol 3801 can be implemented as another standard Uniform Resource Locator (URL) such that it can be specified in a format similar to DAXP://transaction.example.com where DAXP is the protocol reference. In this case DAXP is only used as an example and could refer to the Digital Asset exchange Protocol. In another embodiment, protocol 3801 comprises a mixture of protocols as required for communication between the various components. For example, consumer device 3802 can be a mobile device that uses a binary representation of protocol 3801 and communicates using an RF protocol to title manager 3804 and content proxy 3806. In the same transaction flow, the remaining components can communicate using protocol 3801 expressed as a SOAP message. In one embodiment, protocol 3801 can be used for establishing dynamic and policy controlled connections in existing network infrastructures, such as control signals for packet switching networks, content distribution networks, load balancing systems, and also for establishing security associations in secure protocols such as IPSec and IPv6.

Protocol 3801 can be used in other circumstances and not just for communication between devices over an external network such as the Internet. In another embodiment, the protocol can be implemented within a device for communication between components. For example, in an embedded implementation such as an electronically controlled machine in a manufacturing application, the protocol 3801 can be implemented for communication between discretely operating components. This can include retrieving control sequences and operating independent machine apparatus. The protocol can accommodate both synchronous and asynchronous messaging processes such that sequences of events can be triggered as required as well as on-demand, or as available.

In one embodiment, consumer device 3802 is used to communicate the redemption request to title manager 3804. Title manager 3804 performs title processing and returns a title command to the consumer device redirecting the consumer to the content. Consumer device 3802 communicates the title directly to content proxy 3806, which subsequently makes a request to a trusted resolver 3808 in order to validate and authenticate the title. In this embodiment, resolver 3808 is a separate component. In another embodiment, the resolver functionality may be incorporated directly into the content proxy.

Resolver 3808 both validates the title (by ensuring that rules are properly executed) and also to authenticate the title. In one embodiment, in order to properly authenticate the title, resolver 3808 communicates the title object to the state server 3810. State server 3810 subsequently authenticates the title object using an authentication technique specified by the title and supported by state server 3810. The authentication process may further involve security indicia included with the title object. The endorsement process is responsible for placing the security indicia in the title object. In one embodiment, state server 3810 returns the authentication response to resolver 3808 along with updated security indicia for the title. If the title is authentic and valid, resolver 3808 communicates the updated security indicia to title manager 3804 and responds to the original request by content proxy 3806.

Upon successful authentication, content proxy 3806 permits the request through to content 3812 which is then returned to consumer device 3802. If the transaction should substantially fail, and consumer device 3802 cannot communicate with content 3812, an error message may be returned. In one embodiment, the error message is substantially communicated to all participating parties to insure an orderly rollback of the transaction, if needed.

In another embodiment, multiple titles may be involved in a transaction. For example, a consumer may want to redeem multiple content objects, each comprising a separate title object, or redeem only one title object requiring the presentation of another title object for identity and authorization. In yet another embodiment, the intermediary parties and systems involved in a transaction may also be required to present titles to other systems with which they communicate with during the transaction flow. These titles can be used to authenticate the intermediaries and systems involved. For example, resolver 3808 in FIG. 38 may be required to present a ticket to state server 3810 in order to authenticate it.

Figure 39:
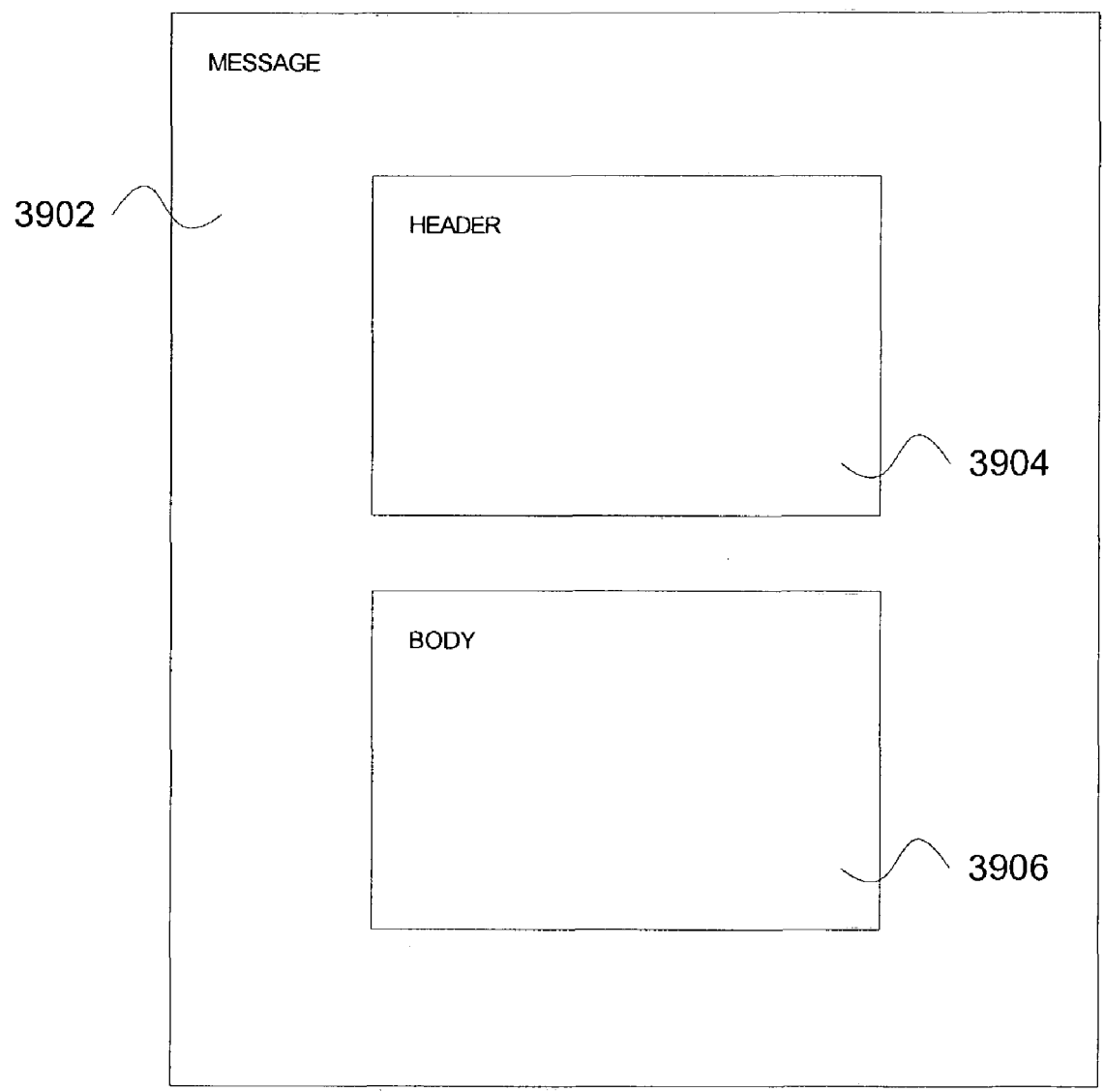

FIG. 39 depicts a simplified structure of title protocol 3801 used for communication during a transaction flow, as shown in FIG. 38. Message component 3902 comprises header component 3904 and body component 3906. In one embodiment, message component 3902 is a container element for the header and body components and may contain additional properties as required by the underlying protocol used to carry the message. For example, title protocol 3801 can be implemented as a SOAP message that is bound to an underlying protocol such as HTTP. In this example, message component 3902 is a SOAP envelope element, header component 3904 is a SOAP header element, and body component 3906 is a SOAP body element. In another embodiment, message component 3902 can explicitly comprise both the header and body components. The combined message can then be encapsulated directly in a SOAP body or other underlying protocol format. Although the examples described herein follow a structure that is suited to the XML based SOAP protocol, this is simply to demonstrate the protocol requirements for communications and expression of details required in a transaction. Title protocol 3801 can be implemented in any number of protocol formats such as directly using SMTP, TCP, UDP or another protocol.

Header component 3904 may be used to contain transaction and system specific information that will be processed by some or all of the parties involved in the transaction flow. The header information can be items such as action identifiers, transaction type specifications, routing information, remote commands, and security classifications. Body component 3906 may be used to contain the transaction detail such as titles involved in the transaction.

Figure 40A:
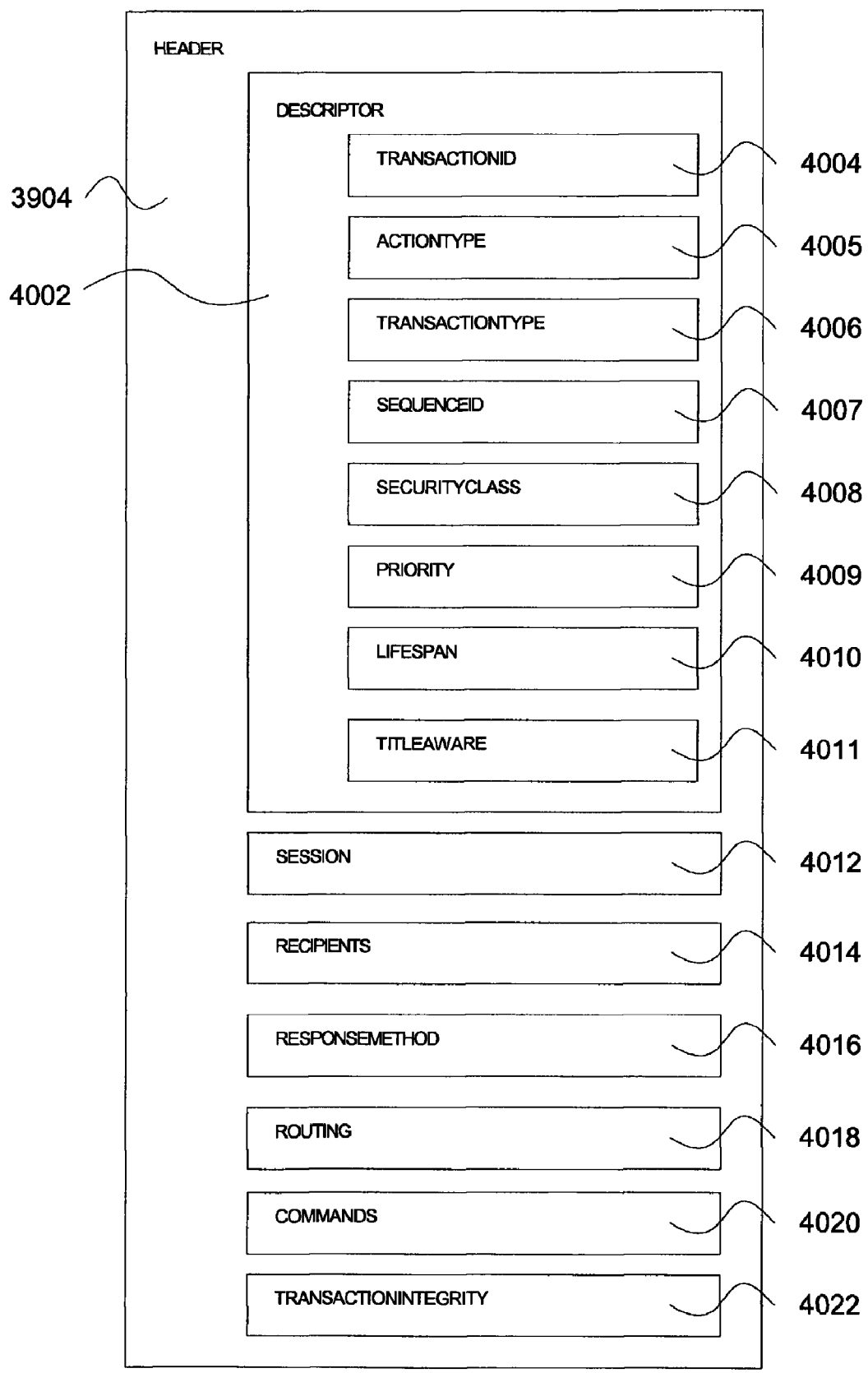
FIG. 40A-B depict a simplified of a header component, according to an embodiment of the invention.

FIG. 40A is a simplified diagram of header component 3904 as shown in FIG. 39. It is further comprised of descriptor component 4002, session component 4012, recipients component 4014, responsemethod component 4016, routing component 4018, commands component 4020, and transactionintegrity component 4022. Descriptor component 4002 further comprises a transactionid component 4004, actiontype component 4005, transactiontype component 4006, sequenceid component 4007, securityclass component 4008, priority component 4009, lifespan component 4010, and title-aware component 4011.

Descriptor component 4002 may be used to describe system related properties associated with the transaction. Transactionid component 4004 may provide an identifier for the transaction that can be used for tracking purposes, and can also be used to maintain state of the transaction. The identifier can be a GUID or some other form of identifier supported by the applications in the ecosystem. Actiontype component 4005 may identify the action that the protocol is initiating and can be a textual label specifying an action such as 'redeem', 'delete', or can be a formal identifier used within the title transaction ecosystem such as an object identifier or URI. Actiontype component 4005 identifies the type of action being performed by the requesting application and may also be used as an identifier in order to initiate particular actions in applications such as triggering tracking and routing. Transactiontype component 4006 may specify the type of transaction that is being conducted, such as identifying this transaction as an ACID transaction. By indicating an ACID transaction all participating applications in the transaction flow must maintain a record of the transaction and also provide the ability to rollback the transaction if required. Transactiontype can comprise a simple indicator of the nature of the transaction and it can also include granular control instructions over the transaction. For example, the transactiontype component can reference transaction processes that must complete before the transaction is successful and if any process fails to complete, the entire transaction is rolled back. In another example, certain processes can be required to complete where other processes can be optional. In this example, a transaction process such as an asynchronous notification message need not complete for the transaction to complete successfully.

Sequenceid component 4007 may provide an identifier for a transaction sequence that this particular transaction object is a member of in set or chain of transactions. In one embodiment, sequenceid component 4007 specifies a numerical order for the processing of this transaction, or provides a more sophisticated identifier such as a hierarchical technique. Securityclass component 4008 may identify the security classification associated with the transaction. The classification may be understood, interpreted, and acted upon by all applications that process the transaction. In one embodiment, the classification is a numerical ordering specifying a security setting from low to high. In another embodiment the securityclass component 4008 specifies a set of parameters or instructions for processing such as indicating the security classification of devices permitted to receive and/or process the protocol message. For example, specifying a government security classification. Priority component 4009 may indicate a priority or class of service that should be applied to the processing of this transaction. In yet another embodiment, priority component 4009 is a textual label to indicate a priority level. This component can maintain service level agreements or providing quality of service guarantees. For example, a transaction object with a high priority level can be placed at the head of the queue for faster response or priority transmission.

Lifespan component 4010 may specify how long a transaction should live. This comprises controls on the processing of the transaction, such that it must be completed within a specified time period, or must be completed within a specified number of steps. Lifespan component 4010 can specify a time such as a UTC time, and/or can specify a numerical number, or some other lifespan indicia that would be understood by applications in the title ecosystem. For example, the minimum and maximum number of devices that a protocol message must traverse in an automated fulfillment application. In this example, the fulfillment process can be automated by a title object traversing a network of fulfillment devices using the protocol 3801 for communication. The title object traverses the network to each device in search of fulfillment offers. The depth of the traversal is controlled by lifespan component 4010 before the title object discontinues its search. Titleaware component 4011 may identify if the source device or application is title aware (such that they understand and process titles directly), allowing the initiation of certain processing. For instance, an application that is not title aware may require assistance from proxies in handling title based transactions.

Session component 4012 may specify a session identifier to be associated with the transaction. The session identifier can be any type of identifier used by the processing applications to uniquely identify the session. For example, in web server applications a session identifier is created when a user logs into the web server. Session component 4012 may permit a set of transactions to be related and tracked to a particular session.

Recipients component 4014 may identify the parties that should receive and process the transaction. It further comprises identifiers for the recipients in compliance with the network protocols that are handling the transaction. In one embodiment, the recipients are identified through domain names. In another embodiment the recipients are identified through URLs. In another embodiment, the recipients are identified by using titles. The structure of recipients component 4014 may be such that one or many recipients can be identified. Furthermore, a group of recipients can be identified such as in broadcast or multicast situations.

Responsemethod component 4016 may specify the technique and address of where to direct the response to this transaction. This component allows the support of asynchronous message responses such that the response to a transaction can be directed through different channels. In one embodiment, the original transaction is received through a SOAP message over HTTP. Once the transaction is completed, the initiator of the transaction may require that the response be sent through another channel such as over SMTP. In another embodiment, the initiator may also indicate that the response be sent back through the original channel (such as HTTP) as well as through another channel (such as SMTP). Multiple response methods can be indicated in the responsemethod component 4016. In another embodiment, the responsemethod can specify that no response is required and can be used to control one-way and two-way communication. In another example, the responsemethod 4016 can specify a timed response, such that a response will not be initiated until required by the requesting device or application. Routing component 4018 comprises instructions on how the transaction is to be routed through intermediary or participating parties. The routing instructions should be understood, interpreted, and processed by all devices and applications that receive the transaction.

Commands component 4020 may specify commands to the receiving application or applications of the transaction object. These commands will be formatted in a manner consistent with the command language understood by the receiving application, or applications, or devices. For example, scripts may be included such as XSLT, Javascript, or other scripts and command languages. This component allows additional instructions to accompany the transaction. In another embodiment, the commands component 4020 can be used to implement callbacks. In one embodiment, the commands component 4020 can be combined with the routing component 4018 for flexible and powerful network control. Referring again to FIG. 40B, an example can comprise routing instructions in routing component 4018 that specifies a path through a network, and the command component 4020 can relay commands to devices in the path. In this example, the commands can be used to apply network configuration changes in support of dynamic quality of service parameters. This embodiment can be used to effectively support a policy based network. Likewise, this embodiment can also be used to reconfigure tools in automated machinery and perform re-tooling duties on a scheduled basis.

Figure 40B:
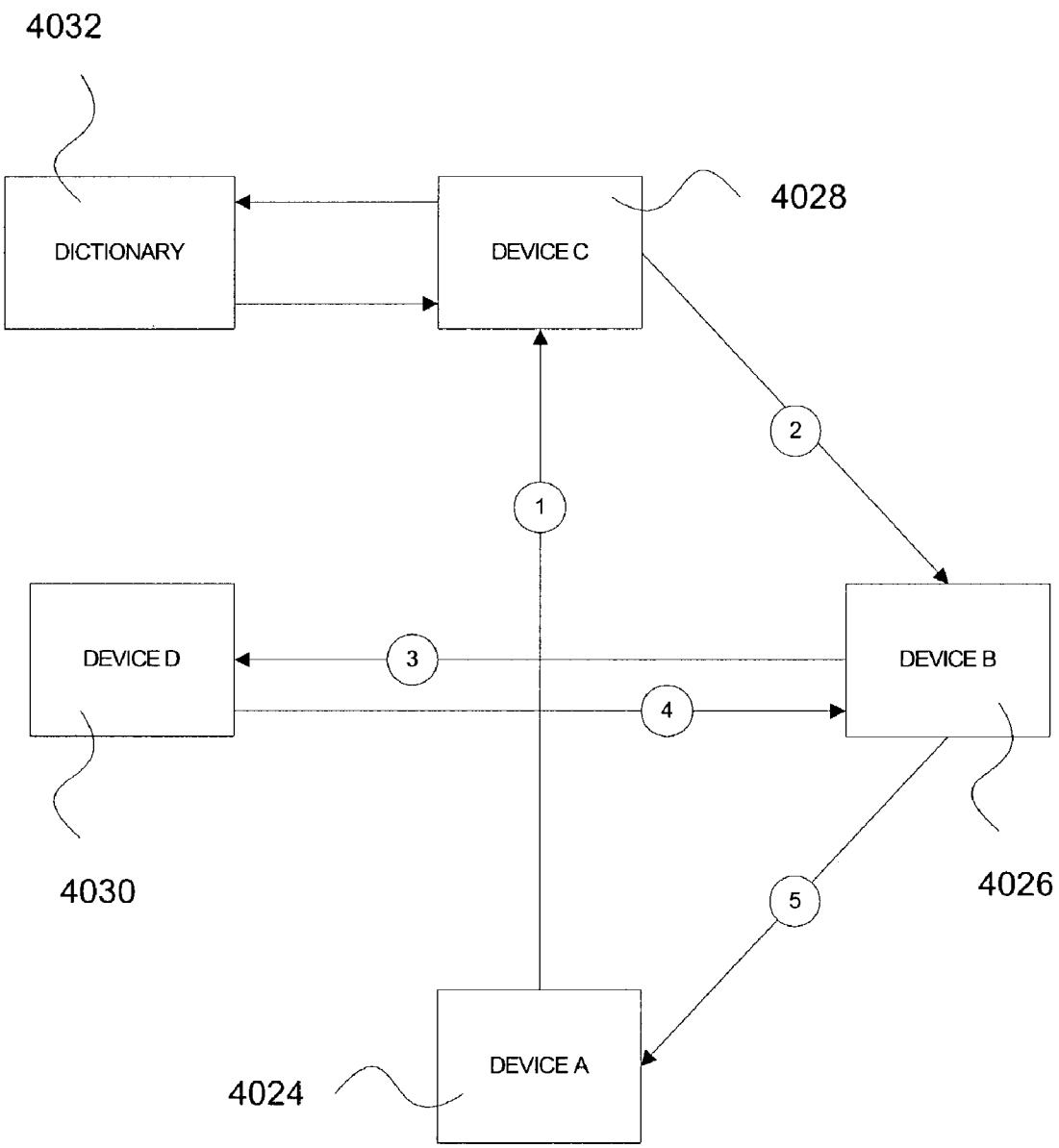

In another embodiment, protocol 3801 can be combined with title objects to create efficient and effective robots or remote control objects to automate tasks and implement intelligent networks. Routing and command structures along with protocol 3801 can be combined with title object rules and redemption methods for smart network traversal, instruction relays, dynamic communications, information gathering and logic processing. For example, title objects are provided with a mechanism and language for communication and collaboration with other title objects on the network. In another embodiment, title objects and protocol 3801 can also utilize dictionaries and dictionary components as containers and servers for logic that the title objects and protocol messages require. This permits the title object and protocol message to remain small while providing the ability for the object and/or message to retrieve logic as required and in the format necessary for the processing environment. For example, a protocol message 3801 contains command references to a remote dictionary component 4032 as depicted in FIG. 40B, as the message arrives on device c 4028; the dictionary is queried to obtain the command logic. The logic is then executed on device c 4028. In another embodiment, the title object and/or protocol message can utilize the dictionary to transform into processing instructions or code that is compatible with the current device.

Transactionintegrity component 4022, as shown in FIG. 40A, may provide security indicia to verify the integrity of the transaction. The security indicia can be the result of a cryptographic computation such as a SHA-1 hash result. Transactionintegrity component 4022 may indicate the technique used to render the security indicia, and may further comprise options, or be used in conjunction with or instead of the integrity checking capabilities of the underlying protocols. For example, the SSL protocol provides integrity checking as the transaction is transported over the network. However, transactionintegrity component 4022 may further provide end-to-end integrity checking between the communicating applications and even through intermediaries, whereas the SSL protocol cannot. In one embodiment, transactionintegrity component 4022 would indicate the specifics of the integrity checking such as an integrity check on the entire message 3902, or on the header 3904, or on the body 3906, or separately on the header 3904 and the body 3906.

Referring now to FIG. 40B, the routing of protocol messages between devices is shown, according to one embodiment of the invention. For example, a message originating on device A 4024, is routed to device C 4028 as required in the routing instructions. The protocol message is processed at device C 4028, routed to device B 4026, then routed to device D 4030, subsequently routed back to device B, and then finally back to the originating device A 4024.

At each step in the network traversal the protocol message can be processed by devices, including the title objects that may be contained in the message. In another embodiment, the processing can be intelligent in that protocol messages and title objects may execute a learning process. That is, they gather information and properties from each device in order to make smart decisions on the routing method and path. The protocol messages as they are executed on processing devices can contain routing instructions that are triggered on events. For example, as the protocol message arrived at device B 4026, its processing can include information gathering, such as identifying additional devices in the proximity that meet the order fulfillment requirements and service level agreements. Based on the information gathered and the routing instructions, a decision can be made to route to device D 4030.

Figure 41:
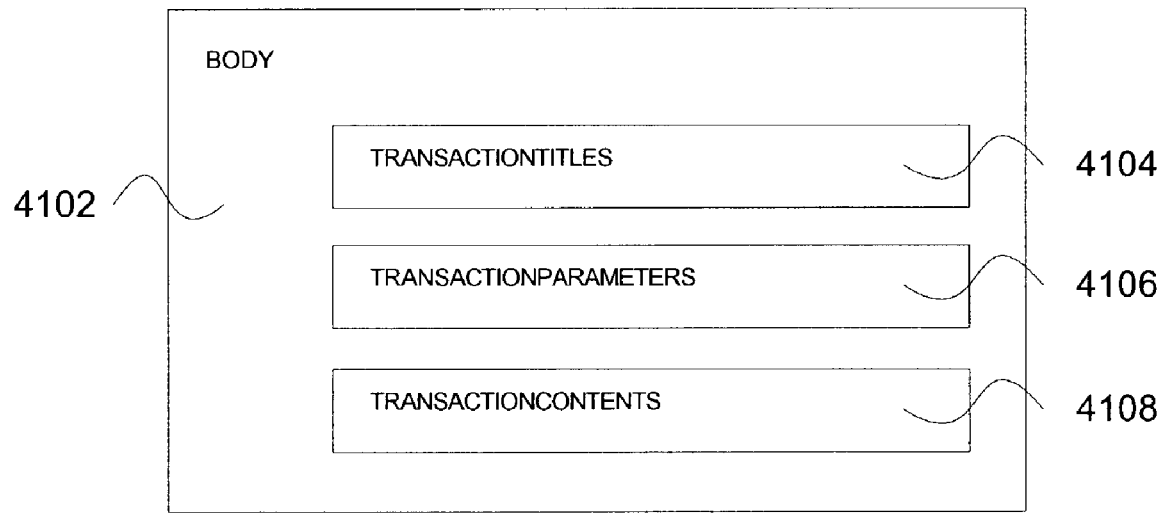
FIG. 41 depicts a simplified diagram of a body component, according to an embodiment of the invention.

Referring now to FIG. 41, a simplified diagram of a body component, as shown in FIG. 39 is shown. Body component 4102 is further comprised of transactiontitles component 4104, transactionparameters component 4106, and transactioncontents component 4108. Transactiontitles component 4104 may comprise titles of transaction participants. For example, it may contain the tag of a consumer who has initiated the transaction using consumer device 3802, as shown in FIG. 38. Transactiontitles component 4104 can comprise authenticating material for the title owner. For example, if a title involved in the transaction is a ticket, then the owner of the ticket may need to be authenticated. The transactiontitles component 4104 can relay the necessary security indicium that resulted from the owner authentication process. In this example, the recipient of the protocol message can rely on the authenticating indicia based on a pre-established trust relationship thereby eliminating the need to re-authenticate the owner through a separate challenge-response process. In another embodiment, the owner of the title may need to be directly verified in order to redeem the title. For example, if a resolver component 3808 receives a title object such as a ticket, it may be required to directly authenticate the owner. This can result in a set of protocol messages being sent in a challenge-response conversation so that the owner can properly authenticate them self. Authentication can occur within the constraints specified by the title object, such as username and password, public key cryptography, biometrics, etc.

In another embodiment, transactiontitles component 4104 may only contain stubs that reference titles. This method is supported by the title object in that the stub can reference the title to which it is bound/attached and that may be stored remotely on another device. This technique can be effective in reducing the size and verbosity of the protocol 3801. As an example, an owner may have many titles that represent the same currency and denomination in their wallet. The only differentiating factor between the titles is the authenticator stub. For communication purposes it could be inefficient to transport all titles over a network such as a wireless RF network. In this instance, the stubs could be sent rather than the entire title. The stub elements reference a title using their binding components. In another instance, a single copy of the title can be sent along with all the stubs necessary for the transaction.

Transactionparameters component 4106 may specify all the arbitrary parameters or properties associated with the transaction. For example, parameters can specify a particular transform that should be applied to the result of a query transaction to title manager 3804, as shown in FIG. 38. Transactioncontent component 4108 may contain all the content associated with the transaction that the applications need to communicate.

Communication channels and discovery are essential elements for support of the protocol 3801. As mentioned previously, the protocol 3801 can be implemented on top of existing protocols and existing communication channels such as TCP/IP, RF networks, and the Internet. Discovery is the process whereby devices, applications, and title objects can find and locate each other using various identity, naming, and locator schemes. The discovery mechanism can be implemented using a variety of techniques depending on the environment where the protocol 3801 is operating. For example, the discovery technique can differ significantly between the Internet, embedded devices, and locator systems such as GPS.

Figure 42:
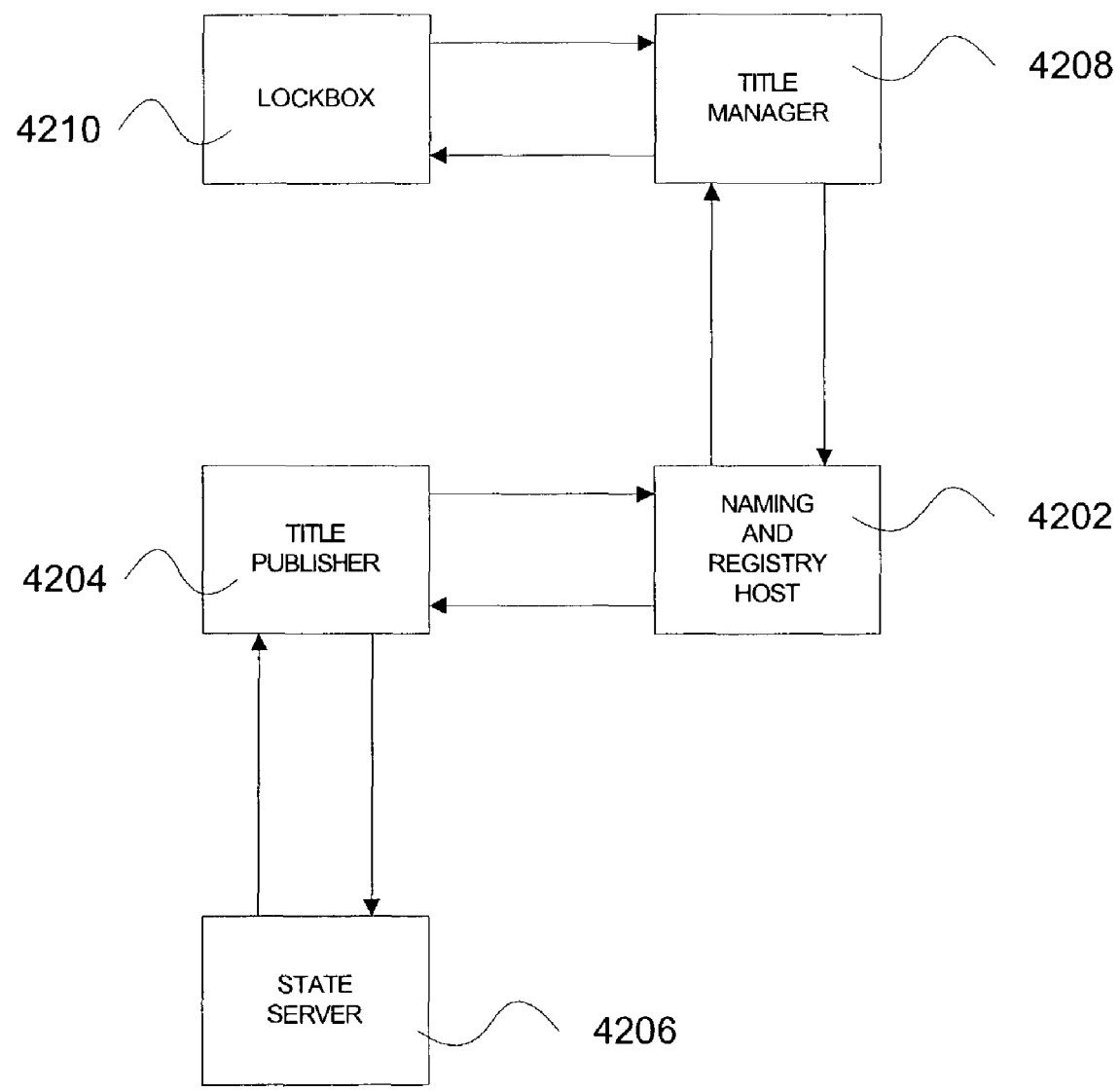
FIG. 42 depicts a simplified diagram of a discovery process that can be implemented on various networks, according to an embodiment of the invention.

Referring now to FIG. 42, a simplified diagram of a discovery process that can be implemented on various networks is shown, according to one embodiment of the invention. Naming and registry host 4202 identifies various devices by resolving names to network addresses. Title publisher 4204 locates the address of the state server 4206 by communicating with the naming host 4202. Once the title publisher 4204 has obtained the address, it can then communicate directly with state server 4206 using the network channel supported by the computing devices on which the title publisher and state server operate. Likewise, title manager 4208 can locate a remote lockbox 4210 by communicating with naming host 4204. In another embodiment, naming and registry host 4202 can be a network of naming devices that communicate and propagate address resolution tables.

Figure 43:
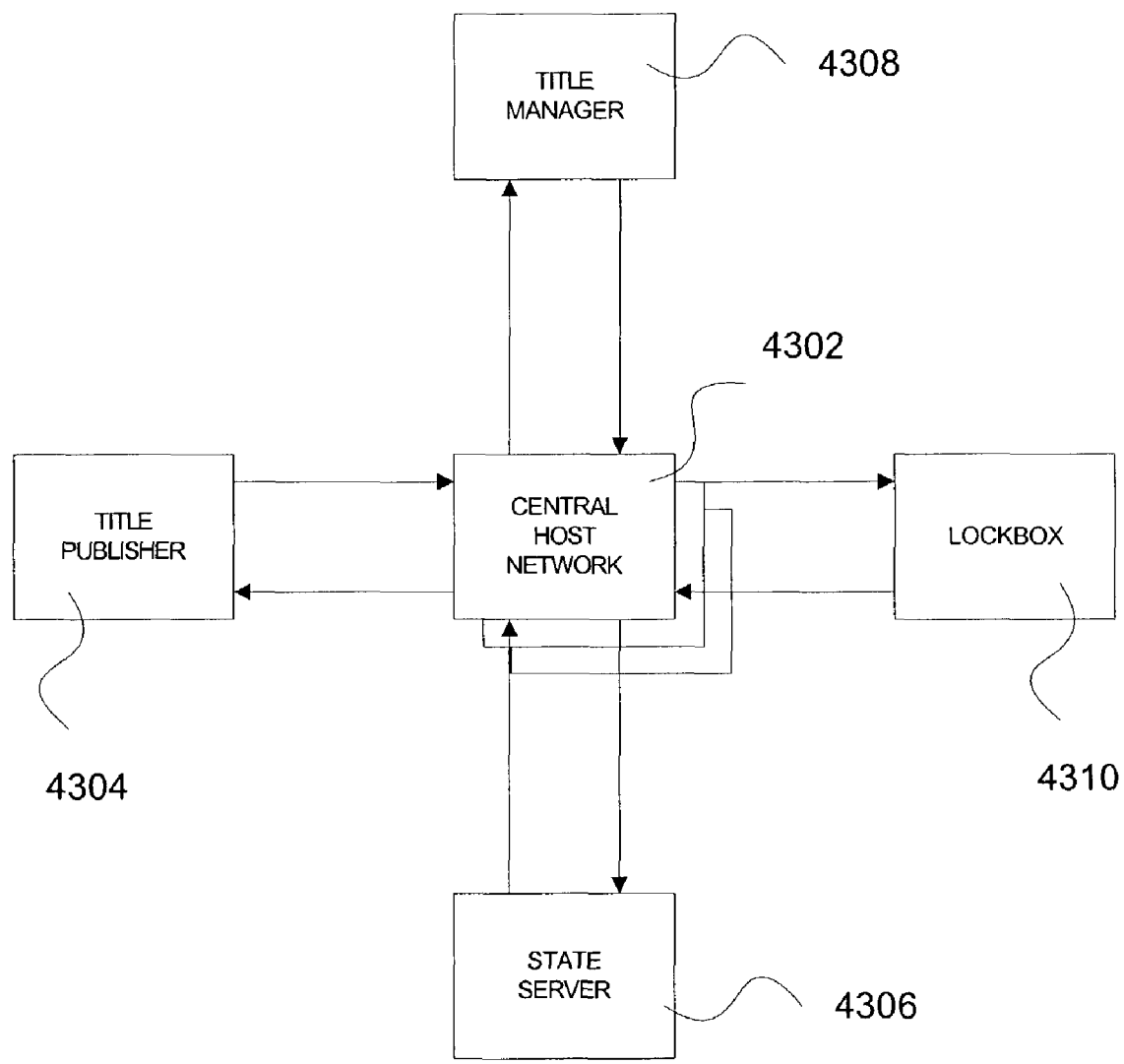
FIG. 43 depicts a simplified diagram of a discovery and channel technique, according to an embodiment of the invention.

Referring now to FIG. 43, a simplified diagram of a discovery and channel technique is shown, according to one embodiment of the invention. In this embodiment, all communication takes place through a central host or central host network 4302. Title publisher 4304 starts the communication and originates a protocol message to state server 4306 using the state server's name which is then sent to central host 4302 for resolution and delivery. Central host network 4302 would be responsible for resolving the state server's name to a network address and delivering the protocol message. In this example, the address of state server 4306 can be static or dynamic depending on the network implementation. In this embodiment, the protocol can be implemented over networks such as instant messaging and electronic mail.

Figure 44:
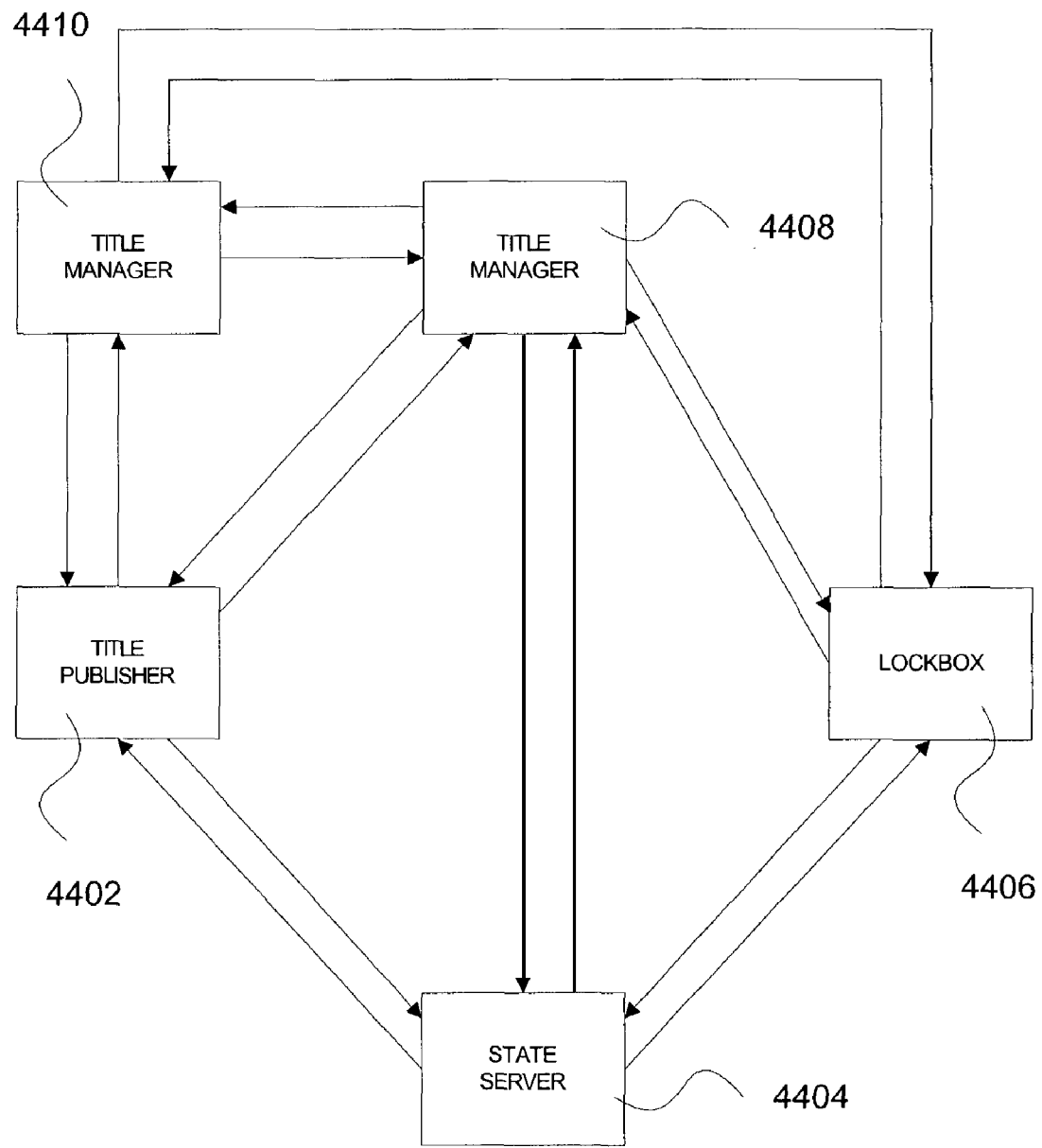
FIG. 44 depicts a simplified diagram of a dynamic discovery and channel technique, according to an embodiment of the invention.

Referring now to FIG. 44, a simplified diagram of a dynamic discovery and channel technique is shown, according to one embodiment of the invention. In this example, the process whereby the title publisher 4402 discovers the state server 4404 is accomplished dynamically through a broadcast or multicast query, initiated by the title publisher 4402, on the network. Responses are returned, including a response from the state server 4404. Title publisher 4402 analyzes the responses and then initiates communication with the state server 4404. This embodiment is representative of a peering relationship between all devices on the network such as on a peer-to-peer network. Discovery in the peering relationships is established through network queries and responses. In another embodiment of the peering relationships, discovery can be accomplished through physical proximity, such as in the case of wireless networks. In this example, discovery would occur through standard wireless protocols, transmitters, and receivers whereby devices would discover other devices within close proximity such as in IEEE 802.3b wireless local area networks, Bluetooth personal area networks, and infrared transceivers. Protocol 3801 can take advantage of roaming capabilities within these types of networks to discover and utilize the capabilities of a distributed and diverse network. Trust can be an important element in the network and is described later in the document and also as an aspect of the authentication process.

The transaction flow and protocol may rely on authentication of titles to properly identify parties involved in a transaction, as well as evaluate the trust that should be placed on a transaction. As illustrated in FIG. 38, a title is redeemed and authenticated by state server 3810. The authentication technique employed by state server 3810 can enable transaction processing, as well as maintain the authentic, valid, and unique properties of titles. For example, state server 3810 is substantially responsible for endorsing and authenticating titles, and can also participate in the transaction flow by preserving state between transactions, as well as implementing guarantees, or other transaction logic such as notification and callbacks. The endorsement process provides a title or set of titles to state server 3810 for certification (i.e., proper identification and authorization for circulation). State server 3810 may then apply an endorsement process in order to create unique security indicia that may be applied to the title being endorsed. State server 3810 may also apply an authentication process in order to both authenticate and update the security indicia.

Figure 45:
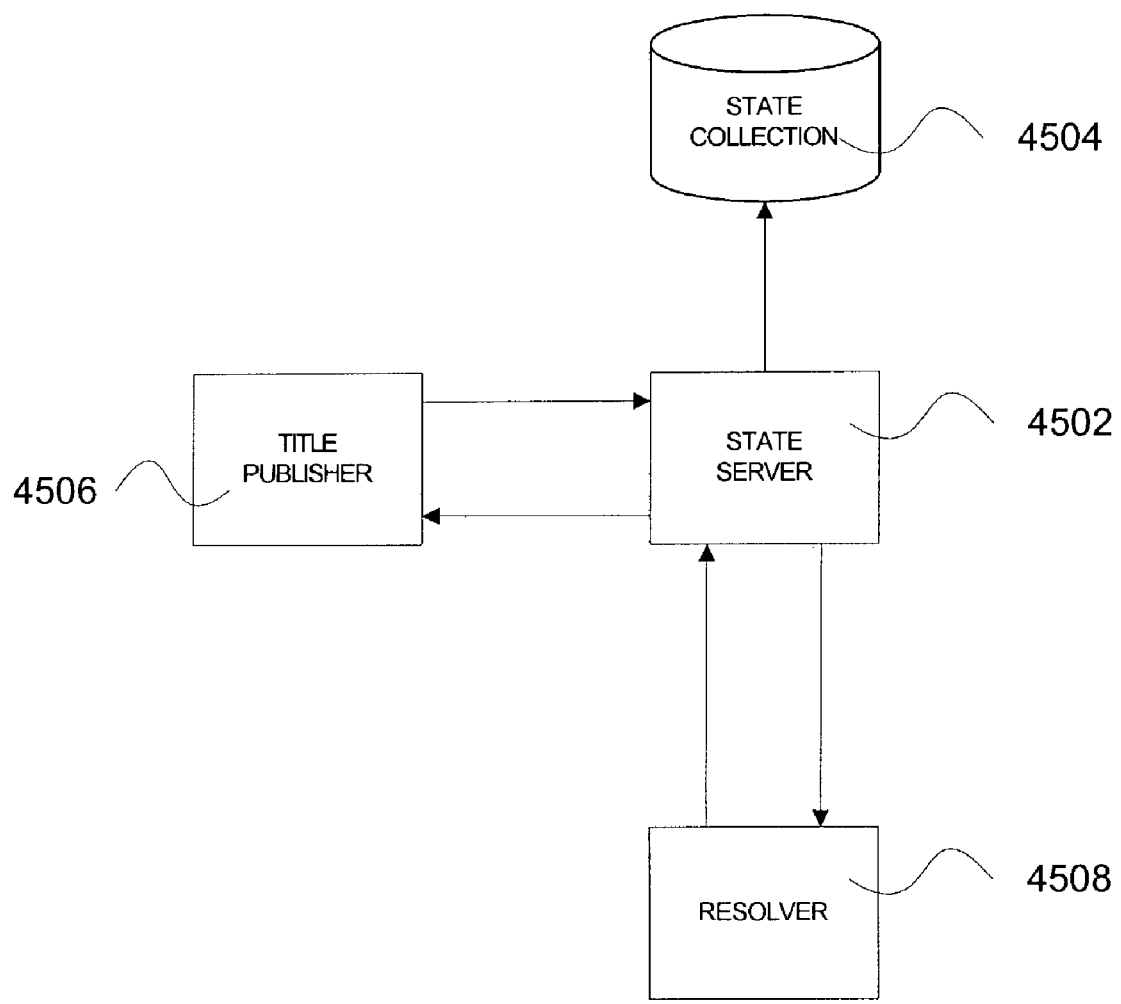
FIG. 45 depicts a simplified diagram of an endorsement and authentication process, according to an embodiment of the invention.

Referring now to FIG. 45, a simplified diagram of an endorsement and authentication process is shown, according to one embodiment of the invention. New titles generated by title publisher 4506 are not generally certified or recognized in the title ecosystem, since they lack authenticator stubs. In general, new titles are sent to state server 4502 for endorsement using protocol 3801. State server 4502 performs the endorsement process and creates the unique security indicia for all the titles being endorsed. State server 4502 then stores the state of the current security indicia in state collection 4504, and subsequently returns the endorsed titles to the title publisher 4506 for further processing, such as distribution to a title manager. In one embodiment, content within the protocol message comprises a copy of the title or titles to be endorsed. In another embodiment, state collection 4504 is a database of current security indicia for each title in circulation.

In another embodiment, when a title is used (for example, during a redeem action), the title is presented to state server 4502 for authentication by resolver 4508. State server 4502 performs the authentication process and verifies the security indicia contained within the title to that of the current state maintained in the state collection 4504. The security indicium for a title is contained in the titles authenticator stub.

State server 4502 may also perform endorsement and authentication as supported by the title transaction ecosystem. A variety of techniques and algorithms can be supported by the title technology, and the technique and algorithm employed on a particular title can be subsequently conveyed to state server 4502 for authentication. In one embodiment, a chained hash mechanism, similar to Pay Word, is used for title authentication. In another embodiment, the chained hash may be generated by repeatedly hashing an initial value v which may include title information combined with a random number or other appropriate data using a cryptographically strong hash function H such as MD5 or SHA-1. The first iteration of the chained hash algorithm gives $h0=H(v)$. The second iteration gives $h1=H(h0)$. The nth iteration gives $hn=H(hn-1)$ where n represents the desired length of the hash chain. This hash chain of length n may represent any value within the system from the maximum number of redemptions allowed by a title to the maximum number of users connected to a system, or any other value required by the system. In another embodiment, v may be composed of a random value and a hash of the title to later be used for title integrity verification.

In another embodiment, the state server component may generate hn and securely store n and the value v that was used as the initial hash value for h0. The value hn may then be set in the authenticator stub for the title along with the name of the hash algorithm used to create hn. In one instance, the client may then later present the title upon redemption where the state server may extract the value hn from the authenticator stub along with the hash algorithm name specified by that stub. The state server may then look up its stored values v and n and compute $hi=Hi(hi-1)$ where $h0=H0(v)$ and $i=\{1, 2, 3, \ldots, n\}$. The value hn would be checked for equality with hi and if equal, the title would be authenticated. The server may then store n-1 in place of n, generate a new authenticator stub containing hn-1 and the name of the algorithm used, and return that stub back to the client where the title may be authenticated again using the above process as long as n>0.

In yet another embodiment, state server 4502 generates the hash as defined above and set the values hn, and ve along with the name of the hash algorithm used in the authenticator stub, where ve is the encrypted value v. The state server would only need to store n in this embodiment. Upon redemption, the client would present the title with the authenticator stub containing ve, hn, and the name of the hash algorithm to use. The state server component may then decrypt ve to get vd and compute $hi=Hi(hi-1)$ where $h0=H0(vd)$ and $i=\{1, 2, 3, \ldots, n\}$. The state server component would then verify hi=hn and if true, the title would be authenticated. The server may then store n-1 in place of n, generate a new authenticator stub containing hn-1, ve, and the name of the hash algorithm used, and return that stub back to the client where the title may be authenticated again using the above process as long as n>0.

In yet another embodiment, the client is responsible for generating the hash chain. In one instance, the client generates the value v using the techniques described above or another appropriate method. The client then computes the hash chain $hi=Hi(hi-1)$ where $h0=H0(v)$ and $i=\{1, 2, 3, \ldots, n\}$. The resulting hash chain=$\{h0, h1, h2, \ldots, hn\}$. The client sends its credentials, h0, and the name of the hash algorithm used, to the state server component. The state server component verifies the client's credentials and stores h0 in its secure data store. Upon title redemption, the client sends the title with h1 and the name of the hash algorithm embedded in the authenticator stub to the state server component for verification. The state server component retrieves h0 from its secure data store and hashes h0 using the algorithm indicated to produce h1*. The title is authenticated if and only if h1=h1*. The state server component then replaces h0 with h1 in its secure data store. The client can no longer use h1. Note that in this embodiment the client will always supply hi and the state server component will always store hi1. The ith redemption consists of the value hi supplied by the client which the state server component can verify using hi-1. Each such redemption requires no calculations from the client and only a single hash operation by the state server component.

In another embodiment, when a chain of hashes expires, such as n=0, the state server 4502 can automatically perform a re-endorsement of the title and create a new chain. The re-endorsement can occur selectively and as permitted on the particular title.

In another embodiment, a random value technique is applied to authenticate a title. A random value is generated by the state server 4502 and placed in the authenticator stub. The state server 4502 also maintains a record of the random value in its state collection 4504. The random value would be changed by the state server every time the title is authenticated and only the title object with the correct random value would be valid.

Figures 46A, 46B:
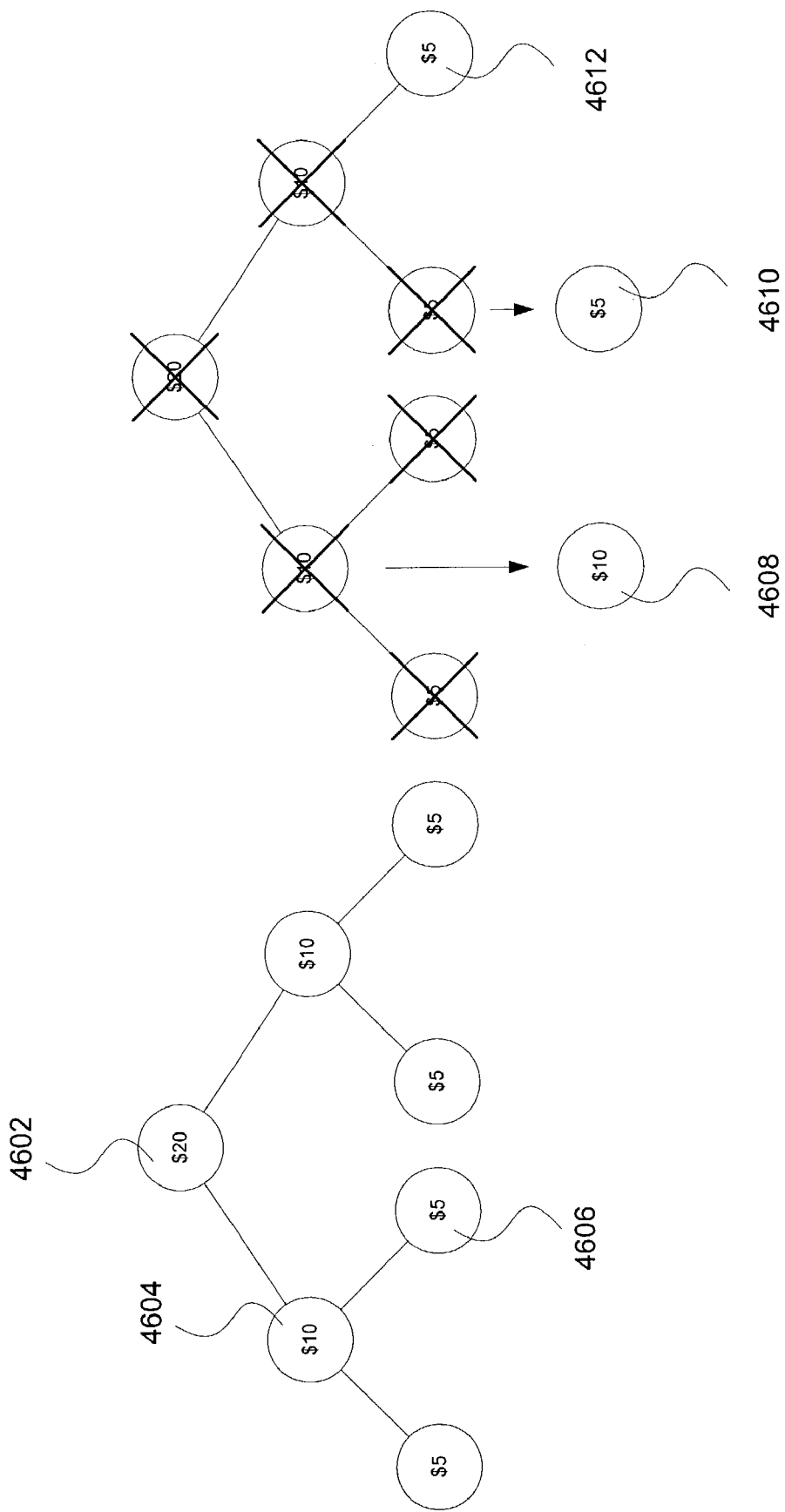
FIG. 46A-B depict a simplified example of an hash authentication scheme, according to an embodiment of the invention.

Referring now to FIGS. 46A-B, a simplified diagram of a hash authentication scheme for divisible cash is shown, according to one embodiment of the invention. In one embodiment, a title's value is represented by a tree where each node represents a denomination of the title and the root node is the sum of all its child nodes equal to the total value of the title. For example, in FIG. 46A, a title representing a twenty dollar bill in US currency is shown. The value of the root node is $20 as represented by 4602, and has two immediate child nodes each valued at $10 as represented by 4604. Each of the $10 nodes would have two $5 nodes as represented by 4606. Each parent node is a hash of its immediate child nodes such that each $5 node is hashed with some initial random values and its parent node, the $10 node, is a hash of its two $5 child nodes. If customer A wishes to pay merchant B with part of a title, then A would present B with the hash of the nodes A wishes to spend.

Referring now to FIG. 46B, if A wishes to spend $15 of a $20 node, then the hashes of the nodes for $10 4608 and $5 4610 would be given to B. When a node is spent, it and its forefathers may not be spent again. In this example, A would be left with a single valid $5 node 4612 representing the amount remaining after payment. When B deposits the payment into the bank C, C only needs to verify that the $10 and $5 nodes can be hashed back to the root $20 node. If true, C may record the nodes as spent and issue payment to B In another embodiment of the authentication technique and process, the authenticating security indicia can be separated across multiple title objects. In this instance, two or more title objects would need to be presented in order to authenticate any one, some or all of the title objects. For example, a split-key technique can be applied such that the security indicia is securely broken into multiple parts and correctly applied to a set of title objects in the endorsement process. The title objects can be distributed normally to various parties. In this embodiment all of the parties would need to present their title objects in order to redeem content or gain access to an asset. In one variation of this method, the security indicia can be securely split among various title objects such that only some of those title objects need to be presented and not all. For example, the security indicia can be split across three title objects, but only two title objects need to be presented for authentication. In another variation, the technique applied for authenticating a title can be dependent upon another title or set of titles. For example, the security indicium that authenticates a title can be generated based upon direct references to another title or set of titles. The state server 4502 in this case would reference the other titles and perform a serialized authentication process. These methods can be effective for implementing secondary authentication policies such that two parties must be present before access is granted.

In another embodiment of the authentication technique and process, several layers of security indicia can be applied to a title object. In this instance, a title object can be authenticated at various levels using different security indicia, and can in turn implement different authenticating techniques for each level. For example, in a three stage authentication process, a title object can be endorsed three separate times using different techniques with each technique applying more strict guidelines and stronger security. In this example, the third stage endorsement can be utilized for insecure network traversal; the second stage for more secure network traversal and for limited redemption of the title; the first stage for confidential processing and full access to title redemption methods. This multi-stage endorsement and authentication process can be effective in mixed environments where the title object can be routed and authenticated in an insecure public environment without comprising the security indicia that is used for authentication and verification in secure environments.

In another embodiment, a title object can be endorsed by multiple and independent state servers. This permits a single title object to be endorsed (i.e. certified) by separate parties, domains, entities, etc. thereby permitting use of the title object in a particular environment. In one example, the multiple endorsements can relay a particular trust about the title object. For instance, an ecosystem of computing devices that implement title enabled applications may be configured such that they trust only state servers that are identified and reside in the ecosystem; as well as trusting only titles endorsed by these state servers. In order for these applications to trust a title that originated outside the ecosystem it can be re-endorsed by the state servers inside the ecosystem. In this example, the title object would have two endorsements and two authenticator stubs: one from the originating state server; and the other from the state server operating in the ecosystem. For authentication, applications in the current ecosystem would rely on their state server for authentication. In another variation, the state server inside the ecosystem can authenticate the title object itself, and also request authentication from the originating state server outside the ecosystem.

In yet another embodiment, state server 4502 supports a revocation and suspension process, whereby titles in circulation can be revoked for various reasons. For example, if a title has been reported stolen it can be revoked. Or, if a consumer has not met the requirements for the continued use of a title it can be suspended until the requirements are met. In this example, a revocation or suspension protocol message is sent to state server 4502 from a valid and trusted source. State server 4502 will then revoke or suspend the title in question and maintain this in the state collection 4504. In one example, revocation can be requested by the owner of the title and in this case the title can be presented for revocation. The state server 4502 will authenticate the title before revoking.

The establishment of trust within the title transaction ecosystem can occur in several ways. In one embodiment, the participants in a title transaction establish trust implicitly by trusting the authentication of titles used in a transaction that have been endorsed and authenticated by known and configured state servers. For example, as applications and devices communicate using the title protocol, the titles conveyed within the protocol will be authenticated by known and trusted state servers. In another embodiment, trust is established by using trust titles configured on title enabled applications and devices. The trust titles provide fine-grained descriptions and instructions on what title objects are to be trusted and under what circumstances. Trust titles can be created and endorsed by administrative applications and configured on title-enabled applications. The title-enabled applications can then refer to trust titles to execute instructions and filters on transactions that they process to ensure that the titles can be trusted. Trust within a title transaction ecosystem can be established on an implicit or explicit basis, in a peer-to-peer matrix relationship, in a formal hierarchical manner, or in a hybrid fashion depending on the requirements of applications involved in title transactions. In another embodiment, trust can be established through the title object authentication process as described previously. In another embodiment, trust can be established by utilizing a public key infrastructure or similar method such as X.509 and PGP digital certificates. This can operate in conjunction with digitally signed title objects and digitally signed stubs. In another embodiment, trust can be explicitly specified by a user on a title by title basis, or by configuring a set of parameters within their profile.

H. File Sharing and Distribution

In another embodiment of the title system, titles can be used to manage the access to, sharing and distribution of digital asset. A digital asset comprises anything that may be stored in digital format (i.e., documents, pictures, audio, and web based asset). Previous approaches to file access control are normally based upon the concept of the name and password which can easily be propagated among multiple users. In this embodiment the title is used to easily refer to and control access to that digital asset.

Figure 47:
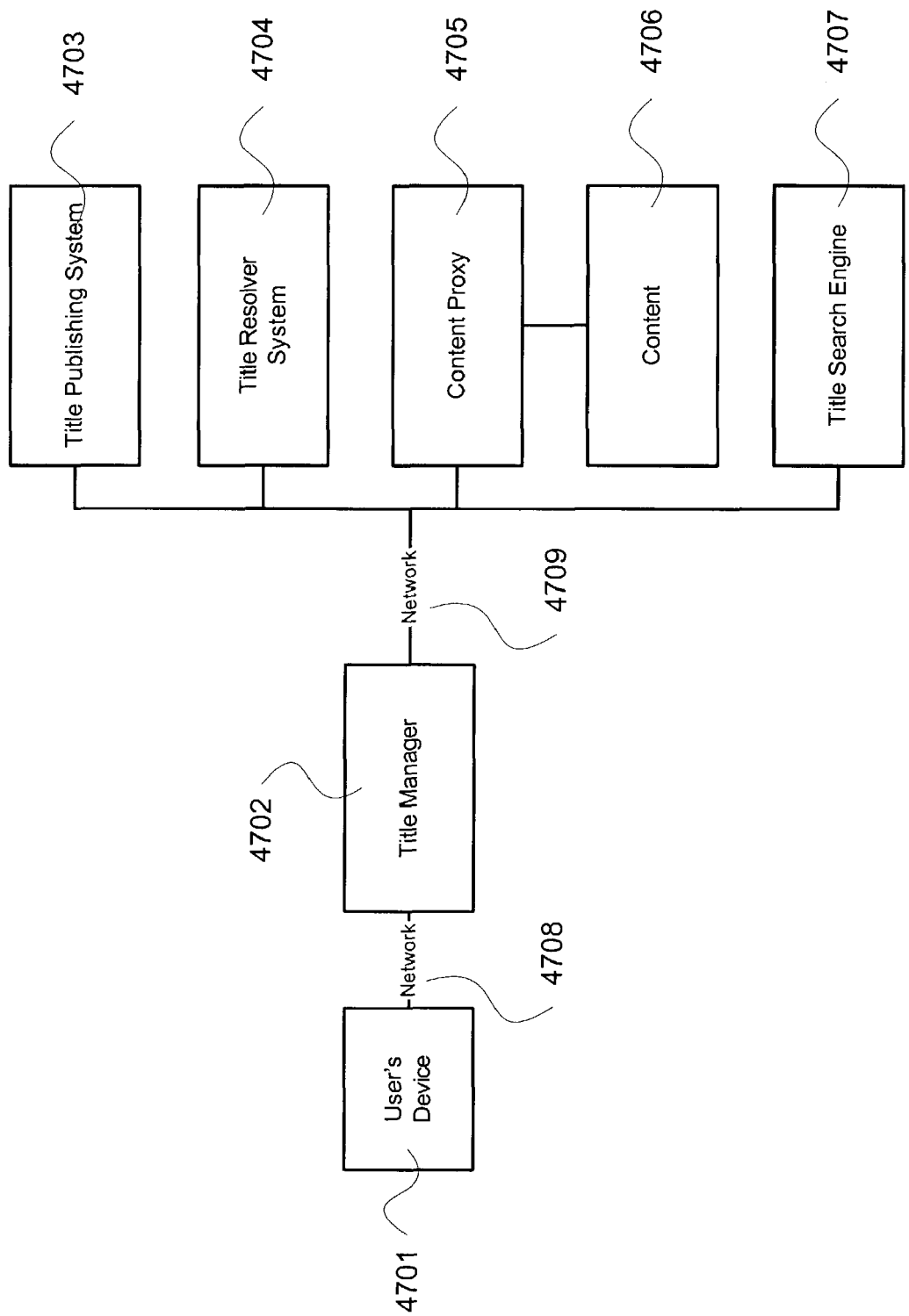
FIG. 47 depicts a simplified example of a digital asset access and distribution system, according to an embodiment of the invention.

Referring now to FIG. 47, an example of a system that manages the distribution and access to digital asset architecture is shown, according to one embodiment of the invention. Although the diagram shows separate components that maybe operated on separate computing devices, in another embodiment these components can be operated on the same device. In one embodiment, the functionality of title manager 4702 can be operated directly on consumer device 4701 as a complete application. Likewise the functionality of the title redemption system 4704 may exist on the title publishing system 4703. Also the term network refers to any mechanism that allows the transfer of data between computing devices.

Figure 48:
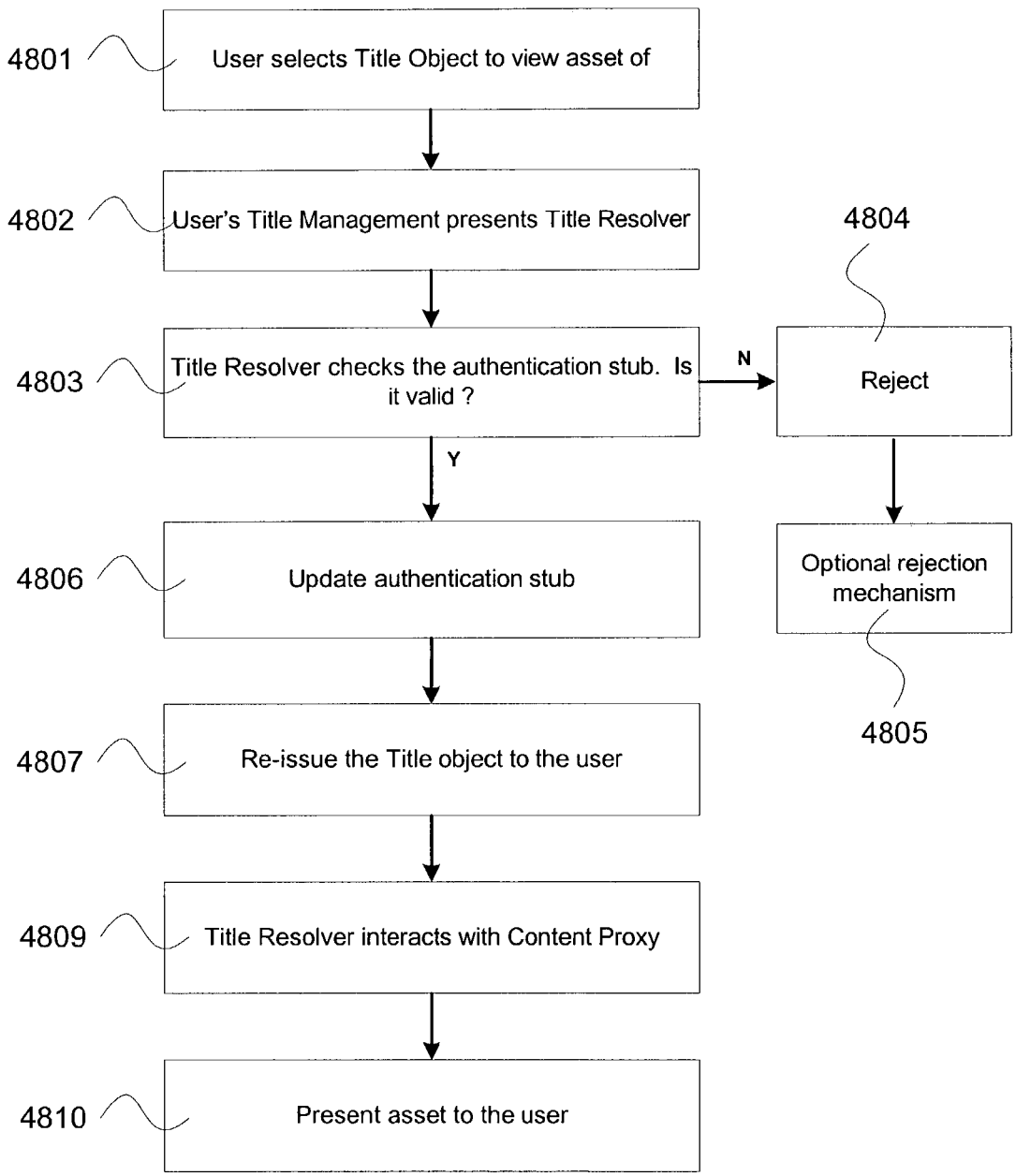
FIG. 48 depicts a simplified example of a asset retrieval mechanism, according to an embodiment of the invention.

Referring now to FIG. 48, a high level mechanism for retrieving the asset is shown, according to one embodiment of the invention. The user selects the title object that represents the asset that the user wishes to access 4801. From the user's perspective it may not be known that a title object is involved, only that an asset is being selected.

The user's title manager will then present the title to the appropriate title resolver 4802. The title resolver will reject the title if the authentication stub is invalid 4804. The system can have an optional rejection mechanism which can offer a range of responses and possible actions depending upon the requirements and needs of the asset owner or provider.

If the authentication stub is valid, then the authentication stub is updated 4806 and the title object is re-issued to the user 4807. This update and re-issue process ensures that any copies of the title that were made by the user will now be invalid. This means that it is not possible to copy and distribute a title object among a group of people as the first person to redeem the title object will make the other copies of the title object invalid and thus the other members of the group will have no access to the asset.

In another embodiment this ability of the title to manage and control access to the asset can be further enhanced through other mechanisms of the title object which for example limit the access of the title to the asset based upon number of uses, time period, time of days and other appropriate mechanisms that support the business model of the asset owner.

In yet another embodiment the mechanism within a title that supports different redeem methods enables users who use multiple devices to access asset, to have the asset presented to them in the most appropriate format for the device that the user is using at that particular point in time. For example if the user is accessing the asset from a mobile phone then the asset could be text based, while if the access device is a computer then the asset could be multimedia based.

Figure 49:
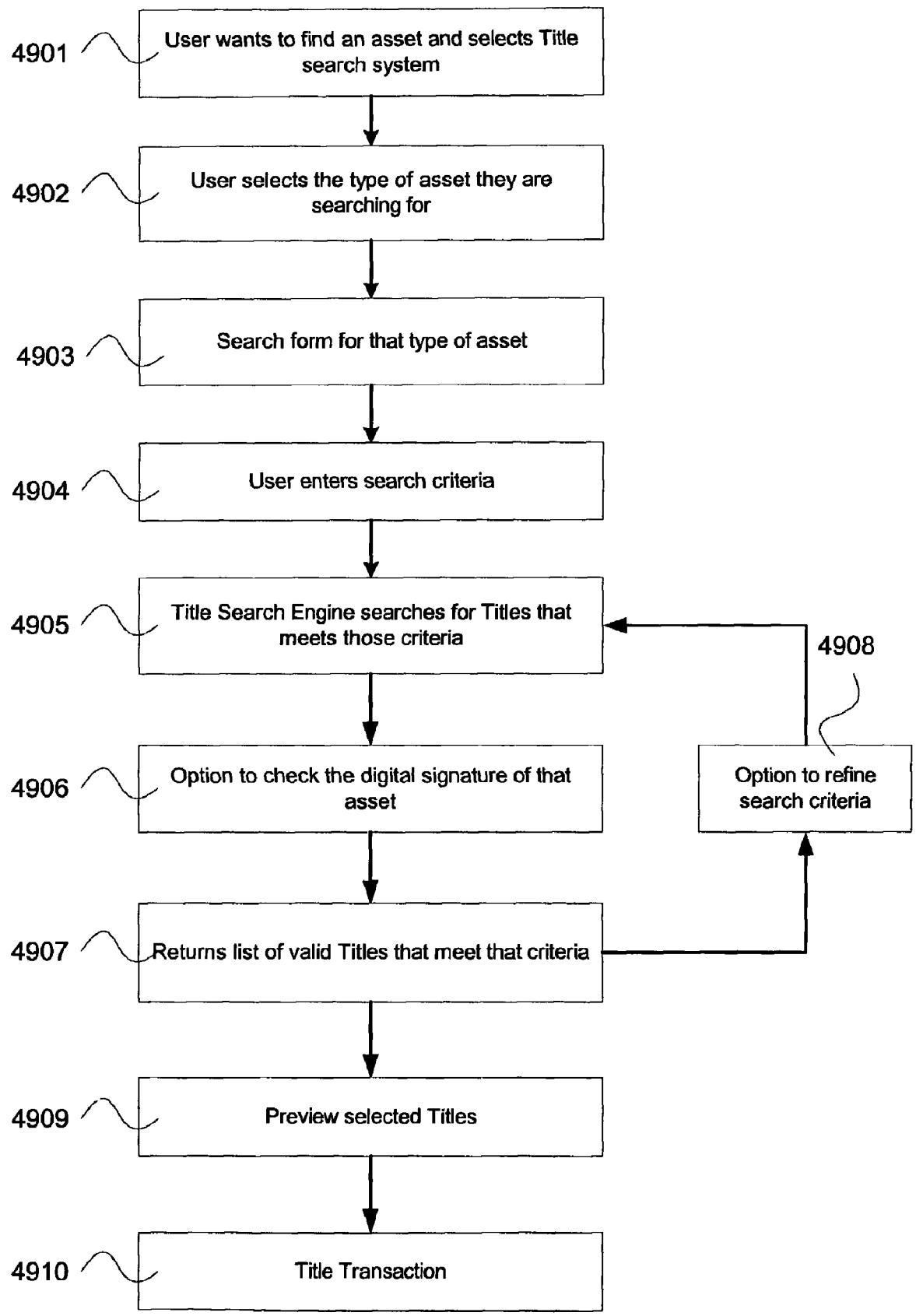
FIG. 49 depicts a simplified example of a title system search process, according to an embodiment of the invention.

Referring now to FIG. 49, a process to search for digital asset using the title system is shown, according to one embodiment of the invention. Because a title contains a metadata description that describes the asset it is possible to search for asset effectively across a wide domain and find valid asset. This compares to search systems today that are based upon text matching systems that do no take account of the context in which the text exists. Thus for example a search for a piece of music based upon artist name using the title system will result in titles that point to asset rather than pure text based systems which will list text whenever that artist is mentioned, resulting in a search results that is too broad for the user to utilize.

In this embodiment of the search process the user selects the title search option 4901. The user is then prompted for the type of asset that the user wishes to search for 4902. Based upon the asset type a dedicated search form will be displayed 4903, which the user enters the criteria in 4904. The title search engine will then search for titles that meet those criteria 4905 across a single domain or multiple domains. There is an option to check the digital signature 4906 within the titles to ensure that they have been published by a valid entity. The title search engine will then return a list of valid titles 4907, and the user has the option of refining the search further 4908, or selecting and previewing the titles of interest 4909.

The multiple redemption methods that titles supports means that the preview methods used in 4909 can be extremely flexible ranging from a simple description to the ability to access the actual asset with a set of constraints such as view once or only valid for a number of days. Once the consumer has found the asset of interest then a title transaction can occur 4910 between the user and the owner of the title object. Once a user posses a title, which gives them a certain set of rights to the digital asset, depending upon those rights the user can carry out a number of transactions with those titles that they own. These transactions being to share the title, to give the title, or to trade the title.

Figure 50:
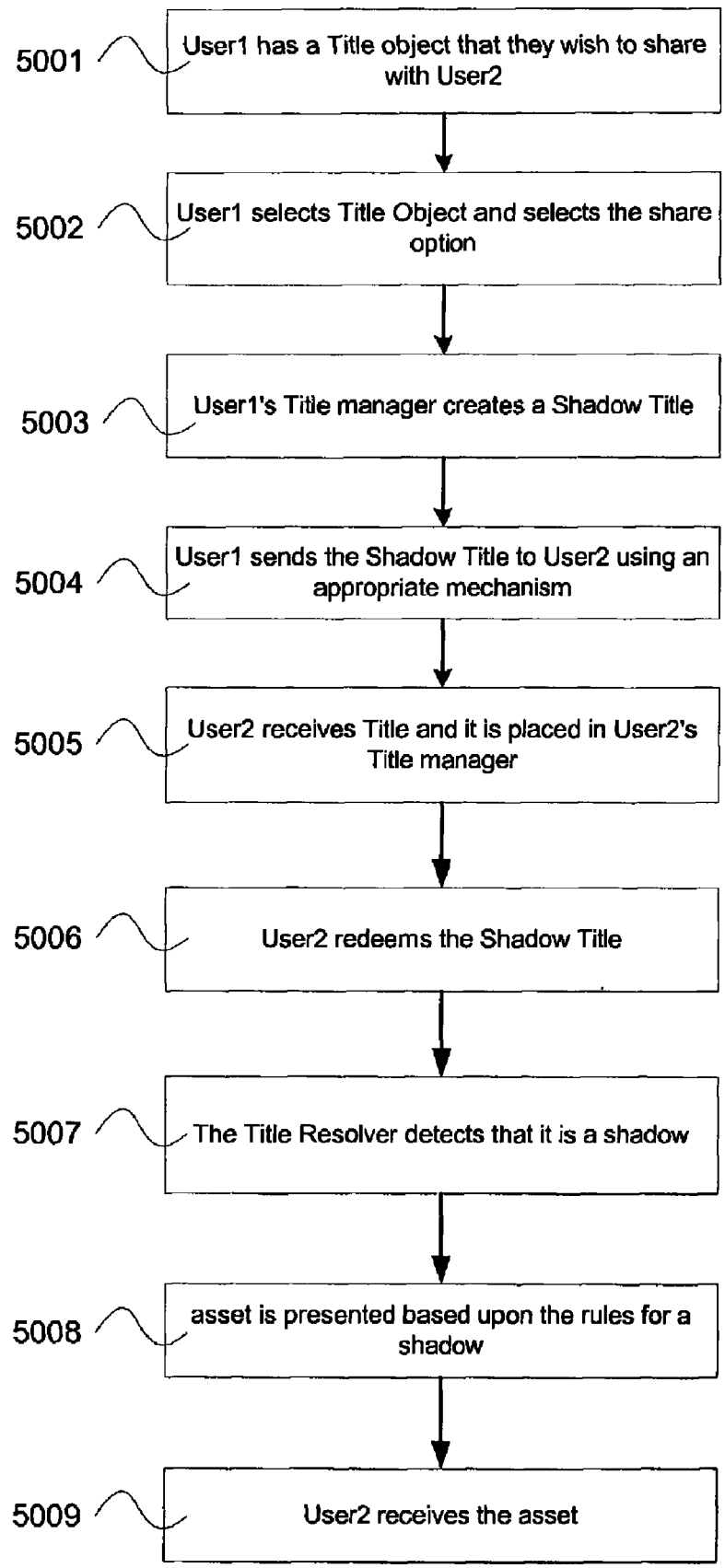
FIG. 50 depicts a simplified example of a title object sharing process, according to an embodiment of the invention.

Referring now to FIG. 50, a simplified process for sharing a title object is shown, according to one embodiment of the invention. Because a title cannot be copied and used by two people, the sharing mechanism allows a title object holder to share access to a version of that asset based upon the rules that the asset holder implements through the title mechanism.

The mechanism for sharing between user1 and user2 is very simple, user 1 has an asset that they wish to share 5001, user 1 selects the title, and selects the share option 5002. Users 1 title manager creates a shadow title 5003 if the original title object allows the sharing mode, which user 1 sends to user 2 using an appropriate mechanism 5004 such as email, instant messaging or another digital transport mechanism. The shadow title is a modified version of the original title object in that a mechanism such as removing the authentication stub is used to indicate that this shadow title has no rights. In other embodiments the user interaction could be different, and the functionality to create the shadow title may exist within other elements of the system for example the client device or the title publishing system.

Once user2 receives the shadow title, it is stored in title manager 5005, and it can now be redeemed by presenting it to the title resolver system 5006. When the title resolver detects that the title object is a shadow 5007, then using the business rules indicated within the title itself, or through the asset system, a preview version 5008 of the asset will be presented to user2 5009. This preview version of the asset can take many forms including a simple description, a lower quality version, an online version rather than a downloaded version, or a limited use version based upon time, number of uses or other appropriate mechanisms. It should be noted that in this embodiment it was a one to one transaction, but in fact could be a one to many transaction were multiple shadow titles are generated. In another embodiment, the shadow title can be stored in title manager 5003 on behalf of the recipient user2 who may not have a title manager or title-enabled application. In this instance, the recipient would have no method or apparatus for redeeming the title. Instead, the title manager 5003 in this example maintains the shadow copy and presents an encoded URL to user1 that refers to the shadow copy. User1 then sends the encoded URL to user2 using a standard communication mechanism such as electronic mail or instant messaging. Upon receiving the encoded URL, user 2 clicks on it thereby initiating a redemption with title manager 5003.

This approach to sharing of asset meets the needs of asset owners and providers to have their legal rights to that asset to be fully respected, while providing an easy to use mechanism for the users of asset to make other users aware of this asset and for them to use this asset in some restricted form. If the recipients feel that the asset is of value to them then they can purchase the asset.

Figure 51:
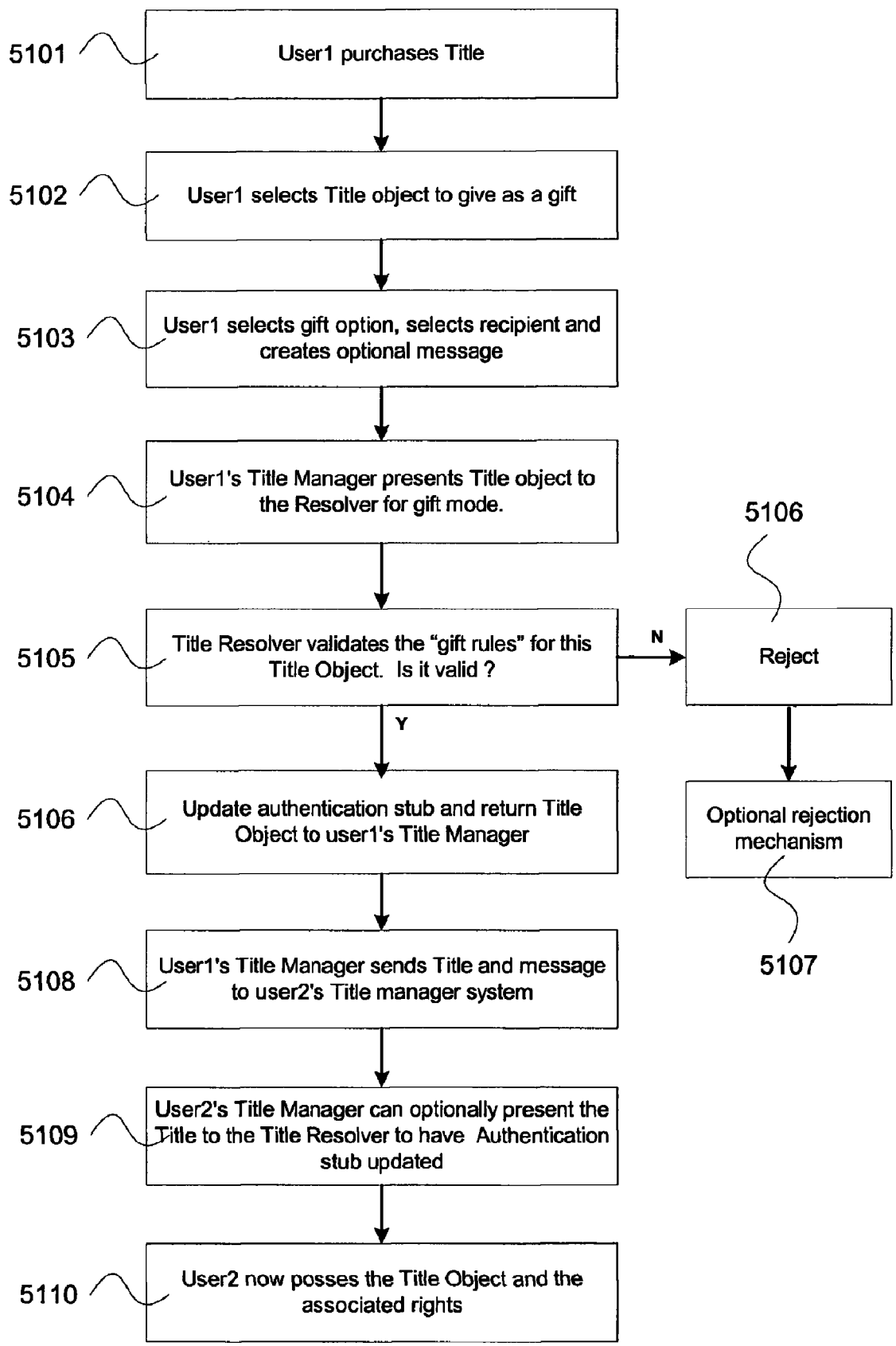
FIG. 51 depicts a simplified example of a mechanism to give an asset to a user, according to an embodiment of the invention.

Referring now to FIG. 51, a simplified process for giving an asset to another user is shown, according to one embodiment of the invention. With previous mechanisms of purchasing and giving digital asset, there was always the possible issue that the purchaser would in effect be making a copy of the asset, or the name and password to access the asset. With a title based approach it enables asset to be purchased and given with no residual copy existing for the purchaser.

In this embodiment of the gift scenario user1 purchases a title object to give as gift 5101. Once user1 has received the title object into the title manager, user1 selects the title 5102 and selects the gift option 5103, user1 selects the recipient and has the option to create a gift message. User1's title manager presents the title object to the resolver in gift mode 5104. The resolver will validate that this title can be given as a gift and that optional criteria have been met 5104. These optional criteria can include such features as the asset must have never been accessed by user1. If the title object cannot be given as gift the title is rejected and an optional rejection mechanism can occur.

The title resolver will update the authentication stub to invalidate any copies of the title object that user1 may have 5106, and the updated title object is sent to the user1's title manger which will automatically send the title object and the associated message to user2's title manger 5108. On receipt of the title user2's title manager can optionally refresh the authentication stub of the title object for added security. It should be noted that other embodiments of the gift mechanism could be implemented, for example using a lockbox for extra security, or getting the title publishing system to send the title direct to user 2. An enhanced version of the gift mechanism would be to allow user1 to build an album or collection of digital asset that could be given as a gift, in this case the systems would handle the multiple titles. A further embodiment would be the ability to give the title objects to multiple people where the payment for the multiple copies would be handled automatically as part of the gift process.

Figure 52:
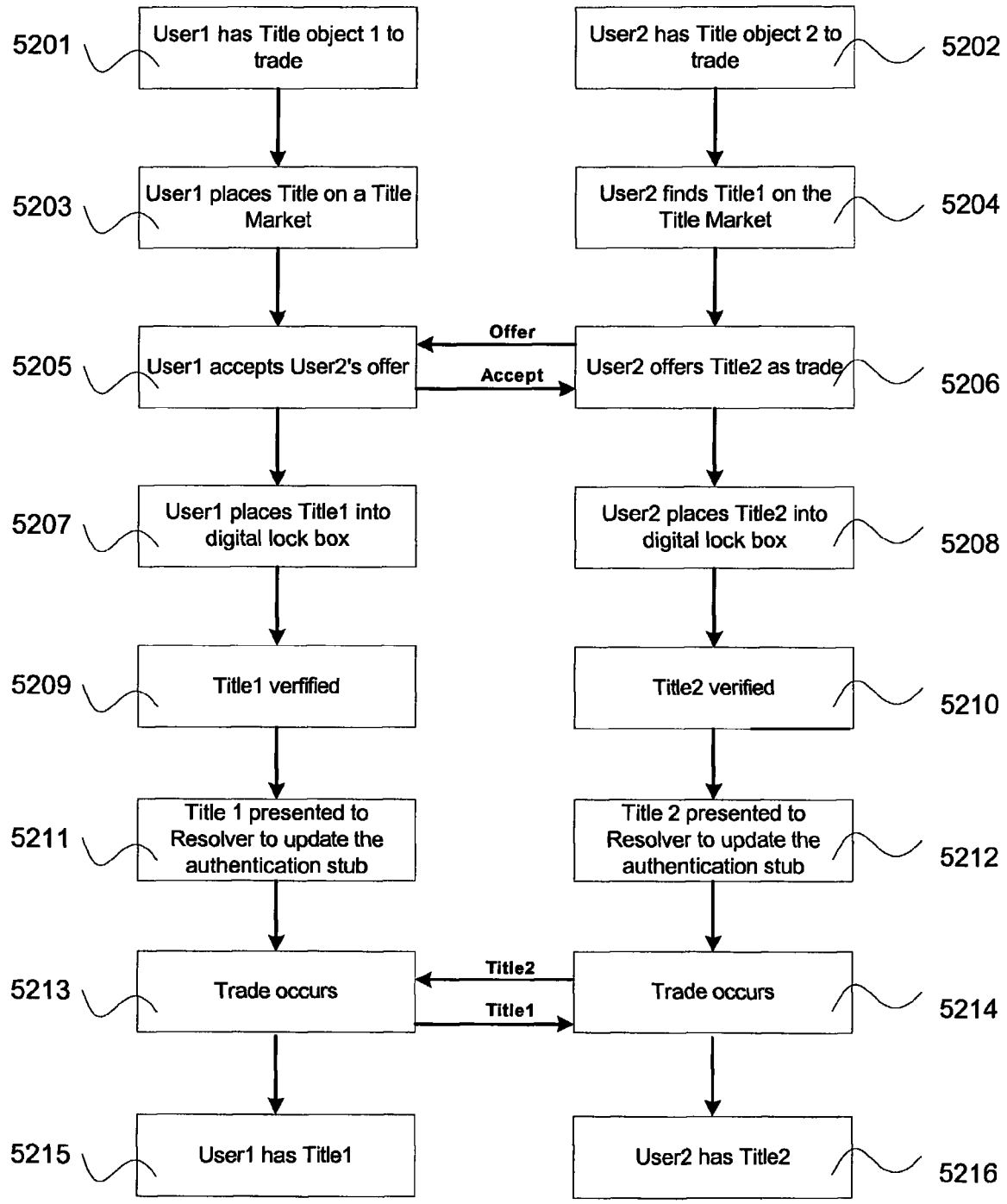
FIG. 52 depicts a simplified example of a trading process, according to an embodiment of the invention.

Referring now to FIG. 52, a simplified process for trading titles without valid copies of the title object being left on the parties' machines, according to one embodiment of the invention. In this process the two users have two titles to trade 5201 & 5202. User1 places their title on a title market place 5203, and user2 finds that title1 is available for trade 5204. User2 offers user1 title2 as a trade 5206, and user1 accepts the offer 5205. It should be noted that this is one possible embodiment of the mechanism for establishing the trade. There is a wide range of embodiments for establishing the trade including automatic trading boards, trading bots and simple communication between the parties involved in the trade.

Once a trade has been agreed upon, a mechanism must be provided for the trade to occur. In this embodiment, a digital lock box is used but there a wide range of options for providing the actual trading mechanism. User1 places title1 into the digital lockbox 5207 and user2 places title2 into the digital lockbox 5208. A mechanism then verifies and authenticates the titles to be traded. Examples include using digital signatures, presenting the titles to the issuing site, or giving the users the ability to view the titles.

Once the titles are verified, they are presented to their respected title resolvers for their authentication stubs to be updated at 5211 & 5212. This ensures that any copy of the titles kept by users is now invalid for redemption. The titles are now traded 5213 & 5214 and delivered to the title managers 5215 & 5216.

In another embodiment, the trading mechanism comprises digital trading cards. In general, the collection and trading of physical trading cards is very popular. However, implementing a corresponding digital trading card system has generally been impractical. One reason may have been concerns of piracy. That is, a complex centralized digital rights system would be required to log all ownership and securely manage trades. Through the use of the present invention, however, a secure scalable digital trading card system can be implemented.

Figure 53:
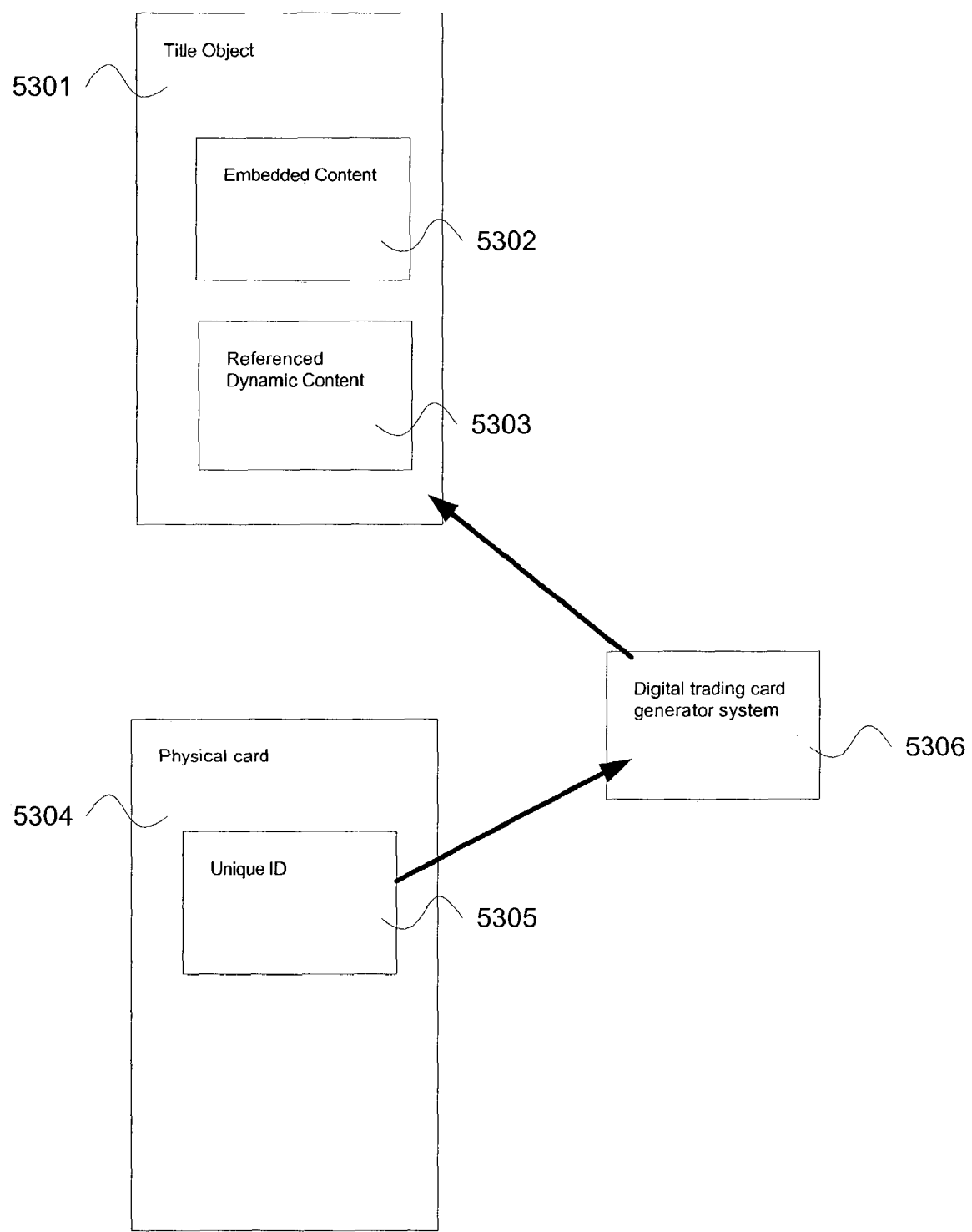
FIG. 53 depicts a simplified example of a digital trading card structure, according to an embodiment of the invention.

Referring now to FIG. 53, a digital trading card architecture is shown, according to one embodiment of the invention. Title object 5301 includes embedded content 5302 comprising a digital trading card. Embedded content 5302 may be displayed through a browser or a dedicated application for displaying the digital trading card. Digital trading card 5304 may also use reference content 5303, such that the digital trading card can present updated or fresh information. Embodiments of this information could include updated sports statistics for sports based cards, updated information for game cards or updated multimedia. For example, a digital trading card could be used in conjunction with a physical trading card. A consumer, buying a physical card 5304, would also be given a unique ID 5305. Upon presentation to digital trading card generator system 5306, a digital trading card based upon the corresponding title is generated.

The mechanisms for generating titles that refer to digital assets can be divided into two classes, automated systems and user driven systems. Automated systems that interact with established web based systems such content management systems would use dedicated interfaces and such embodiments of this approach to title generation have been covered by other descriptions. There are a wide range of embodiments for user driven systems that deliver a functionality that systems deployed to day cannot deliver. In one embodiment, a file sharing system allows users to distribute content easily among their contacts.

Figure 54:
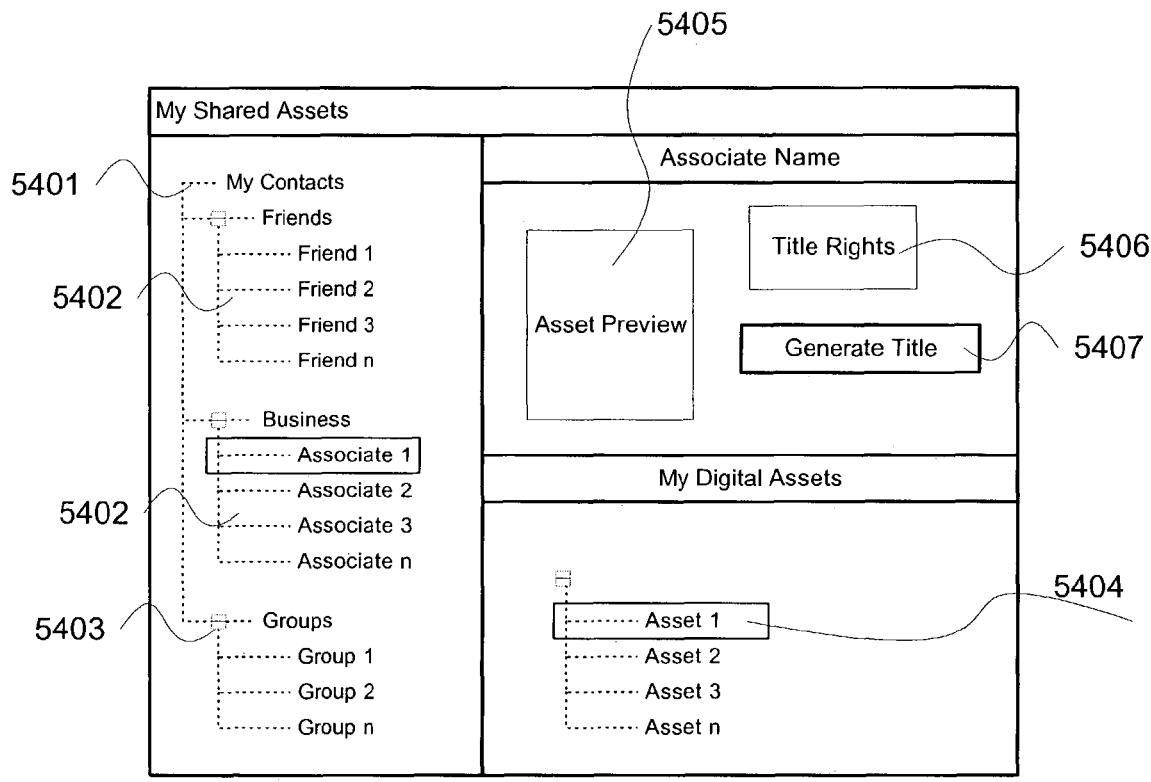
FIG. 54 depicts a simplified example of a user interface allowing users to share and mange the sharing of digital assets among other users, according to an embodiment of the invention.

Referring now to FIG. 54, a user interface is shown allowing users to share and manage digital assets sharing, according to one embodiment of the invention. My contacts 5401 comprises a list of contacts with which the user interacts. For example, the contact list could be a simple address book application or the contact system is a title based system. Contacts may be individuals 5402 or groups of individuals 5403. In order to share a digital asset, a user would identify a contact, determine appropriate digital asset rights 5406, and generate the title 5407. A title object would subsequently be sent to the contact. A preview version of the asset can be shown in window 5405.

Figure 55:
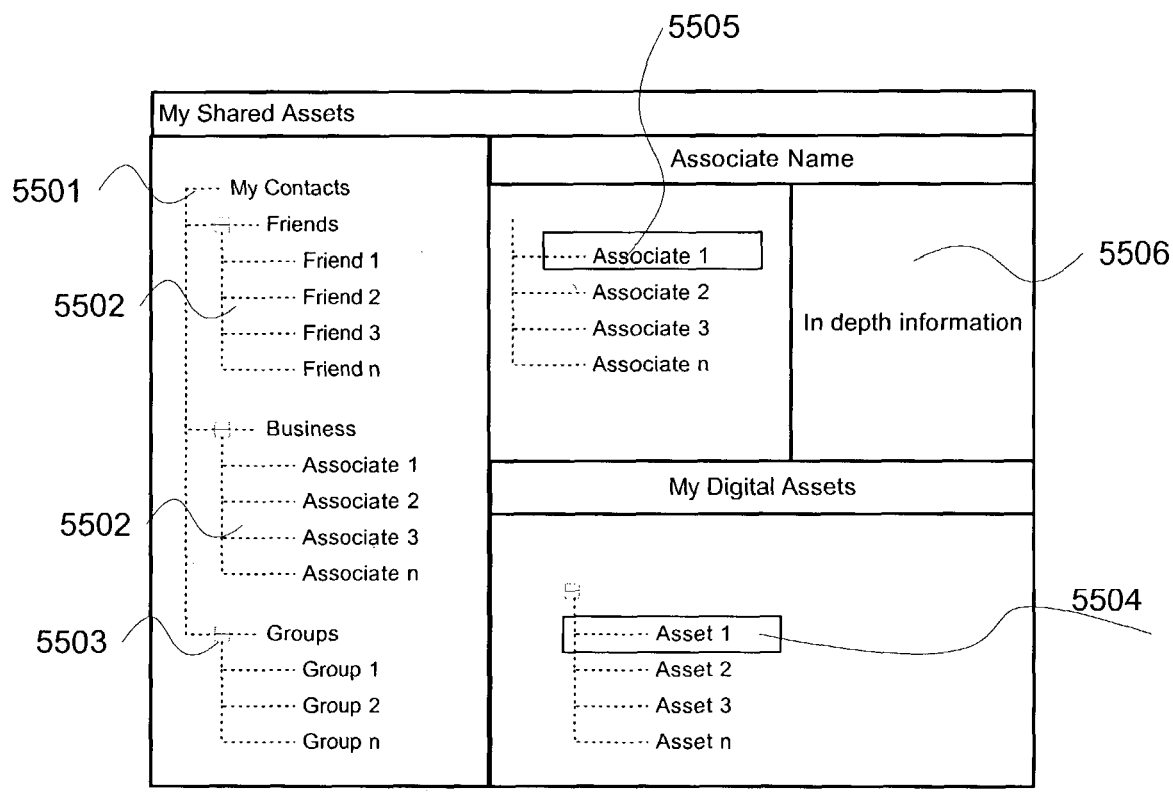
FIG. 55 depicts a simplified example of the management titles and the associated rights, according to an embodiment of the invention; and, FIG. 56 depicts a simplified example of an abstraction layer, according to an embodiment of the invention.

Referring now to FIG. 55, an example of the management of titles and the associated rights is shown, according to one embodiment of the invention. Digital asset sharing allows users to easily share digital assets with contacts while not have to worry about names and passwords or the underlying file structure. For example, it is possible to click on contacts 5501, such as a friend or business associate 5502, or groups 5503, to discover the assets to which they have access. For each asset, a list of contacts with corresponding rights can also be displayed. In this way, it is possible to select a contact 5505 and manage the rights and title for that contact 5506, subsequently generating a new title if required.

Figure 56:
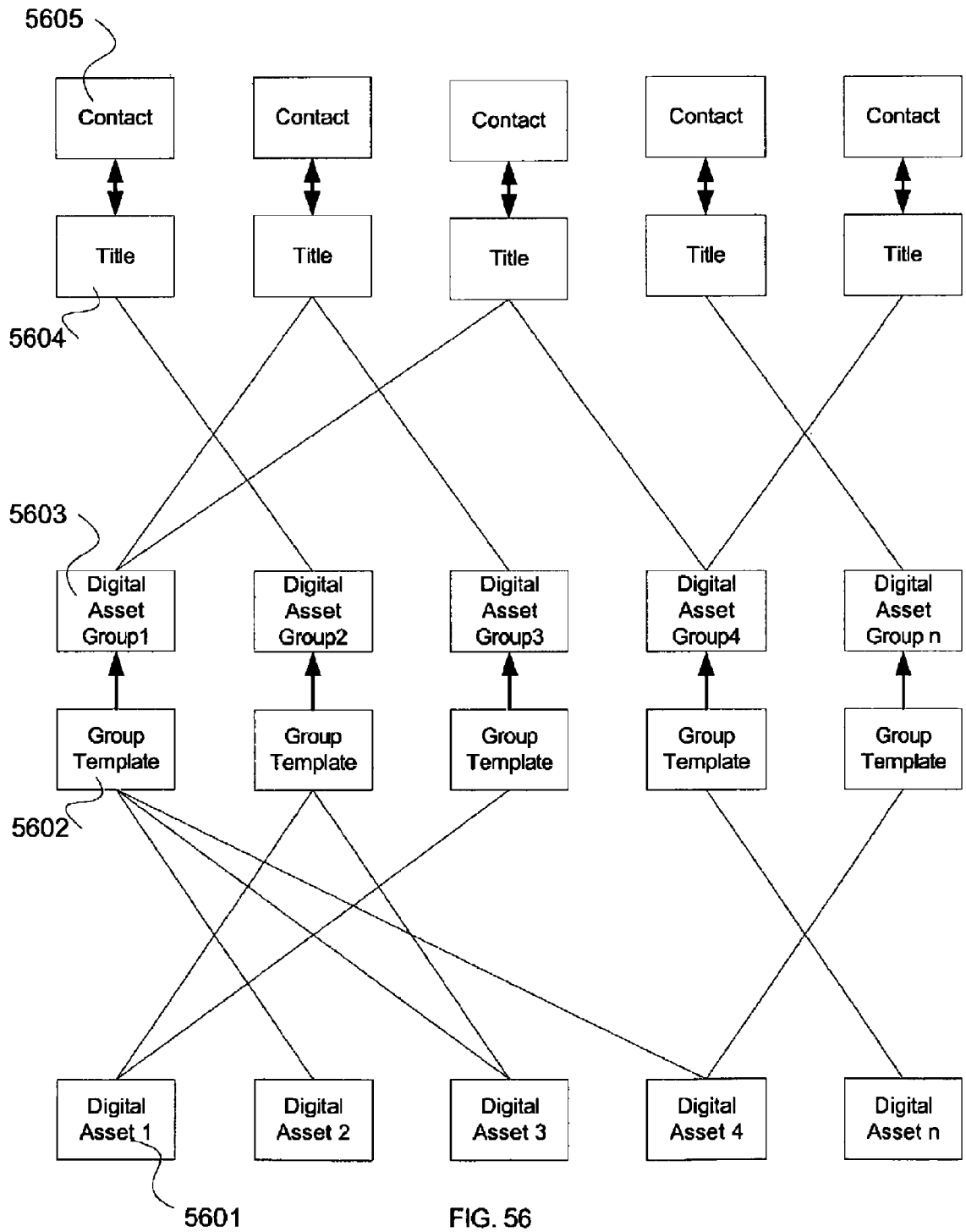

Referring now to FIG. 56, an example of an abstraction layer allowing different groups of digital assets to be presented to different groups of people is shown, according to one embodiment of the invention. For example, if a user has to support multiple web pages for different groups such as family, friends, colleagues etc then it can be very laborious to manage those multiple pages especially if there are shared assets. FIG. 56 shows how this would be done at an abstract layer. There is a collection of digital assets and these assets could be managed in the title domain or they could exist in other domains such as files, web page content, emails, bloggers and other forms. Using the title manager or an assistant program the user collects the group of digital assets and can use a template 5602 to control how they will be displayed. A digital asset group 5603 has now been created which takes the individual digital assets and displays them in a formatted way. Titles are then created 5604 using previously described mechanism for contacts (individuals or groups) 5605 to access particular digital asset groups. This layer of abstraction combined with the title mechanism provides an efficient and easy way to way to mange multiple digital assets and how they are accessed by multiple contacts.

I. CONCLUSION

Advantages of the invention include the ability to easily and efficiently manage and share titles over a network such as the Internet. Additional advantages of the invention include creating an ecosystem whereby digital content providers can offload the burden of managing and enforcing user access rights, yet receive revenue from third party transactions.

Having disclosed exemplary embodiments and the best mode, modifications and variations may be made to the disclosed embodiments while remaining within the subject and spirit of the invention as defined by the following claims.

The invention claimed is:

1. A rights-based network, comprising:
    at least one data store configured to store a plurality of title objects associated with a plurality of entities, each title object having previously been encoded with a representation of at least one right, each title object being configured to effect redemption of the at least one right by presentation of the title object to a title-enabled process in the network, each of selected ones of the title objects also having been previously encoded with an associated title object state; and
    one or more computing devices in communication with the at least one data store, the one or more computing devices being configured to:
        maintain an entry for each selected title object which is stored separately from the corresponding selected title object and which indicates validity of the corresponding selected title object when the entry is synchronized with the title object state of the corresponding selected title object;
        authorize redemption of the rights and transfer of ownership of the selected title objects stored in the at least one data store by comparing the title object states and the corresponding separately stored entries; and
        update both the separately stored entries and the title object states for corresponding selected title objects to correspond to new values in conjunction with any transaction involving the corresponding selected title objects that results in redemption of the at least one right encoded by the corresponding selected title objects or transfer of ownership of the corresponding selected title objects, thereby ensuring that only a single valid instance of each selected title object is in circulation in the network.

2. The network of claim 1 wherein the at least one data store, and the one or more computing devices are under control of a single one of the entities.

3. The network of claim 1 wherein the at least one data store, and the one or more computing devices are under control of multiple ones of the entities.

4. The network of claim 1 wherein the one or more computing devices employ at least one title protocol configured to run on top of at least one underlying protocol operating in the network.

5. The network of claim 4 wherein the at least one underlying protocol comprises at least one of SOAP, DAXP, SHTTP, HTTP, SMTP, LDAP, SMS, TCP/IP, UDP/IP, POP3, IPSec, IPv6, SSL, an RF protocol, an instant messaging protocol, an electronic mail protocol, a mobile device protocol, and a wireless protocol.

6. The network of claim 5 wherein the at least one underlying protocol comprises TCP/IP, the at least one title protocol being operable to run directly on top of TCP/IP.

7. The network of claim 1 wherein the one or more computing devices employ at least one title protocol specified using a standard Uniform Resource Locator (URL).

8. The network of claim 1 wherein the one or more computing devices employ a plurality of protocols operable to facilitate communication among a plurality of different device types associated with the entities.

9. The network of claim 8 wherein the plurality of different devices types include wired computing devices and wireless computing devices.

10. The network of claim 1 wherein the one or more computing devices are configured to facilitate policy controlled connections between devices in the network.

11. The network of claim 10 wherein the policy controlled connections relate to any of packet switching, content distribution, load balancing, and security.

12. The network of claim 1 wherein the rights-based network corresponds to an integrated system, the network further comprising a plurality of system components corresponding to the plurality of entities, the one or more computing devices being configured to coordinate operation of the system components.

13. The network of claim 12 wherein the integrated system comprises a manufacturing system.

14. The network of claim 1 wherein the one or more computing devices are configured to support at least one of synchronous or asynchronous messaging in the network.

15. The network of claim 1 further comprising a title manager deployed in the network and associated with a first one of the entities, the title manager being operable in conjunction with the one or more computing devices to facilitate management by the first entity of first ones of the title objects associated with the first entity.

16. The network of claim 15 wherein the title manager is further operable in conjunction with the one or more computing devices to receive and respond to redemption requests from the first entity relating to particular ones of the first title objects.

17. The network of claim 1 further comprising a title resolver deployed in the network, the title resolver being operable in conjunction with the one or more computing devices to determine whether the selected title objects presented in the network are valid with reference to the states associated with the selected title objects and the corresponding entries.

18. The network of claim 17 wherein the title resolver is further operable in conjunction with the one or more computing devices to update the states associated with the selected title objects and the corresponding entries each time the selected title objects are presented to a title-enabled process in the network.

19. The network of claim 1 wherein the one or more computing devices are further configured to facilitate communication among the entities using particular ones of the title objects.

20. The network of claim 1 wherein the one or more computing devices are configured to facilitate communication and transfer of the title objects among the entities using message components, each message component comprising transaction information identifying a corresponding transaction, system information governing processing of the message component in the network, and at least one of the title objects.

21. The network of claim 20 wherein each message component is configured to have any of the transaction information, the system information, and the at least one of the title objects altered in response to processing of the message in the network.

22. The network of claim 1 wherein the one or more computing devices implement are further configured to enable first ones of the entities and the title objects to locate others of the entities and the title objects in the network.

23. The network of claim 22 further comprising at least one naming host device which is operable to resolve names associated with each of the entities and the title objects with corresponding network addresses.

24. The network of claim 23 wherein the at least one naming host device comprises a single central naming host device through which all communications in the network involving the one or more computing devices are conducted.

25. The network of claim 22 wherein the one or more computing devices are configured to employ either or both of broadcast queries and multicast queries by the first ones of the entities and the title objects to facilitate location of the others of the entities and the title objects in the network.

26. The network of claim 22 wherein the one or more computing devices are configured to establish peer-to-peer relationships between selected ones of the entities and the title objects using network queries and responses.

27. The network of claim 22 wherein the one or more computing devices are configured to establish peer-to-peer relationships between selected ones of the entities and the title objects by physical proximity.

28. The network of claim 27 wherein the one or more computing devices are configured to determine physical proximity using a wireless protocol.

29. The network of claim 1 wherein the one or more computing devices are configured to endorse new selected title objects in the network by initially setting the associated state and corresponding entry.

30. The network of claim 1 wherein the one or more computing devices are configured to determine whether the state associated with a first one of the selected title objects presented in the network is synchronized with the corresponding entry.

31. The network of claim 30 wherein the one or more computing devices are configured to update the state associated with the first selected title object and the corresponding entry in response to presentation of the first selected title object to a title-enabled process in the network.

32. The network of claim 31 wherein the state associated with the first selected title object corresponds to a chained hash value.

33. The network of claim 32 wherein the chained hash has a current value generated by hashing an initial value a first number of times.

34. The network of claim 33 wherein the state associated with the first selected title object includes the current value and identifies a specific hashing function, and wherein the corresponding entry includes the first number and the initial value.

35. The network of claim 33 wherein the state associated with the first selected title object includes an encrypted version of the initial value and the current value, and identifies a specific hashing function, and wherein the corresponding entry includes the first number.

36. The network of claim 33 wherein the first selected title object is presented in the network by a first one of the entities, the first entity being responsible for generating the current value of the chained hash, and wherein the state associated with the first selected title object includes the current value, and identifies a specific hashing function, and wherein the corresponding entry includes a previous value of the chained hash.

37. The network of claim 30 wherein the one or more computing devices are configured to selectively re-endorse the first selected title object by resetting the state associated with the first selected title object and the corresponding entry when the state and the entry are not synchronized.

38. The network of claim 30 wherein the state associated with the first selected title object and the corresponding entry comprise a randomly generated value.

39. The network of claim 30 wherein the state associated with the first selected title object is related to the state associated with a second one of the selected title objects, and wherein the one or more computing devices are configured to authenticate the first selected title object with reference to the states associated with both of the first and second selected title objects.

40. The network of claim 39 wherein the states associated with the first and second selected title objects are generated with a key splitting technique applied to first data.

41. The network of claim 30 wherein the state associated with the first selected title object is related to the states associated with second and third ones of the selected title objects, and wherein the one or more computing devices are configured to authenticate the first selected title object with reference to at least one of the states associated with the second and third selected title objects.

42. The network of claim 41 wherein the states associated with the first, second, and third selected title objects are generated with a key splitting technique applied to first data.

43. The network of claim 41 wherein the one or more computing devices are configured to authenticate the first selected title object with reference to both of the states associated with the second and third selected title objects.

44. The network of claim 41 wherein the one or more computing devices are configured to authenticate the first selected title object with reference to only one of the states associated with the second and third selected title objects.

45. The network of claim 1 wherein the one or more computing devices are configured to revoke a first one of the title objects upon presentation of the first title object in the network.

46. The network of claim 1 wherein the one or more computing devices are configured to prevent redemption of the at least one right represented by a first one of the title objects upon presentation of the first title object in the network until a requirement is met.

47. The network of claim 1 wherein first ones of the title objects comprise trust title objects, the trust title objects identifying others of the title objects which can be trusted by associated processes operating in the network.

48. The network of claim 1 wherein the one or more computing devices are configured provides an abstraction layer for distribution of digital assets which enables channel-independent access to the digital assets by the plurality of entities.

49. The network of claim 1 wherein the one or more computing devices are configured to generate a modified version of a first one of the title objects associated with a first one of the entities to facilitate sharing of the first title object with a second one of the entities, the at least one right represented by the modified version of the first title object being reduced relative to the at least one right represented by the first title object.

50. The network of claim 1 wherein the one or more computing devices are configured to present a first one of the title objects associated with a first one of the entities to a second one of the entities, and to ensure that no valid copy of the first title object remains with the first entity.

51. The network of claim 1 wherein the one or more computing devices are configured to present a first one of the title objects associated with a first one of the entities to a second one of the entities, to present a second one of the title objects associated with the second entity to the first entity, and to ensure that no valid copies of the first and second title objects remain with the first and second entities, respectively.

52. The network of claim 1 wherein the plurality of entities comprise any of computing devices deployed in the network, processes operating in the network, natural persons, business entities, and organizations.

53. The network of claim 1 wherein the one or more computing devices are configured to facilitate transfer of the title objects among the entities using asynchronous messages.

54. The network of claim 53 wherein at least some of the asynchronous messages comprise email messages, and wherein the title objects are either included in a body of the email messages, or included as attachments to the email messages.

55. The network of claim 53 wherein the asynchronous messages are transmitted according to one or more of an HTTP protocol, an SMTP protocol, an instant messaging protocol, a POP3 protocol, a TCP protocol, a UDP protocol, or an SMS protocol.

* * * * *